United States Patent [19]

Cusey et al.

[11] Patent Number: 5,679,944

[45] Date of Patent: Oct. 21, 1997

[54] PORTABLE ELECTRONIC MODULE HAVING EPROM MEMORY, SYSTEMS AND PROCESSES

[75] Inventors: James P. Cusey, McKinney; Bradley M. Harrington, Carrollton, both of Tex.

[73] Assignee: Dallas Semiconductor Corporation, Dallas, Tex.

[21] Appl. No.: 342,068

[22] Filed: Nov. 18, 1994

Related U.S. Application Data

[63] Continuation-in-part of Ser. No. 262,071, Jun. 15, 1994.

[51] Int. Cl.$^6$ .......................... G06K 19/06; G06K 7/06
[52] U.S. Cl. ............................................ 235/492; 235/441
[58] Field of Search .................................. 235/930, 362, 235/384, 441, 492, 487

[56] References Cited

U.S. PATENT DOCUMENTS

| | | | |
|---|---|---|---|
| 3,335,327 | 8/1967 | Damon et al. | 361/403 |
| 3,502,905 | 3/1970 | Bicking | 307/570 |
| 3,846,971 | 11/1974 | Ho et al. | 368/88 |
| 3,859,638 | 1/1975 | Hume, Jr. | 365/229 |
| 3,986,051 | 10/1976 | Okada et al. | 307/296.1 |
| 3,996,735 | 12/1976 | Zurcher | 368/88 |
| 4,007,355 | 2/1977 | Moreno | 235/492 |
| 4,048,478 | 9/1977 | Miwa et al. | 377/15 |
| 4,053,688 | 10/1977 | Perkins et al. | 368/88 |
| 4,064,689 | 12/1977 | Yasuda et al. | 368/88 |
| 4,084,236 | 4/1978 | Chelberg et al. | 364/800 |
| 4,086,752 | 5/1978 | Kishimoto | 368/88 |
| 4,140,930 | 2/1979 | Tanaka | 307/272.3 |
| 4,142,114 | 2/1979 | Green | 307/296.8 |
| 4,168,531 | 9/1979 | Eichelberger et al. | 377/26 |
| 4,169,642 | 10/1979 | Mouissie | 361/383 X |
| 4,196,577 | 4/1980 | Ohno et al. | 368/82 |
| 4,211,919 | 7/1980 | Ugon | 235/488 |
| 4,239,558 | 12/1980 | Morishita et al. | 148/175 |
| 4,272,838 | 6/1981 | Kasama et al. | 368/88 |
| 4,363,125 | 12/1982 | Brewer et al. | 371/71 |
| 4,399,524 | 8/1983 | Mugurama | 365/229 |
| 4,400,711 | 8/1983 | Avery | 357/48 |

(List continued on next page.)

FOREIGN PATENT DOCUMENTS

| | | | |
|---|---|---|---|
| 0147099 | 3/1985 | European Pat. Off. | 235/492 |
| 5267674 | 6/1977 | Japan | 368/88 |
| 62-125659 | 6/1987 | Japan | 357/48 |
| 63-190374 | 8/1988 | Japan | 357/48 |

OTHER PUBLICATIONS

Sedra, Adel S. and Kenneth C. Smith, Microelectronic Circuits, 1982, p. 358.
Aoki, et al. FAM 16.1: A.1.5.V DRAM for Battery–Based Applications, 1989 IEEE International Solid–State Circuits Conference Digest of Technical Papers, pp. 238, 239, 349.
IBM Tech., Disc. Bul. vo. 19, No. 8, Jan. 1972 "Bouncing Switch Output to Single–Pulse Converter in 4–phase logic" Radzik 307 542.1.

*Primary Examiner*—Donald T. Hajec
*Assistant Examiner*—Thien Minh Le

[57] ABSTRACT

A circuit positioned in a substantially token-shaped body, the circuit that comprises (a) a serial port to receive and transmit information following a write signal, a read signal, and a program signal; (b) a scratchpad memory coupled to the serial port to hold information that is received or transmitted; (c) an electrically programmable memory coupled to the scratchpad memory; (d) program port to receive program information and program the electrically programmable memory, said program port deriving all voltages necessary to program said electrically programmable memory from said program signal; and (e) control logic coupled to the serial port and the scratchpad memory and the electrically programmable memory, the control logic transfers information to and from the scratchpad memory to the electrically programmable memory as a block pursuant to a block transfer command received at the serial port. The memory subsections comprise a block of memory that can redirects data requests to other locations in the memory subsections and can be write protected by protecting information found in the block and/or by preventing the block from being redirected.

43 Claims, 43 Drawing Sheets

U.S. PATENT DOCUMENTS

| | | | |
|---|---|---|---|
| 4,426,159 | 1/1984 | Kosaka et al. | 368/88 |
| 4,471,345 | 9/1984 | Barrett, Jr. | 340/825.32 X |
| 4,472,215 | 9/1984 | Daughters et al. | 235/48.7 |
| 4,473,825 | 9/1984 | Walton | 340/825.54 |
| 4,475,178 | 10/1984 | Kinoshika | 365/203 |
| 4,480,178 | 10/1984 | Miller et al. | 235/380 |
| 4,486,770 | 12/1984 | Woodward | 357/48 |
| 4,511,796 | 4/1985 | Aigo | 235/492 |
| 4,531,064 | 7/1985 | Levine | 377/32 |
| 4,546,455 | 10/1985 | Iwahastic et al. | 365/200 |
| 4,556,958 | 12/1985 | Ugon | 235/4 |
| 4,556,959 | 12/1985 | Ugon | 395/575 |
| 4,583,111 | 4/1986 | Early | 307/303.2 |
| 4,595,941 | 6/1986 | Avery | 357/23.13 |
| 4,616,343 | 10/1986 | Ogawa | 365/203 |
| 4,617,473 | 10/1986 | Bingham | 365/229 |
| 4,618,857 | 10/1986 | Dubois et al. | 307/66 |
| 4,621,190 | 11/1986 | Saito et al. | 235/492 |
| 4,631,567 | 12/1986 | Kokado et al. | 357/23.13 |
| 4,642,667 | 2/1987 | Magee | 357/35 |
| 4,645,943 | 2/1987 | Smith, Jr. et al. | 307/150 |
| 4,658,352 | 4/1987 | Nagasawa | 364/200 |
| 4,682,829 | 7/1987 | Kunkle et al. | 439/70 X |
| 4,683,372 | 7/1987 | Matsumoto | 235/492 |
| 4,688,036 | 8/1987 | Hirano et al. | 340/825.54 X |
| 4,691,202 | 9/1987 | Dume et al. | 340/825.54 |
| 4,709,202 | 11/1987 | Koenck et al. | 340/636 |
| 4,713,555 | 12/1987 | Lee | 307/66 |
| 4,717,817 | 1/1988 | Grass | 235/441 |
| 4,724,427 | 2/1988 | Carroll . | |
| 4,730,121 | 3/1988 | Lee et al. | 307/66 |
| 4,742,470 | 5/1988 | Jueugel | 340/825.54 X |
| 4,748,320 | 5/1988 | Yorimoto et al. | 235/492 |
| 4,767,918 | 8/1988 | Kushima et al. | 235/441 |
| 4,780,707 | 10/1988 | Selker | 235/472 |
| 4,800,590 | 1/1989 | Vaughan | 380/25 |
| 4,809,221 | 2/1989 | Magliocco et al. | 377/44 |
| 4,810,975 | 3/1989 | Dias | 331/78 |
| 4,815,112 | 3/1989 | Kuze | 377/26 |
| 4,816,656 | 3/1989 | Nakano et al. | 235/380 |
| 4,827,478 | 5/1989 | Chan | 371/38 |
| 4,833,350 | 5/1989 | Frisch | 307/475 |
| 4,845,351 | 7/1989 | Hara et al. | 235/492 |
| 4,845,609 | 7/1989 | Lighthurt et al. | 395/425 |
| 4,853,560 | 8/1989 | Iwamura et al. | 307/475 X |
| 4,855,690 | 8/1989 | Dias | 331/78 |
| 4,855,803 | 8/1989 | Azumai et al. | 365/96 X |
| 4,862,310 | 8/1989 | Harrington, III | 357/48 |
| 4,862,501 | 8/1989 | Kamitake et al. | 380/50 |
| 4,868,409 | 9/1989 | Tanaka et al. | 70/278 |
| 4,870,401 | 9/1989 | Lee et al. | 340/825.31 |
| 4,871,982 | 10/1989 | Williams et al. | 331/75 |
| 4,874,965 | 10/1989 | Compardo et al. | 307/279 |
| 4,878,220 | 10/1989 | Hashimoto | 371/40.1 |
| 4,882,474 | 11/1989 | Anderl et al. | 235/492 |
| 4,885,788 | 12/1989 | Takagari et al. | 380/23 |
| 4,887,234 | 12/1989 | Iijima | 395/425 |
| 4,887,292 | 12/1989 | Barrett et al. | 379/103 |
| 4,897,564 | 1/1990 | Chen | 307/475 |
| 4,899,036 | 2/1990 | McCrindle et al. | 235/492 X |
| 4,902,237 | 2/1990 | Heutson | 361/405 X |
| 4,908,790 | 3/1990 | Little et al. | 365/229 |
| 4,912,435 | 3/1990 | Williams et al. | 331/75 |
| 4,928,000 | 5/1990 | Eglise et al. | 235/380 |
| 4,928,001 | 5/1990 | Masada | 235/380 |
| 4,935,899 | 6/1990 | Morigami | 365/200 |
| 4,943,804 | 7/1990 | Lee et al. | 340/825.34 |
| 4,947,163 | 8/1990 | Henderson et al. | 340/825.31 |
| 4,948,954 | 8/1990 | Dias | 235/492 X |
| 4,967,108 | 10/1990 | Lee et al. | 307/556 |
| 4,970,408 | 11/1990 | Hanke et al. | 307/272.3 |
| 4,980,746 | 12/1990 | Harrington, III | 357/48 |
| 4,982,371 | 1/1991 | Bolan et al. | 365/228 |
| 4,982,892 | 1/1991 | Darla et al. | 174/261 X |
| 4,984,291 | 1/1991 | Dias et al. | 455/343 |
| 4,988,987 | 1/1991 | Barrett et al. | 340/825.21 |
| 4,989,261 | 1/1991 | Lee | 455/127 |
| 4,995,004 | 2/1991 | Lee | 365/189.11 |
| 5,010,331 | 4/1991 | Dias et al. | 340/825.31 |
| 5,013,898 | 5/1991 | Glasspool | 235/449 |
| 5,019,736 | 5/1991 | Furtek | 307/303.2 |
| 5,027,008 | 6/1991 | Runaldue | 307/272.3 |
| 5,032,708 | 7/1991 | Comerford et al. | 235/492 |
| 5,038,299 | 8/1991 | Maeda | 364/519 |
| 5,039,875 | 8/1991 | Chang | 307/272.3 |
| 5,045,675 | 9/1991 | Curry | 235/441 |
| 5,049,728 | 9/1991 | Rovin | 235/492 X |
| 5,051,897 | 9/1991 | Yamaguchi et al. | 364/800 |
| 5,111,058 | 5/1992 | Martin | 365/229 |
| 5,121,359 | 6/1992 | Steele | 365/229 |
| 5,151,622 | 9/1992 | Thrower et al. | 307/451 X |
| 5,177,742 | 1/1993 | Herzberger | 370/112 |
| 5,179,298 | 1/1993 | Hirano et al. | 307/443 |
| 5,252,812 | 10/1993 | Nakamura | 235/492 |
| 5,276,367 | 1/1994 | Maekawa | 307/443 X |

| 8-BIT CRC CODE | | 48-BIT SERIAL NUMBER | | 8-BIT FAMILY CODE (0BH) | |
|---|---|---|---|---|---|
| MSB | LSB | MSB | LSB | MSB | LSB |

POLYNOMIAL = $X^{16} + X^{15} + X^2 + 1$

A) OPEN DRAIN

B) STANDARD TTL

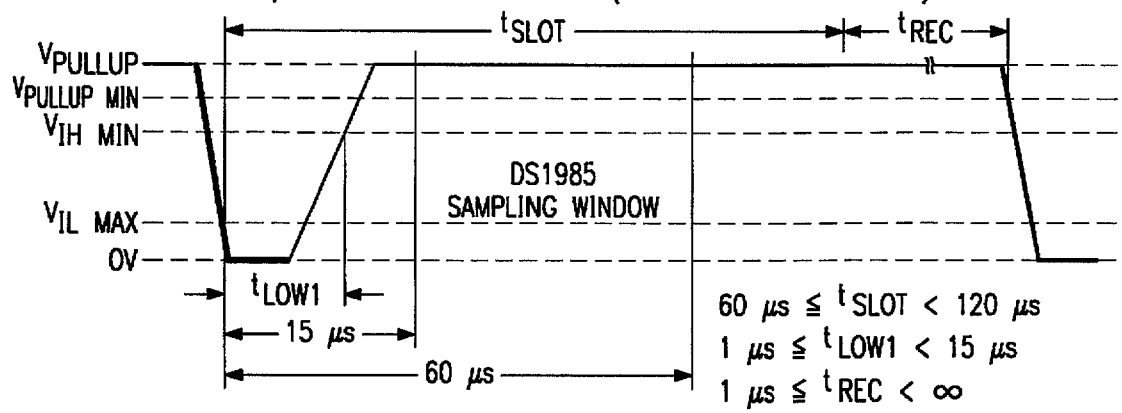
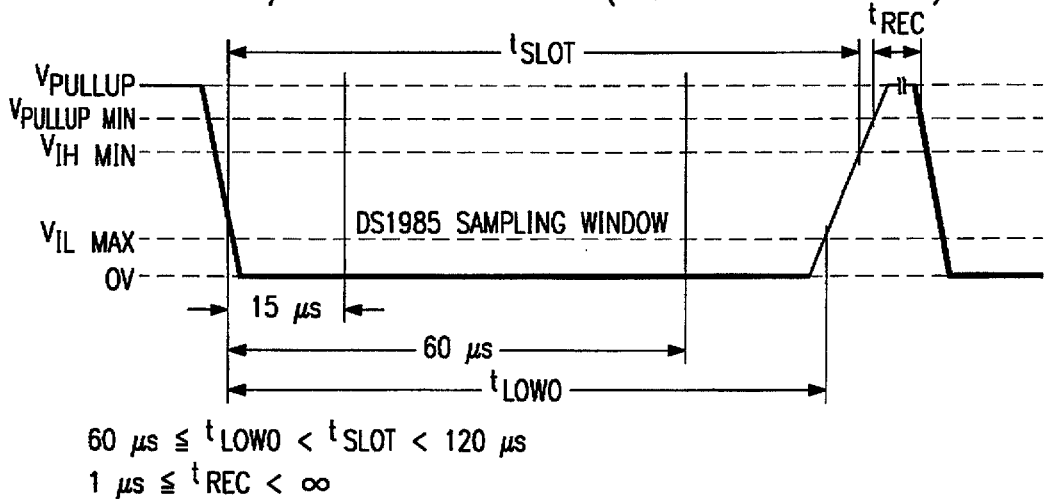
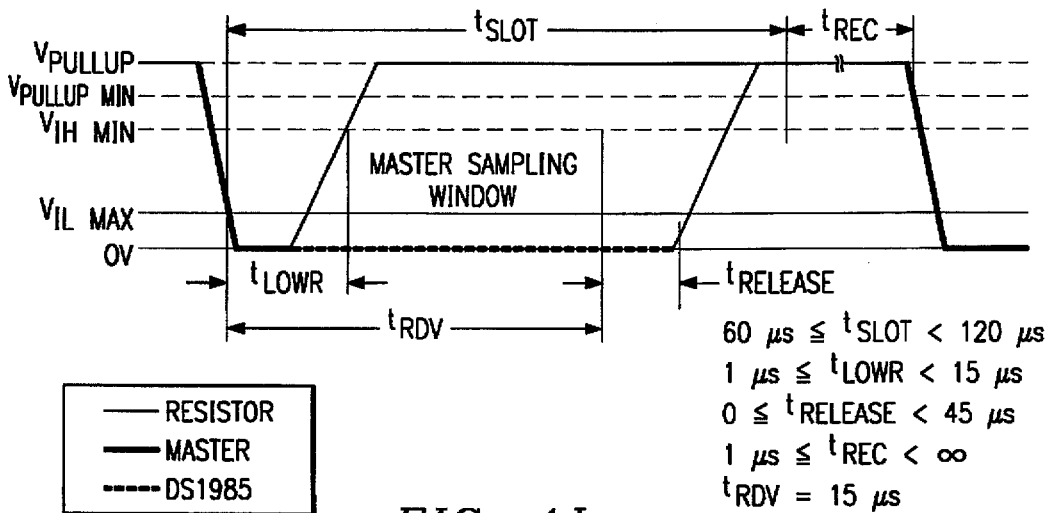
FIG. 1L

480 μs ≤ $t_{RSTL}$ < ∞
480 μs ≤ $t_{RSTH}$ < ∞ (INCLUDES RECOVERY TIME)
15 μs ≤ $t_{PDH}$ < 60 μs
60 μs ≤ $t_{PDL}$ < 240 μs

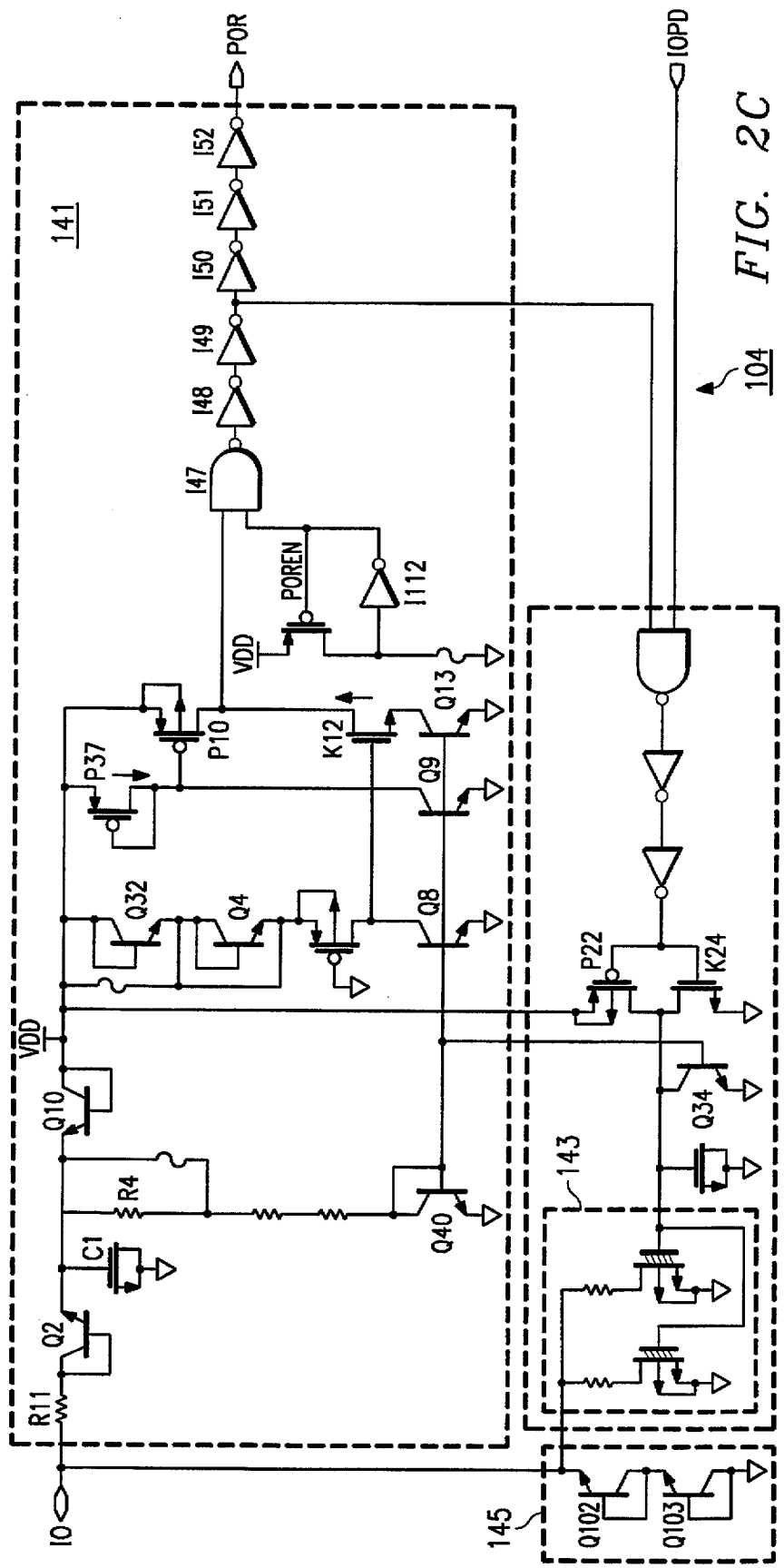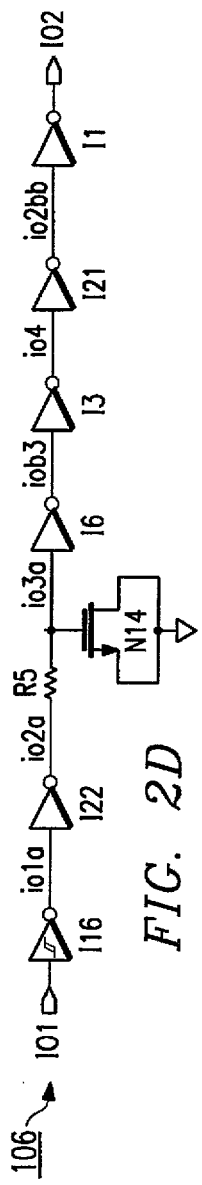
FIG. 2C
FIG. 2D

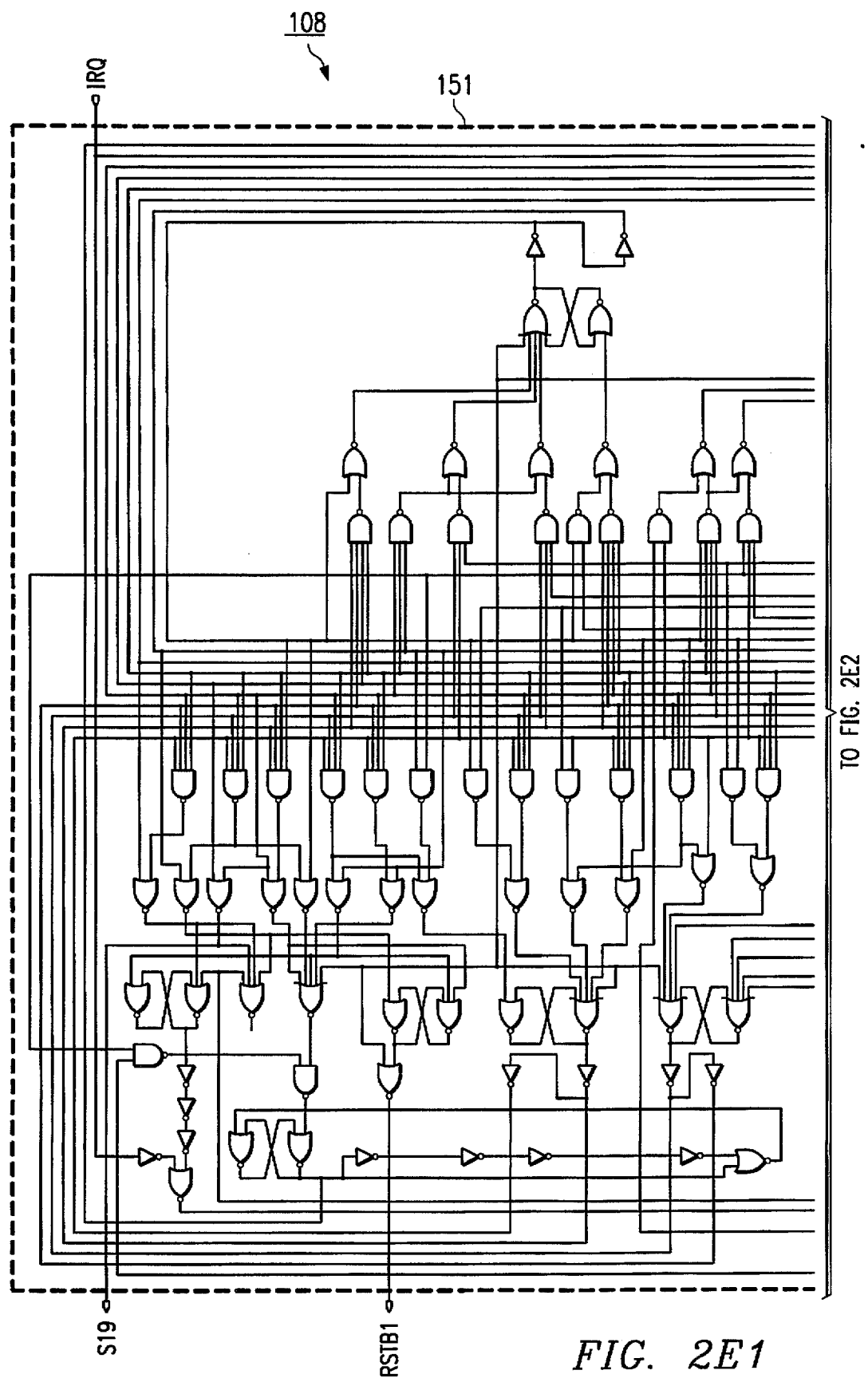
FIG. 2E1

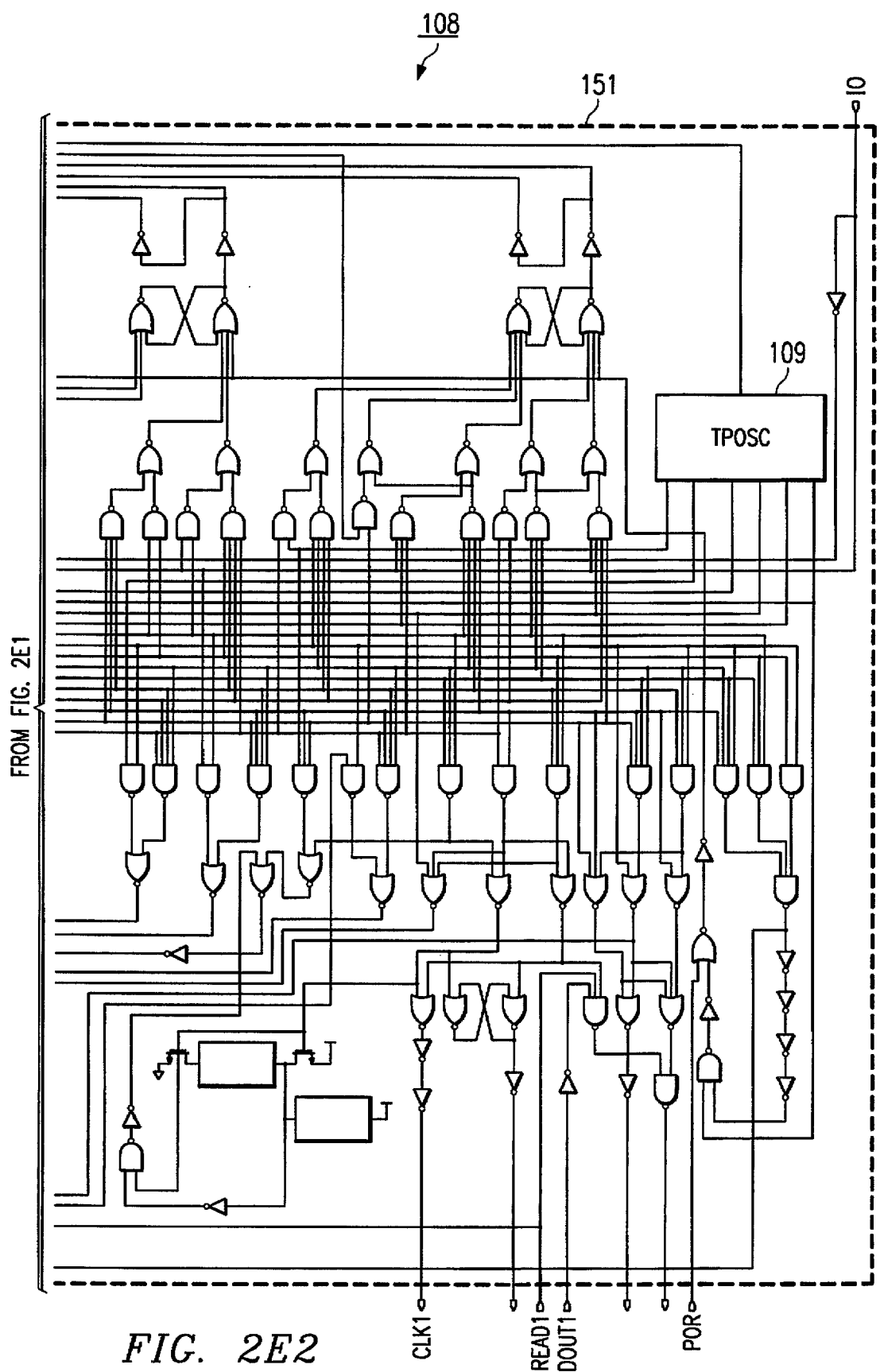
FIG. 2E2

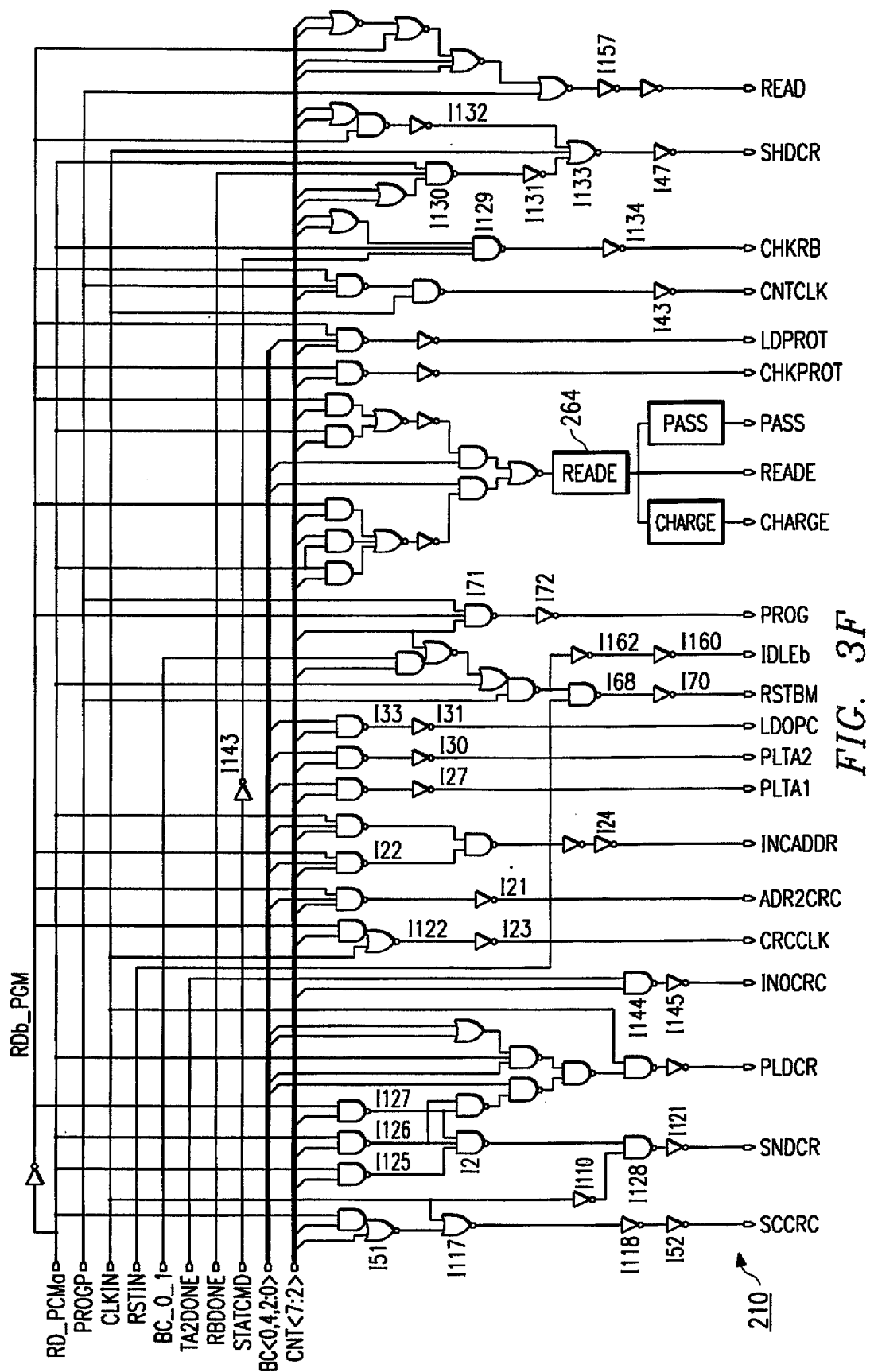

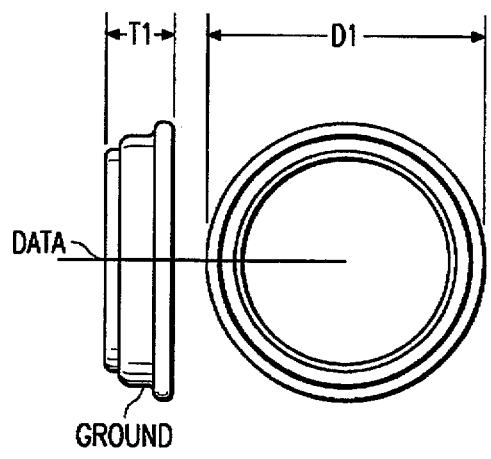 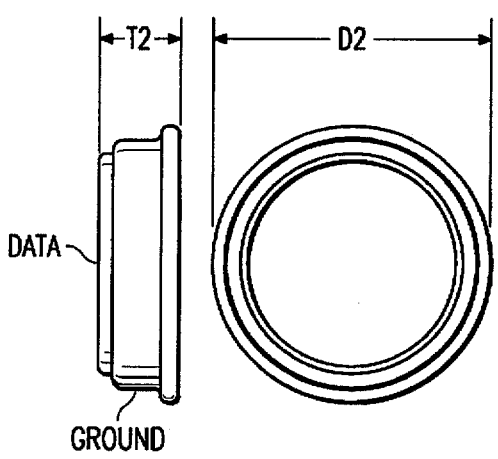
FIG. 5A
FIG. 5B
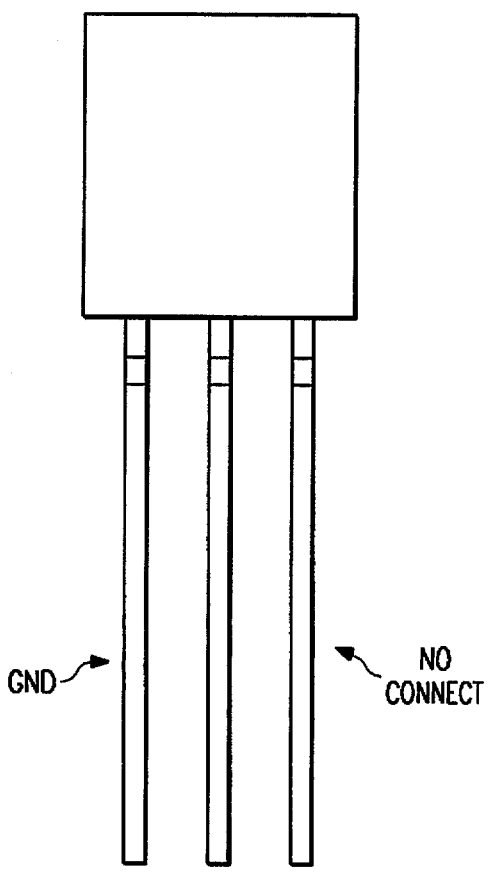 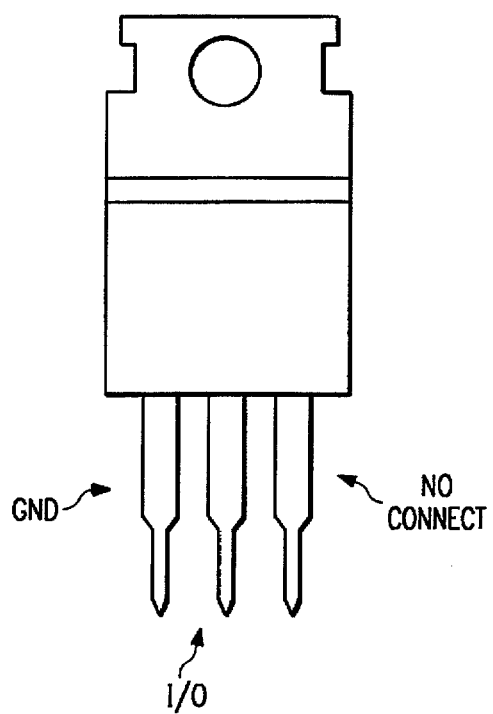
FIG. 6A
FIG. 6B

PORTABLE ELECTRONIC MODULE HAVING EPROM MEMORY, SYSTEMS AND PROCESSES

CROSS-REFERENCE TO RELATED APPLICATIONS

The application is a continuation-in-part of co-assigned, copending patent application entitled "Portable Electronic Module having EPROM Memory, Systems and Processes", that has U.S. Ser. No. 08/262,071, which was filed on Jun. 15, 1994, by Brad Harrington, Hal Kurkowski, and James P. Cusey. This application hereby incorporates by reference the following co-assigned issued patents and patent applications, which describe in great detail the operation of the technology surrounding Touch Memory™ processes and systems, which was developed by employees at Dallas Semiconductor Corporation:

| U.S. Pat. No. | Filing Date/ Issue Date | DSC Case No. | Authors |
|---|---|---|---|
| 4,862,310 | 04-29-88/08-29-89 | DSC-77 | Harrington |
| 5,210,846 | 05-15-89/05-11-93 | DSC-83 | Lee |
| 08/019,932 | 02-19-93 | DSC-83A | Lee |
| 4,982,371 | 05-15-89/01-01-91 | DSC-85 | Lee at al. |
| 07/632,227 | 12-20-90 | DSC-85A | Lee et al. |
| 5,091,771 | 05-15-89/11-18-91 | DSC-86 | Bolan et al. |
| 4,972,377 | 05-15-89/11-20-90 | DSC-107 | Lee |
| 5,191,554 | 08-27-91/03-02-93 | DSC-107A | Lee |
| 5,181,091 | 09-16-91/01-19-93 | DSC-153A | Harrington et al. |
| 4,945,217 | 05-15-89/07-31-90 | DSC-157 | Bolan |
| 5,025,141 | 07-17-90/06-18-91 | DSC-157A | Bolan |
| 4,948,954 | 05-15-89/08-14-90 | DSC-158 | Dias |
| 4,983,820 | 08-14-90/01-08-91 | DSC-158A | Dias |
| 5,045,675 | 05-15-89/09-03-91 | DSC-159 | Steve Curry |
| 4,995,004 | 05-15-89/02-19-91 | DSC-160 | Lee |
| 07/657,717 | 02-19-91 | DSC-160A | Lee |
| 07/725,793 | 07-09-91 | DSC-175 | Curry et al. |
| 07/998,978 | 12-30-92 | DSC-175A | Curry et al. |
| 07/527,492 | 05-22-90 | DSC-268 | Bolan et al. |
| 5,206,905 | 11-19-90/04-27-93 | DSC-303 | Lee et al. |
| 07/615,615 | 11-19-90 | DSC-304 | Lee et al. |
| 5,226,137 | 11-19-90/07-06-93 | DSC-305 | Lee et al. |
| 07/882,244 | 05-08-92 | DSC-306 | Lee |
| 07/631,929 | 12-19-90 | DSC-316 | Curry et al. |
| 07/728,230 | 07-10-91 | DSC-317 | Pearson et al. |
| 07/727,618 | 07-10-91 | DSC-319 | Williams et al. |
| 07/727,619 | 07-10-91 | DSC-322 | Rodriguez et al. |
| 07/727,638 | 07-10-91 | DSC-324 | Ni et al. |
| 08/103,724 | 08-09-93 | DSC-352 | Pearson et al. |
| 07/727,639 | 07-10-91 | DSC-353 | Bolan et al. |
| 5,166,545 | 07-10-91/11-24-92 | DSC-356 | Harrington |
| 08/022,258 | 02-14-93 | DSC-377 | Bolan et al. |
| 08/031,176 | 03-15-93 | DSC-377A | Bolan et al. |
| 08/015,566 | 02/09/93 | DSC-393 | Harrington et al. |
| 08/234,210 | 04/28/94 | DSC-427 | Fekete et al. |
|  | 05/24/94 | DSC-408 | Curry et al. |

In addition, Applicants also incorporate by reference the Appendix A, which includes the DC and AC electrical characteristics for preferred embodiments.

FIELD OF INVENTION

The present invention relates to electronic devices, and, more particularly, to portable semiconductor circuits.

SUMMARY OF THE INVENTIONS

The present invention relates to compact electronic modules and to components and packaging for use with such modules. The numerous innovations disclosed herein are believed to contribute a major advance in this direction.

Generally, a circuit positioned in a substantially token-shaped body having at least one conductive surface, the circuit comprises a serial port electrically coupled to the at least one conductive surface to receive and transmit information, which follows a write signal, a read signal, and a program signal, a scratchpad memory coupled to the serial port to hold information that is received or transmitted, an electrically programmable memory coupled to the scratchpad memory, a program port to receive program information and program the electrically programmable memory, which derives all voltages necessary to program the electrically programmable memory from the program signal; and control logic coupled to the serial port and the scratchpad memory and the electrically programmable memory, the control logic transfers information to and from the scratchpad memory to the electrically programmable memory as a block (e.g., 8 bits) pursuant to a block transfer command received at the serial port. The serial port and the program port are combined into a single port, so that all signals corresponding to receiving and transmitting information are multiplexed together on a single data line. The electrically programmable memory is also a read only memory. The memory subsections comprise a block of memory. The block of memory may redirect data requests to other locations in the memory subsections and can be write protected by protecting information found in the block and/or by preventing the block from being redirected.

The electronic token preferably has a first electrically conductive surface and a second electrically conductive surface that combine to create a hollow cavity. The serial port, the scratchpad memory, the program port, the electrically programmable memory, and the control logic are positioned inside the hollow cavity. The first conductive surface and the second conductive surface can be electrically coupled to transmit electrical signals generated by said serial port, the scratchpad memory, the program port, the electrically programmable memory, the control logic. The first and second conductive surface also work together to receive externally generated electrical signals. Portions of the first electrically conductive surface and the second electrically conductive surface are preferably planar. The control logic allows access to a generated cyclic redundancy check value. The serial port, the scratchpad memory, the electrically programmable memory and the control logic may also be combined into an integrated circuit that is mounted on a very small printed circuit board. The scratchpad memory has a first size and the electrically programmable memory has a second size (e.g., 16K bits).

A bus master module may also be coupled to the serial port and controls communication to and from the serial port. The bus master module holds a data line to a first voltage level for a first time period, creates a transition between the first voltage level and a second voltage level, holds the data line at the second voltage for a second time period; and samples the voltage level of the data line to determine whether the data value is a first data value or a second data value at a first sample time. The first time period is at least one microsecond. The first voltage is approximately five volts and corresponds to a logic high level. The voltage level differences are approximately 5 volts and are created by a first voltage level and a second voltage level, the first and second voltage levels correspond to a logical high and a logical low. The second voltage is approximately ground and corresponds to a logic low level. The transition provides a coordinating time from which the memory coordinates internal operations. The second time period is at least one microsecond. The first sample time is at least 30 microseconds from the transition. The master bus module holds a data line coupled to the serial port via a first electrically conductive surface to a first voltage level for a first time period, creates a transition between the first voltage level and a second voltage level, holds the first data line to the second voltage for a second time period, and samples the voltage level of the data line by the master bus module to determine whether the data value is a first data value or a second data value at a first time. Higher voltages on the first and second conductive surface are used to indicate a program state and program signals. Similar communication protocol applies to these signals as well.

The electrically programmable memory is divided into a plurality of memory subsections, all of which are coupled to the scratchpad memory and the control logic. The control logic transfers information to and from the scratchpad memory to the plurality of memory subsections of the electrically programmable memory as a block pursuant to a block transfer command received at the serial port. At least four memory subsections comprise the plurality of memory. The serial port, the scratchpad memory, the electrically programmable memory and the control logic are preferably powered by voltage intermittently applied between the first and second electrically conductive surface areas. Preferred embodiments also have a capacitor for storing energy from the voltage intermittently applied between the first and second electrically conductive surface areas. The serial port, the scratchpad memory, the electrically programmable memory and the control logic are preferably integrated on a monolithic piece of silicon. The serial port, the scratchpad memory, the electrically programmable memory and the control logic are preferably packaged in a low-height package that is selected from the group consisting of a flat pack and small out-line integrated circuit, and any combination thereof.

Regarding the token, which is preferably comprised of metal, the first electrically conductive surface comprises a first flat face and the second electrically conductive surface comprises a second flat face parallel to the first flat face; and a portion of a first electrically conductive surface which is approximately perpendicular to the first flat face and the second flat face. The substantially token-shaped body may be comprised of only the first and second electrically conductive surface. The substantially token-shaped body is approximately 6 mm in diameter and approximately 3 mm thick. The substantially token-shaped body is preferably button-shaped and has a flange extending from a perimeter of the substantially token-shaped body. The substantially token-shaped body is preferably mountable to a physical item. While potential items are numerous, the item is selected from the group consisting of maintenance records, retail products, machinery, cards, personnel identification badges, and any combination thereof. The substantially token-shaped body is comprised of metal.

Preferred embodiments also have a voltage level detector coupled to the first and second areas for receiving signals applied as voltage level differences between the first and second electrically conductive surface areas; and a switch connecting the first and second electrically conductive surface areas for sending signals by changing a resistance between the first and second electrically conductive surfaces. A voltage level detector is also coupled to the first and second areas for receiving signals applied as voltage level differences between the first and second electrically conductive surface areas, the voltage level differences interpreted by the program port and used to program the electrically programmable memory. The electrically programmable memory comprises at least one memory cell, each memory cell comprising a first transistor having a gate, source and drain, the circuit further comprising a voltage clamping circuit that directs and adjust a first and second voltage to the gate and the drain, both of which have been derived from a program voltage received by the program port. The single port comprises a voltage switch circuit detects voltage differences received at the single port and interprets the voltage difference to determine whether it should be directed to reading the electrically programmable memory or to programming the electrically programmable memory. If the voltage switch determines the voltage difference should be used to program the electrically programmable memory, the voltage switch activates circuitry to adjust the voltage difference to run other circuitry comprised in the circuit.

Similarly, blocks of memory in the electrically programmable memory can also be used to redirect data requests to other locations in the electrically programmable memory. In particular, the memory subsections comprise a block of memory, the block of memory redirects data requests to other locations in the memory subsections. A protection circuit exists to protect the scratchpad memory, the electrically programmable memory coupled to the scratchpad memory, and the control logic from electrostatic discharge.

There are numerous advantages to the inventions described herein. First, 16,384-bits Electrically Programmable Read Only Memory (EPROM) communicates with the economy of one signal plus ground. EPROM partitioned into 64 256-bit pages for randomly accessing packetized data records, each of which can be permanently write-protected to prevent tampering. As a result, preferred system embodiments provide "add only" memory where additional data can be programmed into EPROM without disturbing existing data. The architecture of preferred system embodiments allows software to patch data by redirecting an old page in favor of a newly programmed page. Preferred system embodiments reduce control, address, data, power, and programming signals to a single data pin. An 8-bit family code specifies communications requirements to the reader. Preferred system embodiments read over a wide voltage range of 2.8V to 6.0V from −40° C. to +85° C.; program at 11.5V±0.5V from −20° C. to 50° C.

In addition, preferred system embodiments also implement common Touch Memory™ features that are described in detail in the patents and patent applications incorporated by reference hereinabove. In particular, unique, factory-lasered and tested 64-bit registration numbers (8-bit family code+48-bit serial number 8-bit CRC tester) assure absolute traceability because no two parts are alike. In addition, preferred embodiments provide digital identification and information by momentary contact and chip-based data carrier compactly stores information while data can be accessed while affixed to object. Preferred embodiments economically communicate to bus master with a single digital signal at 16.3k bits per second. Standard 16 mm diameter and 1-Wire protocol ensure compatibility with Touch Memory™ family of products manufactured by Dallas Semiconductor Corporation. The button shape is self-aligning with cup-shaped probes and the durable stainless steel case engraved with registration number withstands harsh environments. Preferred embodiments are easily affixed with self-stick adhesive backing, latched by its flange, or locked with a ring pressed onto its rim. Presence detector acknowledges when reader first applies voltage. Preferred embodiments are expected to meet UL#913 (4th Edit.); Intrinsically Safe Apparatus, Approved under Entity Concept for use in Class 1, Division 1, Group A, B, C and D Locations.

BRIEF DESCRIPTION OF THE DRAWINGS

Further features and advantages will become apparent from the following and more particular description of the various embodiments of the invention, as illustrated in the accompanying drawings, wherein:

FIG. 1I is a memory map showing the 16,384-bit EPROM section of preferred system embodiments that are configured as multiple pages of 32 bytes each;

FIG. 1J is a circuit diagram showing the actual circuit which an equivalent circuit is shown in FIG. 1A, which shows an open drain part;

FIG. 1K is a set of two circuit diagrams for bus master circuit module 26 in an open drain formulation and a standard TTL formulation;

FIG. 1L is a series of timing diagrams showing, inter alia, the definitions of read/Write Time Slots;

FIG. 1O is a block diagram showing the architecture of a preferred embodiment of device 10, which generally comprises input/output ("IO") module 100 coupled to control ("CNTL") module 200, which are both coupled to EPROM memory ("EPROM") module 300;

FIG. 2C is a schematic showing the actual circuitry of a preferred embodiment of I/O PULLDOWN POR module 104, which, in turn, comprises power on reset circuitry 141, open drain output circuitry 143, and double stack ESD diodes 145;

FIG. 2D is a schematic showing the actual circuitry of a preferred embodiment of IOBUF module 106, which buffers and filters transient spikes to the open-drain input signal;

FIG. 2E1 and 2E2 is a schematic showing the actual circuitry of a preferred embodiment of ATOS module 108, which implements oscillator overhead and control functions (e.g., the one-wire™ state machine 151 and one-wire™ system clock 109), which has been described in the reference;

FIG. 3F is a schematic showing the actual circuitry of a preferred embodiment of CONTROL LOGIC module 210, which decodes the state count to generate the actual signals required to perform the correct operations;

FIG. 5A and 5B show preferred conductive modules in which the circuitry shown and described above is placed; and FIGS. 6A and 6B show alternate preferred packages that house the circuitry shown and described above.

DETAILED DESCRIPTION OF THE PREFERRED EMBODIMENTS

Preferred system embodiments of the 16K-bit EPROM Touch Memory™ system are rugged read/write data carriers that identify and store relevant information about the product or person to which they are attached. This information can be accessed with minimal hardware, for example a single port pin of a micro-controller. Preferred system embodiments consist of a factory-lasered registration number that include a unique 48-bit serial number, an 8-bit CRC, and an 8-bit Family Code (0Bh) plus 16K-bit of EPROM which is user-programmable. The power to program and read preferred system embodiments is derived entirely from the 1-Wire™ communication line. Data is transferred serially via the 1-Wire™ protocol which requires only a single data lead and a ground return. The entire device can be programmed and then write-protected if desired. Alternatively, unprogrammed portions of the part may be programmed with new data with each subsequent programming of the device. Note that individual bits can be changed only from a logical 1 to a logical 0, never from a logical 0 to a logical 1. A provision is also included for indicating that a certain page or pages of data are no longer valid and have been replaced with new or updated data that is now residing at an alternate page address. This page address redirection allows software to patch data and enhance the flexibility of the device as a standalone database. The 48-bit serial number that is factory-lasered into each preferred system embodiment provides a guaranteed unique identity which allows for absolute traceability. The durable MicroCan™ package is highly resistant to harsh environments such as dirt, moisture, and shock. Its compact button-shaped profile is self-aligning with cup-shaped receptacles, allowing preferred system embodiments to be used easily by human operators or automatic equipment. Accessories permit preferred system embodiments to be mounted on printed circuit boards, plastic key fobs, photo-ID badges, ID bracelets, and many other objects. Applications include work-in-progress tracking, electronic travelers, access control, storage of calibration constants, cartridges, and debit tokens.

Figure 1A:
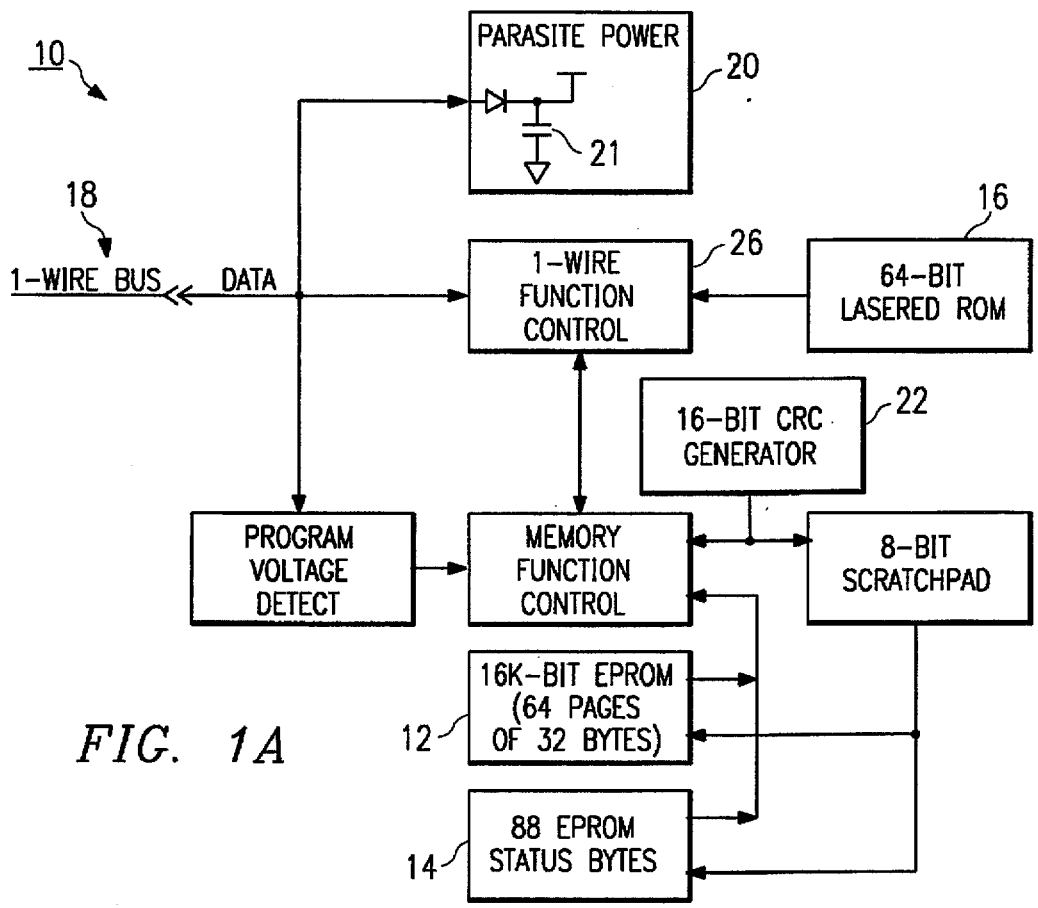
FIG. 1A is a block diagram that shows the relationships between the major control and memory sections of preferred system embodiments.

The block diagram in FIG. 1A shows the relationships between the major control and memory sections of preferred system embodiments 10. Preferred system embodiments 10 generally have three main data components; 1) 64-bit lasered ROM 16, 2) 16,384-bit EPROM 12, and 3) EPROM Status Bytes 14. Device 10 derives its power for read operations entirely from the 1-Wire™ communication line 18 by storing energy on an internal capacitor 21 during periods of time when the signal line is high and continues to operate off of this "parasite" power source during the low times of the 1-Wire line until it returns high to replenish the parasite (capacitor) supply 20. During programming, 1-Wire™ communication occurs at normal voltage levels and then is pulsed momentarily to the programming voltage to cause the selected EPROM bits to be programmed. The 1-Wire™ line must be able to provide 11 volts and 10 milliamperes to adequately program the EPROM portions of the part. Whenever programming voltages are present on the 1-Wire™ line a special high voltage detection circuit within the preferred system embodiment 10 generates an internal logic signal to indicate this condition.

Figure 1B:
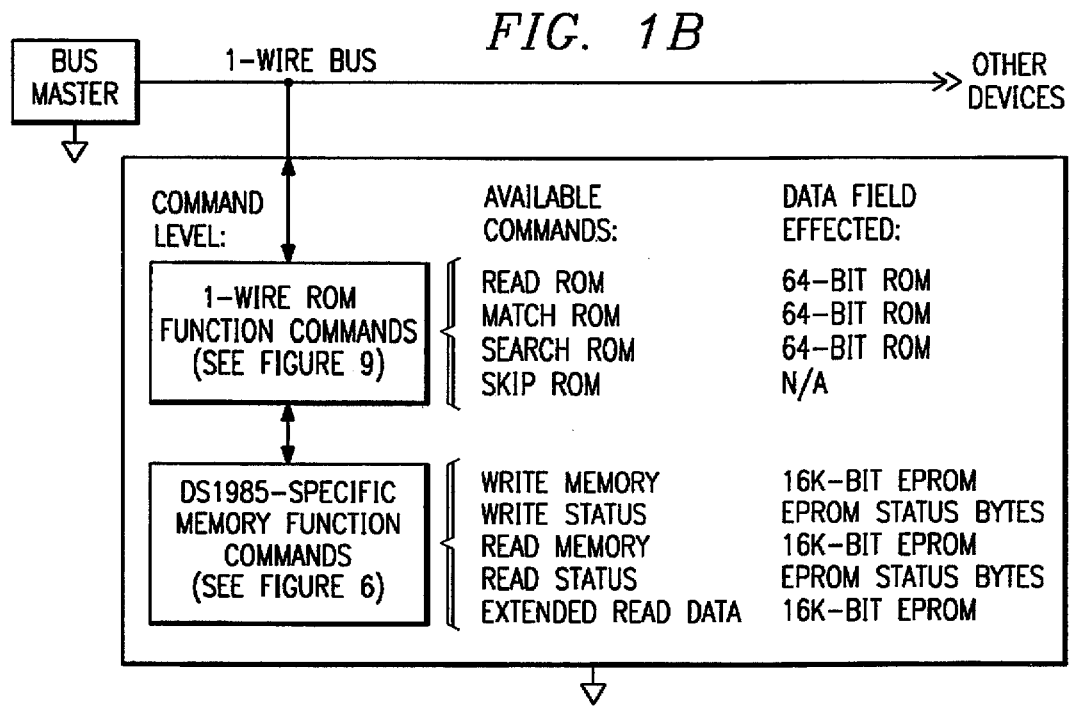
FIG. 1B is an outline showing the hierarchical structure for 1-Wire™ protocol.

The hierarchical structure of the 1-Wire™ protocol is shown in FIG. 1B. The bus master must first provide one of the four ROM Function Commands, 1) Read ROM, 2) Match ROM, 3) Search ROM, 4) Skip ROM. These commands operate on the 64-bit lasered ROM portion of each device and can singulars a specific device if many are present on the 1-Wire™ line as well as indicate to the bus master how many and what types of devices are present. The protocol required for these ROM Function Commands is described in FIG. 1C. After a ROM Function Command is successfully executed, the memory functions that operate on the EPROM portions of the preferred system embodiment become accessible and the bus master may issue any one of the seven Memory Function Commands specific to the preferred system embodiment to read or program the various data fields. The protocol for these Memory Function Commands is described in FIGS. 1D, 1E, and 1F. All data is read and written least significant bit first.

Figure 1C:
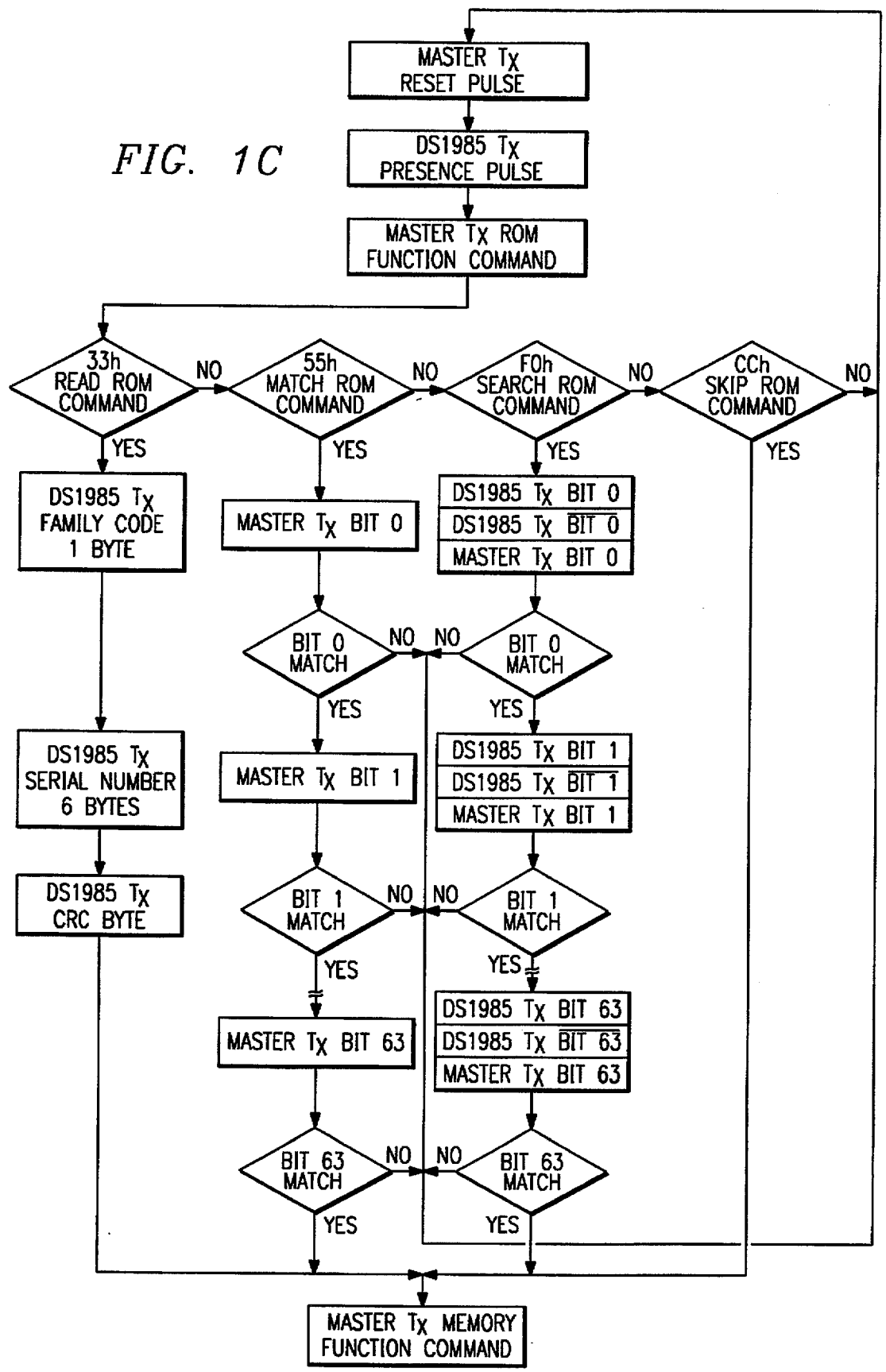
FIG. 1C is a flow chart outlining the protocol required for these ROM Function Commands.
Figure 1D:
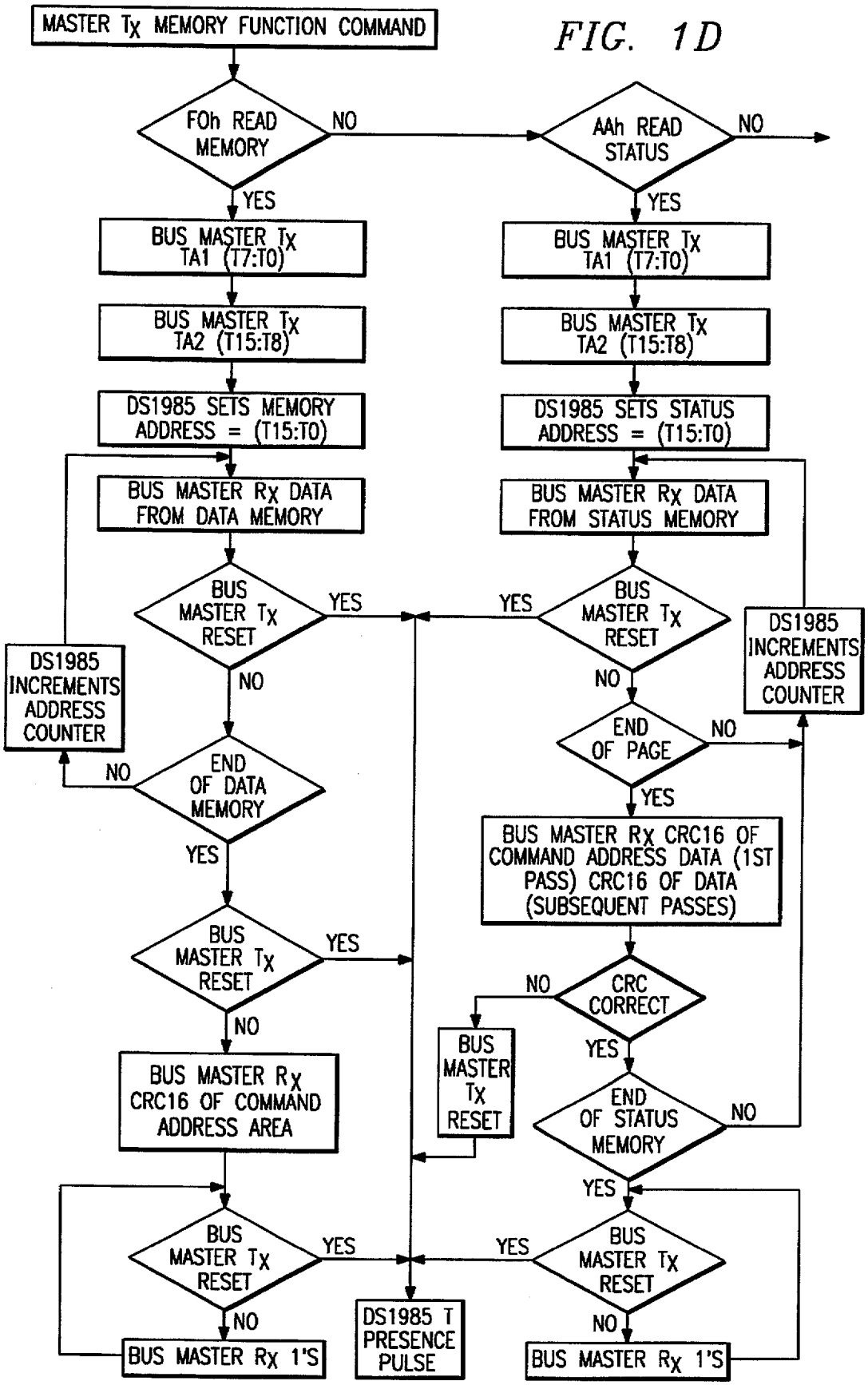
FIGS. 1D, 1E, and 1F is a flow chart outlining the protocol for these Memory Function Commands.
Figure 1E:
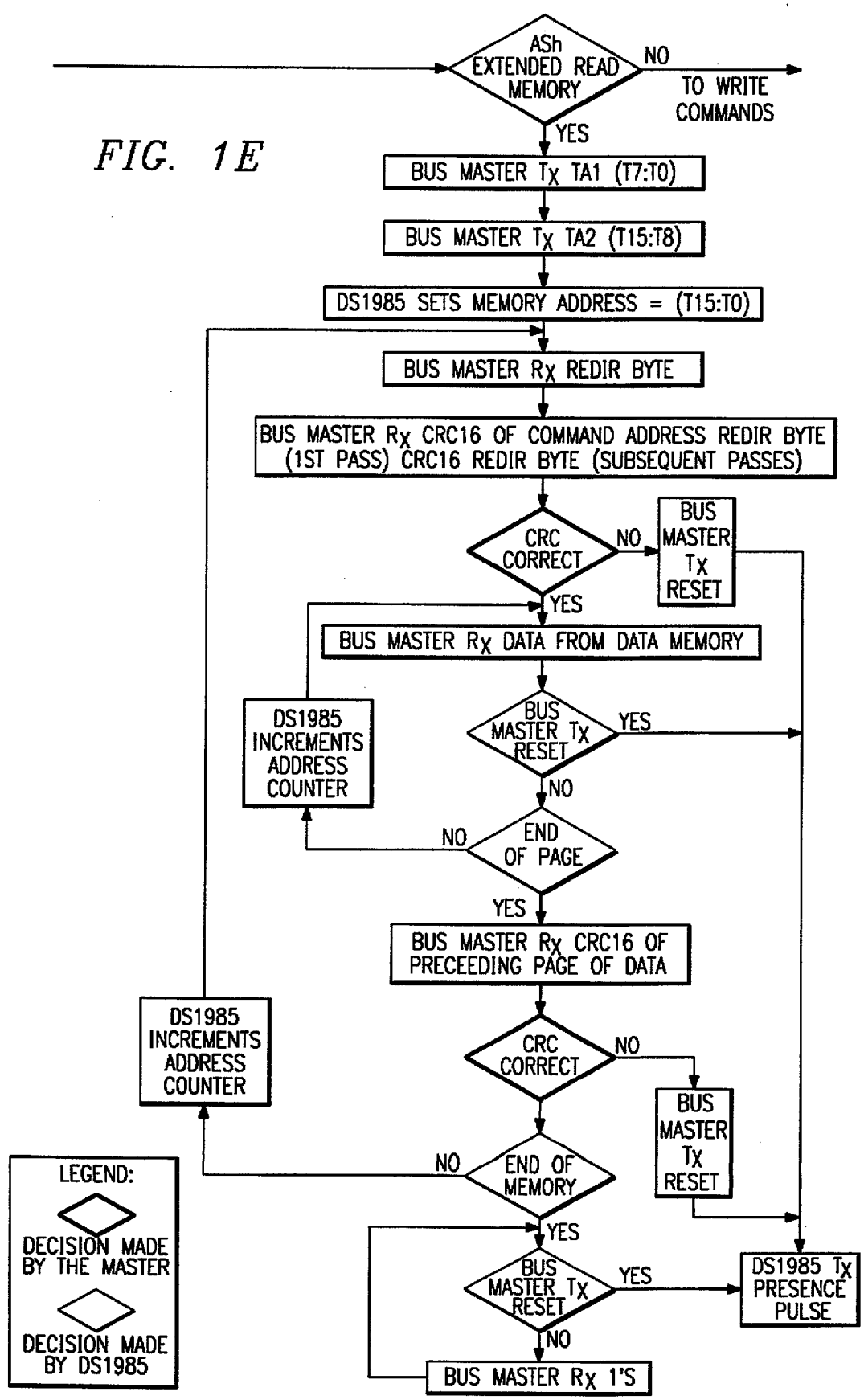
Figure 1F:
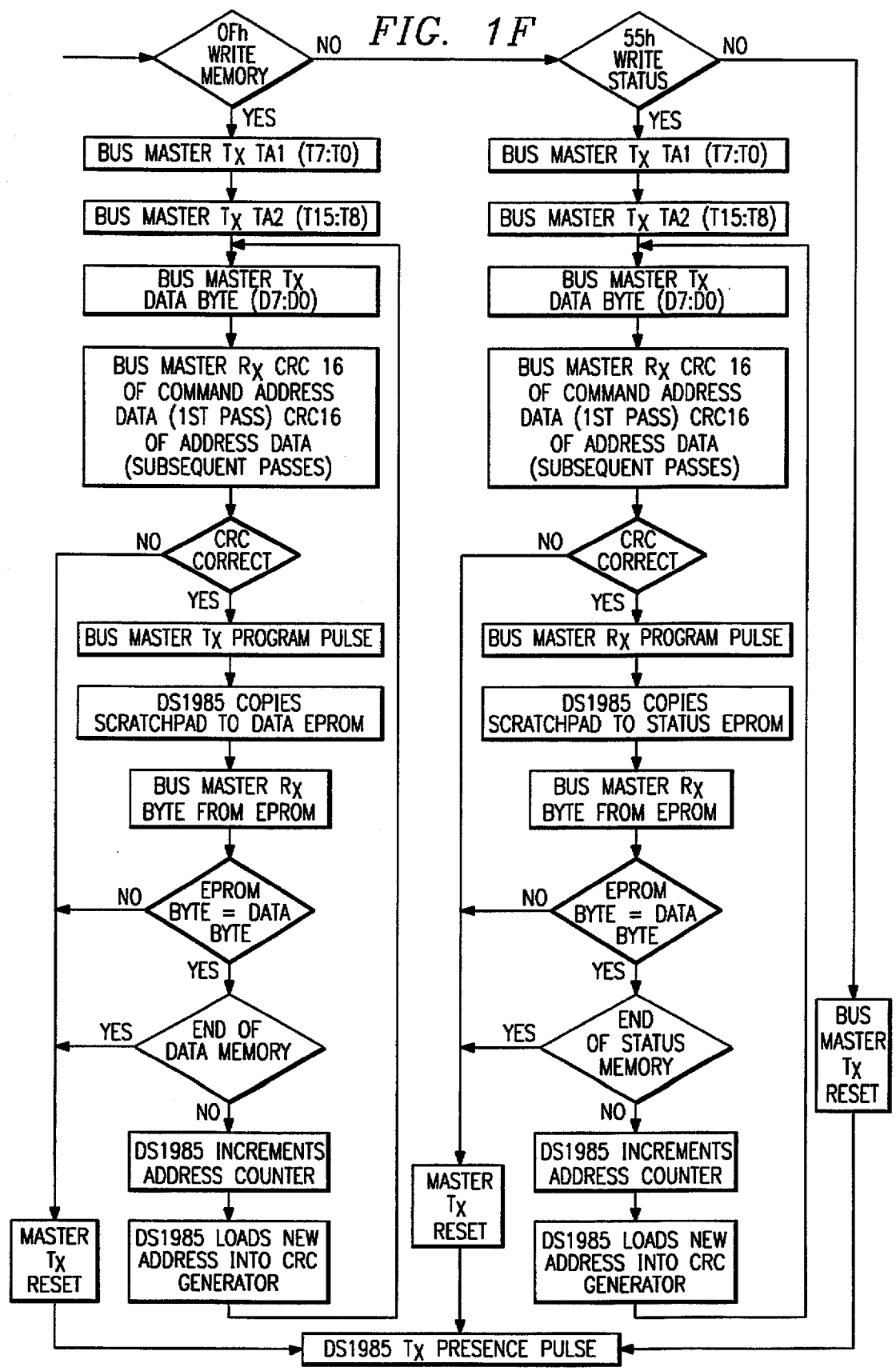
Figures 1G, 1H:
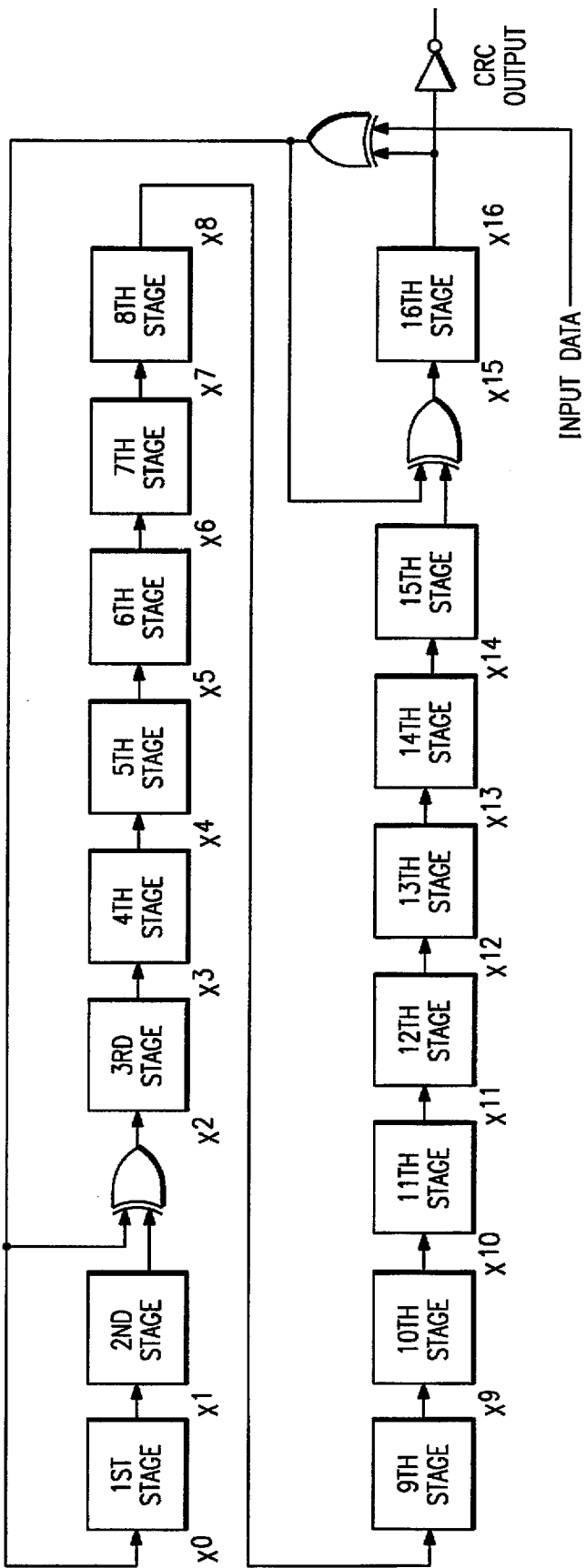
FIG. 1G is a memory map of the 64-Bit Lasered ROM 16 (in FIG. 1A)
FIG. 1H is state diagram of 1-Wire™ CRC Generator 22 (in FIG. 1A)
Figure 11:
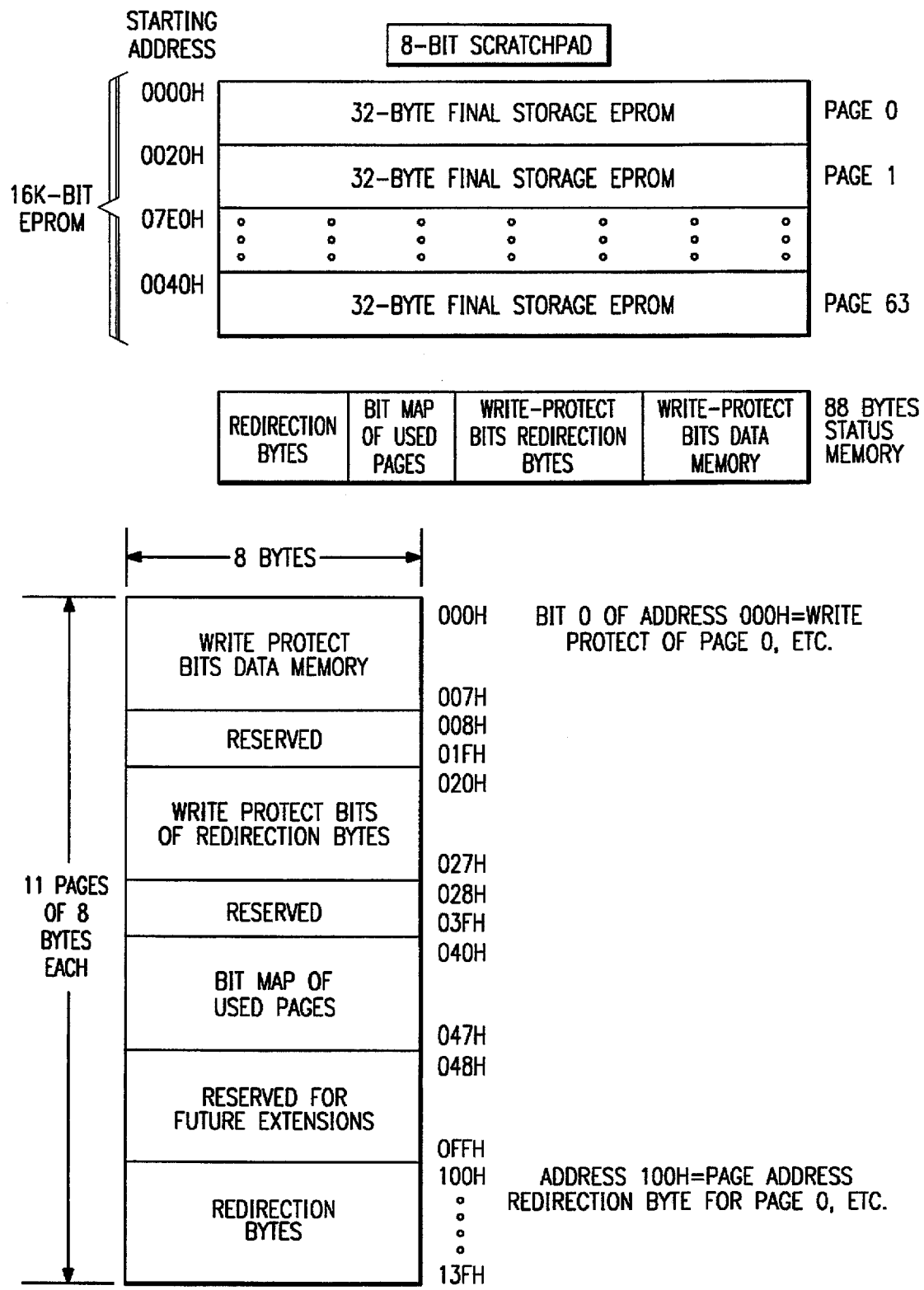

Regarding the 64-bit lasered ROM, each preferred system embodiment contains a unique ROM code that is 64 bits long. The first eight bits are a 1-Wire™ family code. The next 48 bits are a unique serial number. Referring to FIG. 1G, the last eight bits are a CRC of the first 56 bits. The 64-bit ROM and ROM Function Control section allow preferred system embodiments to operate as a 1-Wire™ device and follow the 1-Wire™ protocol detailed below. The memory functions required to read and program the EPROM sections of preferred system embodiments are not accessible until the ROM function protocol has been satisfied. This protocol is described in the ROM functions flow chart (FIG. 1C). The 1-Wire™ bus master must first provide one of four ROM function commands; 1) Read ROM, 2) Match ROM, 3) Search ROM, or 4) Skip ROM. After a ROM function sequence has been successfully executed, the bus master may then provide any one of the memory function commands specific to preferred system embodiments (FIGS. 1D, 1E, and 1F).

The 1-Wire™ CRC of the lasered ROM is generated using the polynomial $X^8+X^5+X^4+1$ (see FIG. 1H). Additional information about the Dallas Semiconductor 1-Wire™ Cycle Redundancy Check is available in the Book of DS19xx Touch Memory Standards, which is incorporated by reference hereinabove and in several of the patents and patent applications incorporated by reference. The shift register acting as the CRC accumulator is initialized to zero. Then starting with the least significant bit of the family code, one bit at a time is shifted in. After the eighth bit of the family code has been entered, then the serial number is entered. After the 48th bit of the serial number has been entered, the shift register contains the CRC value. Shifting in the eight bits of CRC should return the shift register to all zeroes.

Regarding the 16,384-bit EPROM module 12 (in FIG. 1A), the memory map in FIG. 1I shows the 16,384-bit EPROM section of the preferred system embodiment which is configured as 64 pages of 32 bytes each. The 8-bit scratchpad is an additional register that acts as a buffer when programming the memory. Data is first written to the scratchpad and then verified by reading a 16-bit CRC from preferred system embodiments that confirms proper receipt of the data. If the buffer contents are correct, a programming voltage should be applied and the byte of data will be written into the selected address in memory. This process insures data integrity when programming the memory. The details for reading and programming 16,384-bit EPROM portion of preferred system embodiments are given in the Memory Function Commands section.

Regarding EPROM Status Bytes, in addition to the 16,384 bits of data memory the preferred system embodiments provides 704 bits of Status Memory accessible with separate commands.

The EPROM Status Bytes can be read or programmed to indicate various conditions to the software interrogating preferred system embodiments. The first eight bytes of the EPROM Status Memory contains the Write Protect Page bits which inhibit programming of the corresponding page in the 16,384-bit main memory area if the appropriate write protection bit is programmed. Once a bit has been programmed in the Write Protect Page byte, the entire 32 byte page protected by that bit can no longer be altered but may still be read.

The next sequence of bits in the EPROM status memory are the Redirection Protect bits. For every Page Address Redirection Byte (described below) there is one Redirection Protect bit which, if programmed, inhibits attempts to program any bits in the Redirection Byte.

The next sixty-four bytes of the EPROM Status Memory contain the Page Address Redirection Bytes which indicate if one or more of the pages of data in the 16,384-bit EPROM section have been invalidated and redirected to the page address contained in the appropriate redirection byte. The hardware of the preferred system embodiment makes no decisions based on the contents of the Page Address Redirection Bytes. These additional bytes of Status EPROM allow for the redirection of an entire page to another page address, indicating that the data in the original page is no longer considered relevant or valid. With EPROM technology, bits within a page can be changed from a logical 1 to a logical 0 by programming, but cannot be changed back, Therefore, it is not possible to simply rewrite a page if the data requires changing or updating, but with space permitting, an entire page of data can be redirected to another page within preferred system embodiments by programming data Corresponding to the new page address into the Page Address Redirection Byte that corresponds to the original (replaced) page.

This architecture allows the user's software to make a "data patch" to the EPROM by indicating that a particular page or pages should be replaced with those indicated in the Page Address Redirection Bytes.

The Redirection Protect bits allow for traceability of the history of a particular page of data. If, when updating a page of data by redirecting it to a new page, the page of old data is write-protected and the Redirection Bye is write-protected after programming it to reflect the redirected page address, then the complete history of the page may be kept. The capability of protecting a Redirection Byte ensures that every redirection can be traceable—i.e. that redirections cannot be disguised by reprogramming a redirection byte after the fact. The details for reading and programming the EPROM status memories portion of preferred system embodiments is given in the Memory Function Commands section.

Regarding memory function commands, the "Memory Function Flow Chart" (FIG. 1D, 1E, and 1F) describes the protocols necessary for accessing the various data fields within preferred system embodiments. The Memory Function Control section, 8-bit scratchpad, and the Program Voltage Detect circuit combine to interpret the commands issued by the bus master and create the correct control signals within the device. A three-byte protocol is issued by the bus master. It is comprised of a command byte to determine the type of operation and two address bytes to determine the specific starting byte location within a data field. The command byte indicates if the device is to be read or written. Writing data involves not only issuing the correct command sequence but also providing a 12 volt programming voltage at the appropriate times. To execute a write sequence, a byte of data is first loaded into the scratchpad and then programmed into the selected address. Write sequences always occur a byte at a time. To execute a read sequence, the starting address is issued by the bus master and data is read from the part beginning at that initial location and continuing to the end of the selected data field or until a reset sequence is issued. All bits transferred to preferred system embodiments and received back by the bus master are sent least significant bit first.

Regarding READ MEMORY [FOH], the Read Memory command is used to read data from the 16,384-bit EPROM data field. The bus master follows the command byte with a two byte address (TA1=(T7:T0), TA2=(T15:T8)) that indicates a starting byte location within the data field. If reading occurs through the end of memory space, the bus master may issue sixteen additional read time slots and preferred system embodiments will respond with a 16-bit CRC of all data bytes read from the initial starting byte through the last byte of memory. After the CRC is received by the bus master, any subsequent read time slots will appear as logical 1s until a Reset Pulse is issued. Any reads ended by a Reset Pulse prior to reaching the end of the memory will not have the 16-bit CRC available.

Regarding READ STATUS [AAH], the Read Status command is used to read data from the EPROM Status data field. The bus master follows the command byte with a two byte address (TA1=(T7:T0), TA2=(T15:T8)) that indicates a starting byte location within the data field. The bus master issues read time slots and receives data from the preferred system embodiments starting at the supplied address and continuing until the end of an 8-byte EPROM Status page is reached. At that point the bus master will receive an 16-bit CRC that is the result of shifting into the CRC generator all of the data bytes from the initial starting byte through the end of the page. The bus master continues to receive eight EPROM status bytes following by a 16-bit CRC until the end of status memory is reached.

After the 16-bit CRC is read, following the end of status memory, the bus master will receive logical 1s from the preferred system embodiments until a Reset Pulse is issued. The Read Status command sequence can be exited at any point by issuing a Reset Pulse.

Regarding the WRITE MEMORY [OFH] command, the Write Memory command is used to program the 16,384-bit EPROM data field. The bus master will follow the command byte with a two byte starting address (TA1=(T7:T0), TA2=(T15:T8)) and a byte of data (D7:D0). A 16-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse should be issued and the entire sequence repeated. If the CRC received by the bus master is correct, a programming pulse (11–12 volts on the 1-Wire™ bus for 480 us) is issued by the bus master. Prior to programming, the entire unprogrammed 16,384-bit EPROM data field will appear as logical 1s. For each bit in the data byte provided by the bus master that is set to a logical 0, the corresponding bit in the selected byte of the 16,384-bit EPROM 12 will be programmed to a logical 0 after the programming pulse has been applied.

After the 480 us programming pulse is applied and the data line returns to a 5 volt level, the bus master issues eight read time slots to verify that the appropriate bits have been programmed. The preferred system embodiments responds with the data from the selected EPROM address sent least significant bit first. This byte contains the logical AND of all bytes ever written to this EPROM data address. If the EPROM data byte contains 1s in bit positions where the byte issued by the master contains 0s, a Reset Pulse should be issued and the current byte address should be programmed again. If the preferred system embodiments EPROM data byte contains 0s in the same bit position as the data byte, the programming was successful and the preferred system embodiments will automatically increment its address counter to select the next byte in the 16,384-bit EPROM 12 data field. The new two-byte address will also be loaded into the 16-bit CRC generator as a starting value. The bus master will issue the next byte of data using eight write time slots.

As the preferred system embodiments receives this byte of data into the scratchpad, it also shifts the data into the CRC generator that has been preloaded with the current address and the result is a 16-bit CRC of the new data byte and the LSB of the new address. After supplying the data byte, the bus master will read this 16-bit CRC from the preferred system embodiments with eight read time slots to confirm that the address incremented properly and the data byte was received correctly. If the CRC is correct, the bus master should issue a programming pulse and the selected byte in memory will be programmed.

Regarding WRITE STATUS [55H], the Write Status command is used to program the EPROM Status data field. The bus master will follow the command byte with a two byte starting address (TA1=(T7:T0), TA2=(T15:T8)) and a byte of status data (DT:D0). A 16-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse should be issued and the entire sequence repeated. If the CRC received by the bus master is correct, a programming pulse (11–12 volts on the 1-Wire™ bus for 480 us) is issued by the bus master. Prior to programming, all bytes of the EPROM Status 14 data field will appear as logical is. For each bit in the data byte provided by the bus master that is set to a logical 0, the corresponding bit in the selected byte of the EPROM STATUS BYTE data field will be programmed to a logical 0 after the programming pulse has been applied at that byte location.

After the 480 us programming pulse is applied and the data line returns to a 5 volt level, the bus master issues eight read time slots to verify that the appropriate bits have been programmed. The preferred system embodiments responds with the data from the selected EPROM Status address sent least significant bit first. This byte contains the logical AND of all bytes written to this EPROM Status Byte address. If the EPROM Status Byte contains 1s in bit positions where the byte issued by the master contained 0s, a Reset Pulse should be issued and the current byte address should be programmed again. If the preferred system embodiments EPROM Status Byte contains 0s in the same bit positions as the data byte, the programming was successful and the preferred system embodiments will automatically increment its address counter to select the next byte in the EPROM Status data field. The new two-byte address will also be loaded into the 16-bit CRC generator as a starting value. The bus master will issue the next byte of the data using eight write time slots.

As the preferred system embodiments receives this byte of data into the scratchpad, it also shifts the data into the CRC generator that has been preloaded with the current address and the result is a 16-bit CRC of the new data byte and the LSB of the new address. After supplying the data byte, the bus master will read this 16-bit CRC from the preferred system embodiments with eight read time slots to confirm that the address incremented properly and the data byte was received correctly. If the CRC is incorrect, a Reset Pulse should be issued and the Write Status command sequence must be restarted. If the CRC is correct, the bus master should issue a programming pulse and the selected byte in memory will be programmed.

Regarding the 1-Wire™ bus system 18, the 1-Wire™ bus 18 is a system which has a single bus master and one or more slaves. In all instances, the preferred system embodiments is a slave device. The bus master is typically a microcontroller. The discussion of this bus system is broken down into three topics; hardware configuration, transaction sequence, and 1-Wire™ signalling (signal type and timing). A 1-Wire™ protocol defines bus transactions in terms of the bus state during specified time slots that are initiated on the falling edge of sync pulses from the bus master. For a more detailed protocol description, refer to Chapter 4 of the Book of DS19xx Touch Memory Standards.

Regarding the preferred hardware configuration, the 1-Wire™ bus 18 has only a single line by definition; it is important that each device on the bus be able to drive it at the appropriate time. To facilitate this, each device attached to the 1-Wire™ bus must have an open drain connection or 3-state outputs. The preferred system embodiments is an open drain part with an internal circuit equivalent to that shown in FIG. 1J. The bus master 26 can be the same equivalent circuit. If a bidirectional pin is not available, separate output and input pins can be tied together.

Figures 1J, 1K:
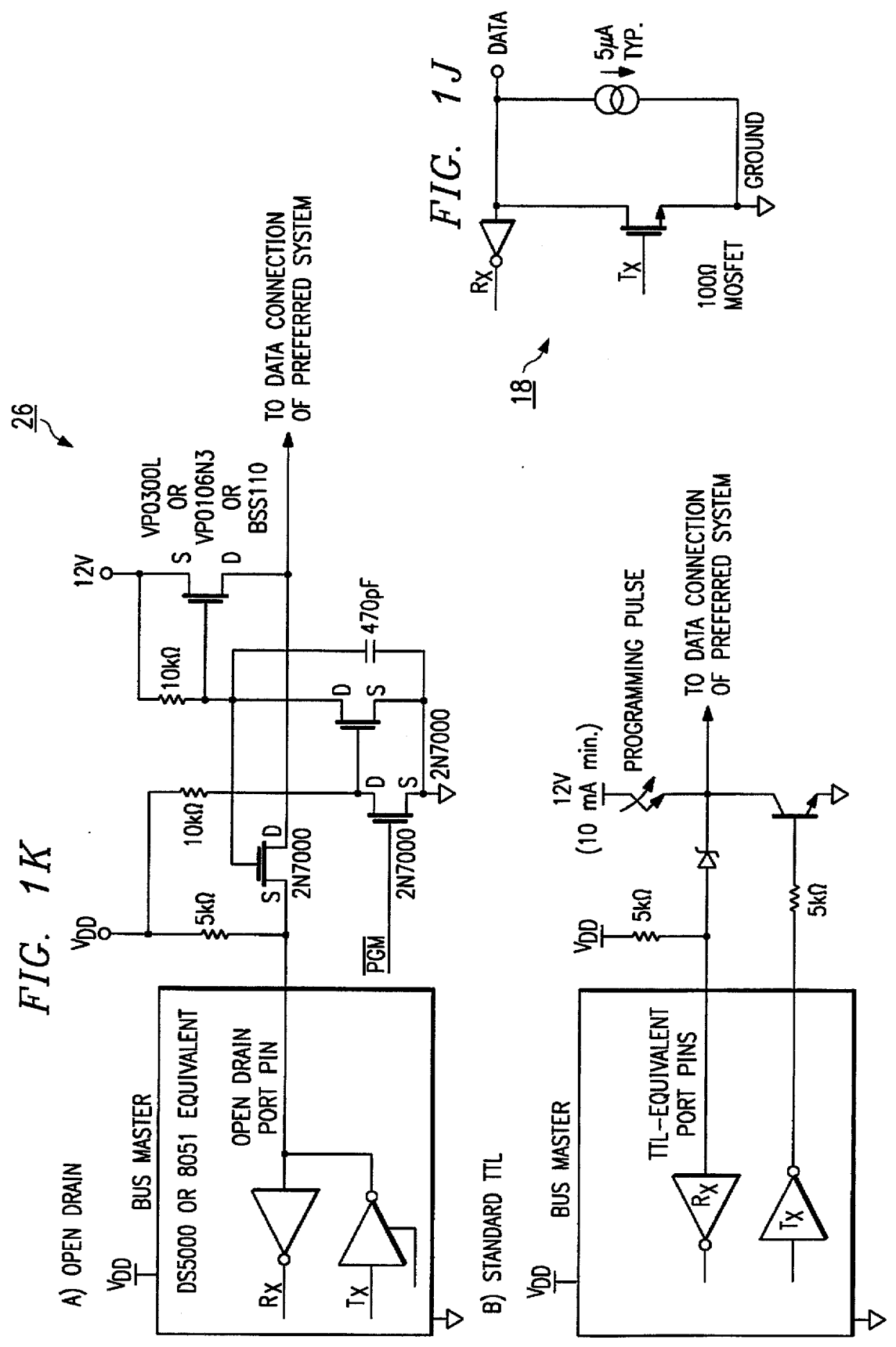

The bus master 26 requires a pull-up resistor at the master end of the bus, with the bus master 26 circuit equivalent to the one shown in FIG. 1K. The value of the pull-up resistor should be approximately 5kohms for short line lengths.

A multidrop bus consists of a 1-Wire™ bus with multiple slaves attached. The 1-Wire™ bus 18 (in FIG. 1A) has a maximum data rate of 16.3k bits per second. If the bus master 26 is also required to perform programming of the EPROM portions of the preferred system embodiments, a programming supply capable of delivering up to 10 milliamps at 11 volts for 480 us is required. The idle state for the 1-Wire™ bus is high. If, for any reason, a transaction needs to be suspended, the bus MUST be left in the idle state if the transaction is to resume. If this does not occur and the bus is left low for more than 120 us, one or more of the devices on the bus may be reset.

Regarding the transaction sequence, the sequence for accessing the preferred system embodiments via the 1-Wire™ port is as follows: Initialization, ROM Function Command, Memory Function Command, and Read/Write Memory/Status.

Regarding initialization, all transactions on the 1-Wire™ bus begin with an initialization sequence. The initialization sequence consists of a reset pulse transmitted by the bus master 26 followed by a presence pulse(s) transmitted by the slave(s).

The presence pulse lets the bus master 26 know that the preferred system embodiment is on the bus and is ready to operate. For more details, see the description below regarding "1-Wire™ Signalling."

Regarding ROM FUNCTION COEDS, once the bus master 26 has detected a presence, it can issue one of the four ROM function commands. All ROM function commands are eight bits long. A list of these commands follows (refer to flowchart in FIG. 1C).

Regarding Read ROM [33H], this command allows the bus master 26 to read the preferred system embodiment's 8-bit family code, unique 48-bit serial number, and 8-bit CRC. This command can be used only if there is a single preferred system embodiment on the bus. If more than one slave is present on the bus, a data collision will occur when all slaves try to transmit at the same time (open drain will produce a wired-AND result).

Regarding Match ROM [55H], the match ROM command, followed by a 64-bit ROM sequence, allows the bus master 26 to address a specific preferred system embodiment on a multidrop bus. Only the preferred system embodiment that exactly matches the 64-bit ROM sequence will respond to the subsequent memory function command. All slaves that do not match the 64-bit ROM sequence will wait for a reset pulse. This command can be used with a single or multiple devices on the bus.

Regarding Skip ROM [CCH], this command can save time in a single drop bus system by allowing the bus master 26 to access the memory functions without providing the 64-bit ROM code. If more than one slave is present on the bus and a read command is issued following the Skip ROM command, data collision will occur on the bus as multiple slaves transmit simultaneously (open drain pull-downs will produce a wire-AND result).

Regarding Search ROM [FOH], when a system is initially brought up, the bus master 26 might not know the number of devices on the 1-Wire™ bus or their 64-bit ROM codes. The search ROM command allows the bus master 26 to use a process of elimination to identify the 64-bit ROM codes of all slave devices on the bus. The ROM search process is the repetition of a simple 3-step routine: read a bit, read the complement of the bit, then write the desired value of that bit. The bus master 26 performs this simple, 3-step routine on each bit of the ROM. After one complete pass, the bus master 26 knows the contents of the ROM in one device. The remaining number of devices and their ROM codes may be identified by additional passes. See Chapter 5 for a comprehensive discussion of a ROM search, including an actual example.

Figure 1M:
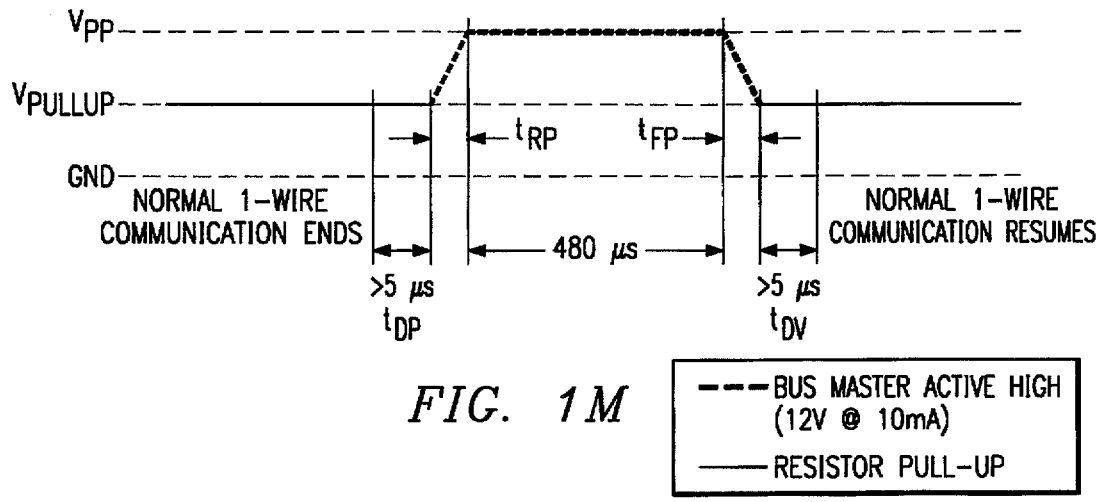
FIG. 1M is a timing diagram showing the application of a programming voltage.
Figure 1N:
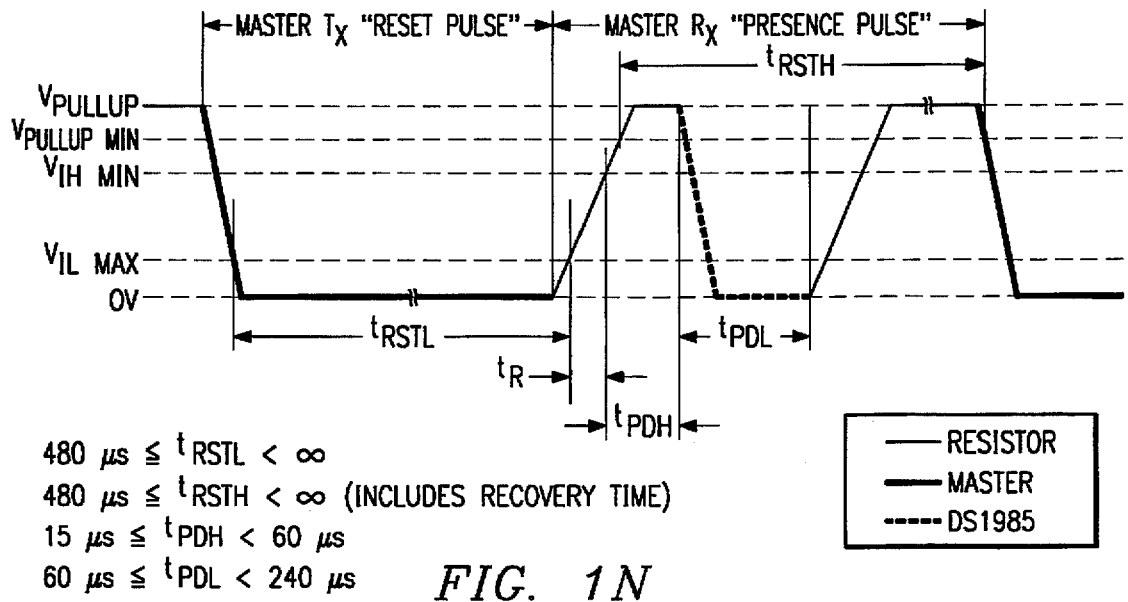
FIG. 1N is a timing diagram showing the initialization sequence required to begin any communication with the preferred system embodiments.

Regarding 1-Wire™ Signalling, the preferred system embodiment requires strict protocols to insure data integrity. The protocol consists of five types of signalling on one line: Reset Sequence with Reset Pulse and Presence Pulse, Write 0, Write 1, Read Data and Program Pulse. All these signals except presence pulse are initiated by the bus master 26. The initialization sequence required to begin any communication with the preferred system embodiments is shown in FIG. 1N. A reset pulse followed by a presence pulse indicates the preferred system embodiments is ready to accept a ROM command. The bus master 26 transmits (TX) a reset pulse (tPDH, 15–60 us) and then transmits the present pulse (tPDL, 60–240 us).

Regarding Read/Write Time Slots, the definitions of write and read time slots are illustrated in FIG. 1L. All time slots are initiated by the master driving the data line low. The falling edge of the data line synchronizes the preferred system embodiments to the master by triggering a delay circuit in the preferred system embodiments. During write time slots, the delay circuit determines when the preferred system embodiments will sample the data line. For a read data time slot, if a "0" is to be transmitted, the delay circuit determines how long the preferred system embodiments will hold the data line low overriding the 1 generated by the master. If the data bit is a "1," the preferred system embodiments will leave the read data time slot unchanged.

Regarding the program pulse, to copy data from the 8-bit scratchpad to the EPROM Data or Status Memory, a program pulse of 11–12 volts is applied to the data line. During programming, the bus master 26 controls the transition from a state where the data line is idling high via the pull-up resistor to a state where the data line is actively driven to a programming voltage of 11–12 volts providing a minimum of 10 mA of current to the preferred system embodiments. This programming voltage (FIG. 1M) should be applied for 480 us, after which the bus master 26 returns the data line to an idle high state controlled by the pull-up resistor. Note that due to high voltage programming requirements for any 1-Wire™ EPROM device, it is not possible to multi-drop non-EPROM based 1-Wire™ devices with the preferred system embodiments during programming. An internal diode within the non-EPROM based 1-Wire™ devices will attempt to clamp the data line at approximately 8 volts and could potentially damage these devices.

Regarding CRC GENERATION, preferred system embodiments have an 8-bit CRC in the most significant byte of the 64-bit ROM. The bus master 26 can compute a CRC value from the first 56 bits of the 64-bit ROM and compare it to the value stored within the preferred system embodiments to determine if the ROM data has been received error-free by the bus master 26. The equivalent polynomial function of this CRC is: $X^8+X^5+X^4+1$.

Under certain conditions, the preferred system embodiments also generate a 16-bit CRC value using a different polynomial function shown above and provides this value to the bus master 26 to validate the transfer of command, address, and data bytes from the bus master 26 to the preferred system embodiments. The Memory Function Flow Chart of FIGS. 1D, 1E, and 1F indicates that the preferred system embodiments compute a 16-bit CRC for the command, address, and data bytes received for the Write Memory and the Write Status commands and then output this value to the bus master 26 to confirm proper transfer. Similarly the preferred system embodiments compute a 16-bit CRCs for the Read Memory, Read Status, and Extended Read at the appropriate points in the protocol commands to confirm that these bytes have been received correctly.

In each case where a CRC is used for data transfer validation, the bus master 26 must calculate a CRC value using the polynomial function given above and compare the calculated value to either the 8-bit CRC value stored in the 64-bit ROM portion of the preferred system embodiments (for ROM reads) or the 16-bit CRC value computed within the preferred system embodiments. The comparison of CRC values and decision to continue with an operation are determined entirely by the bus master 26. There is no circuitry on the preferred system embodiments that prevents a command sequence from proceeding if the CRC stored in or calculated by the preferred system embodiments does not match the value generated by the bus master 26. Proper use of the CRC as outlined in the flow chart of FIG. 1D, 1E, and 1F can result in a communication channel with a very high level of integrity. For more details on generating CRC values including example implementations in both hardware and software, see the Book of DS19xx Touch Memory Standards.

Figure 10:
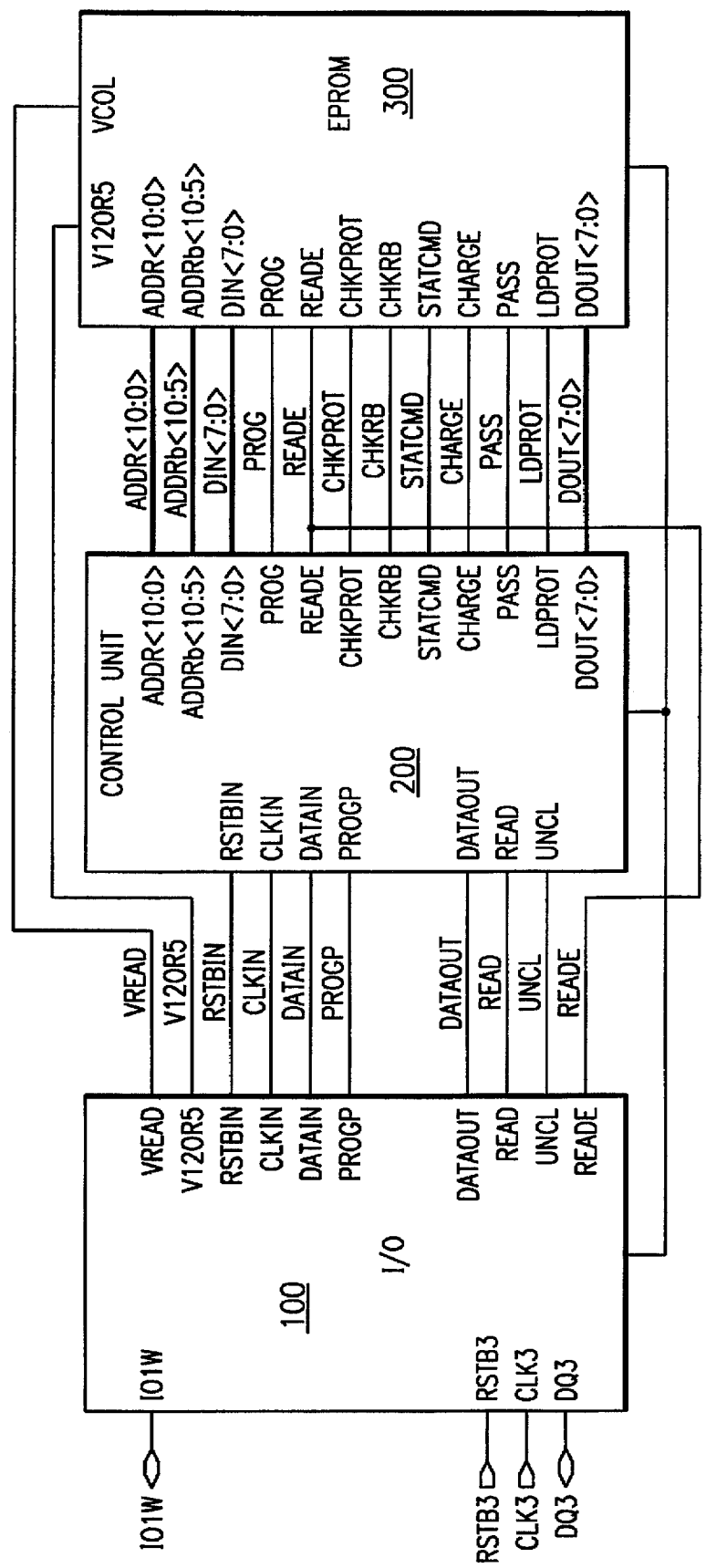

FIG. 10 is a block diagram showing the architecture of a preferred embodiment of device 10, which generally comprises input/output ("IO") module 100 coupled to control ("CNTL") module 200, which are both coupled to EPROM memory ("EPROM") module 300.

Figure 2A:
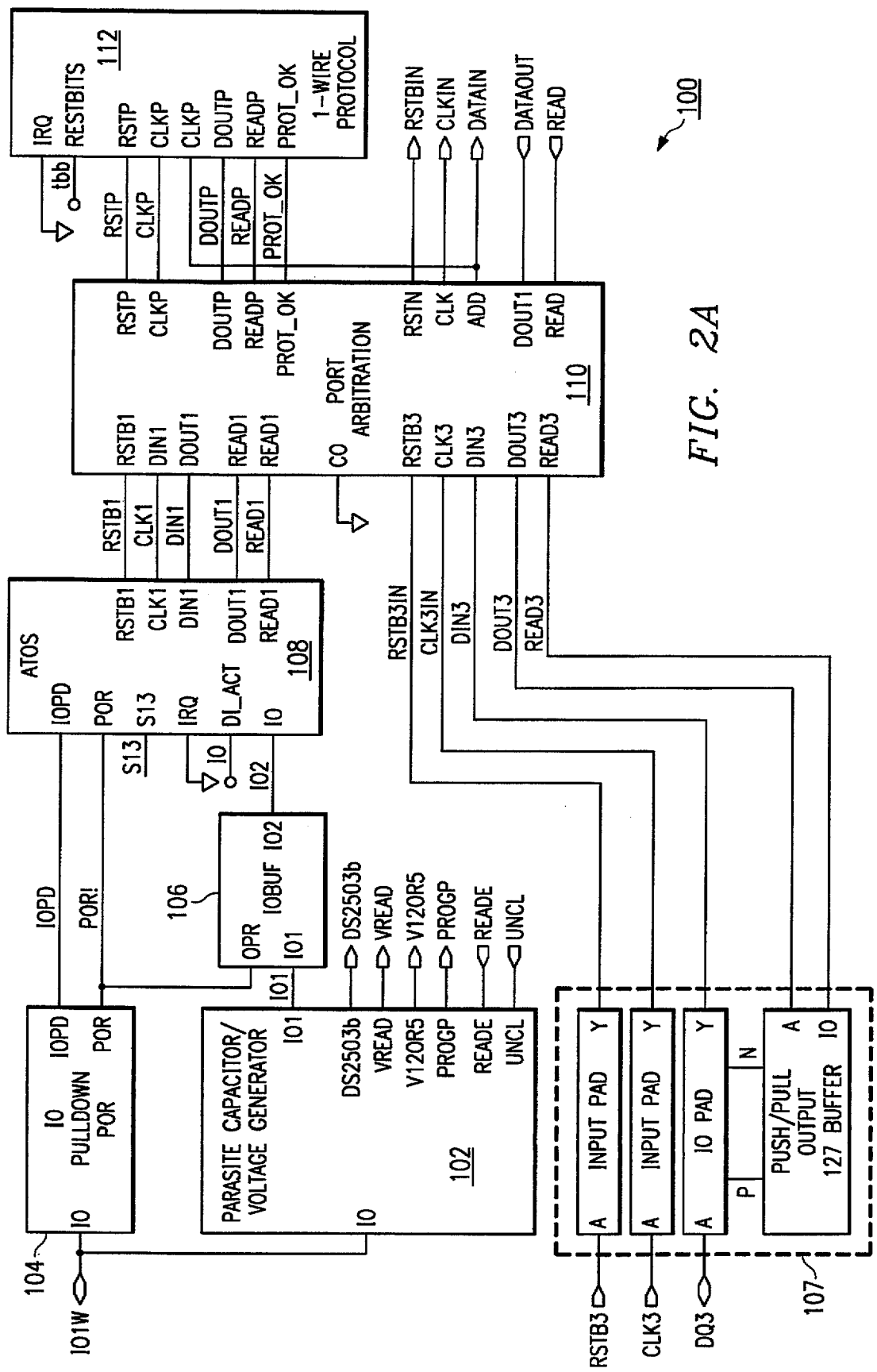
FIG. 2A is a block diagram showing the architecture of a preferred embodiment of input/output module 100 of device 10 shown in FIG. 1O, which generally comprises PARASITIC CAPACITOR/VOLTAGE GENERATOR module 102, I/O PULLDOWN POR module 104, IOBUF module 106, ATOS module 108, PORT ARBITRATION module 110, 1-WIRE PROTOCOL module 112, and TEST PADS 103 coupled together.

FIG. 2A is a block diagram showing the architecture of a preferred embodiment of input/output module 100 of device 10 shown in FIG. 10, which generally comprises PARASITIC CAPACITOR/VOLTAGE GENERATOR module 102, I/O PULLDOWN POR module 104, IOBUF module 106, ATOS module 108, PORT ARBITRATION module 110, 1-WIRE PROTOCOL module 112, and TEST PADS 107 coupled together. Input/output module 100 generally handles the input and output operations to and from the device 10 (e.g., READ, WRITE, RESET, etc.), which in preferred applications is positioned in an electronic module having a first and second conductive surface, such as that shown and described in the references incorporated above.

Figure 2B:
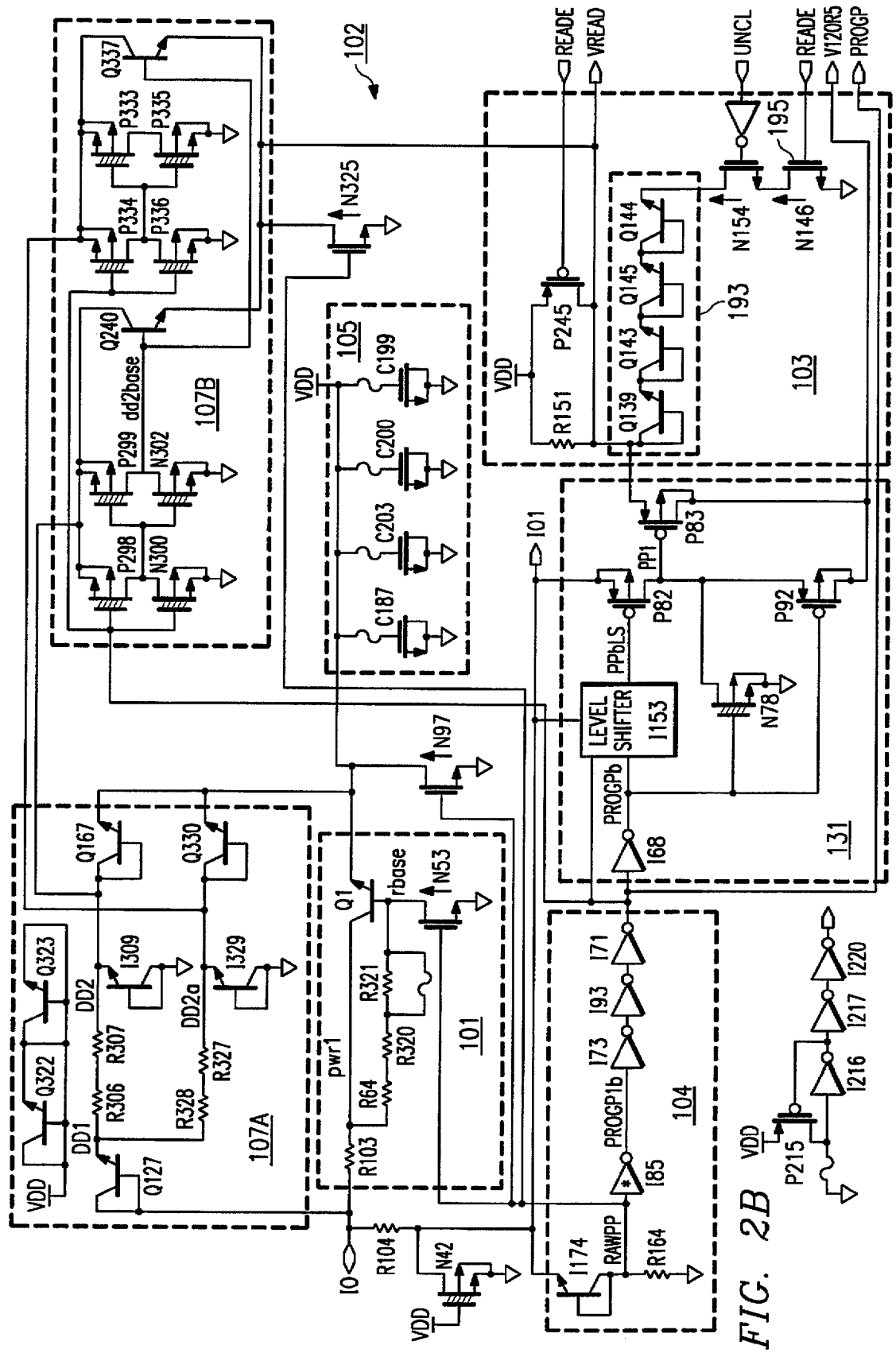
FIG. 2B is a schematic showing the actual circuitry of a preferred embodiment of PARASITIC CAPACITOR/VOLTAGE GENERATOR module 102, which, in turn, comprises parasite power capacitors 105, charging diodes 101, which charge parasite power capacitors 105 during normal operation, programming circuit 107A AND 107B which charge parasite power capacitors 105 during programming operations, programming voltage detector, read voltage clamping circuit 103, and read/12v gate switching circuit 131.

FIG. 2B is a schematic showing the actual circuitry of a preferred embodiment of PARASITIC CAPACITOR/VOLTAGE GENERATOR module 102, which, in turn, comprises parasite power capacitors 105, charging diodes 101, which charge parasite power capacitors 105 during normal operation, programming diodes 107 which charge parasite power capacitors 105 during programming operations, I/O PULLDOWN POR module 104, read voltage clamping circuit 103, and read/12v gate switching circuit 131. FIG. 2N is a block diagram that shows the relationships between parasite power capacitors 105, charging diodes 101, which charge parasite power capacitors 105 during normal operation, programming diodes 107 which charge parasite power capacitors 105 during programming operations, I/O PULLDOWN POR module 104, read voltage clamping circuit 103, and read/12v gate switching circuit 131, in which the actual circuitry of a preferred embodiment of PARASITIC CAPACITOR/VOLTAGE GENERATOR module 102 (in FIG. 2B).

Regarding read voltage clamping circuit 103, a preferred embodiment of which is marked in FIG. 2B. Voltage clamping circuit 103 significantly enhances the programmability of device 10 by broadening the range of externally applied voltages over which programming can occur and by reducing the amount of time required to program a given bit. In general, read voltage clamping circuit 103 alters the conditions under which a bit (that has been received) is interpreted as being programmed in EPROM module 300.

Data memory in preferred embodiments described herein below is organized into 64 pages of 32 bytes each. Bytes which are on the same page are placed physically on the same row, and bytes which are offset the same amount from the beginnings of different pages are placed physically on the same 8 columns (1 column per bit in the byte). A Row Enable line (RE) is associated with each row and is connected to the gates of all EPROM transistors in the row. A Drain line (DRAIN) is associated with each column and is connected to the drains of all EPROM transistors in the column.

Status memory in preferred embodiments described herein below consists of 3 components: write-protect bits, redirection bytes, and redirection-protect bits whose functions are described above. The write-protect bits and redirection-protect bits occupy one row and the redirection bytes occupy two rows. The 3 rows of status memory are appended to the 64 rows of data memory for a total of 67 rows.

Figure 4A:
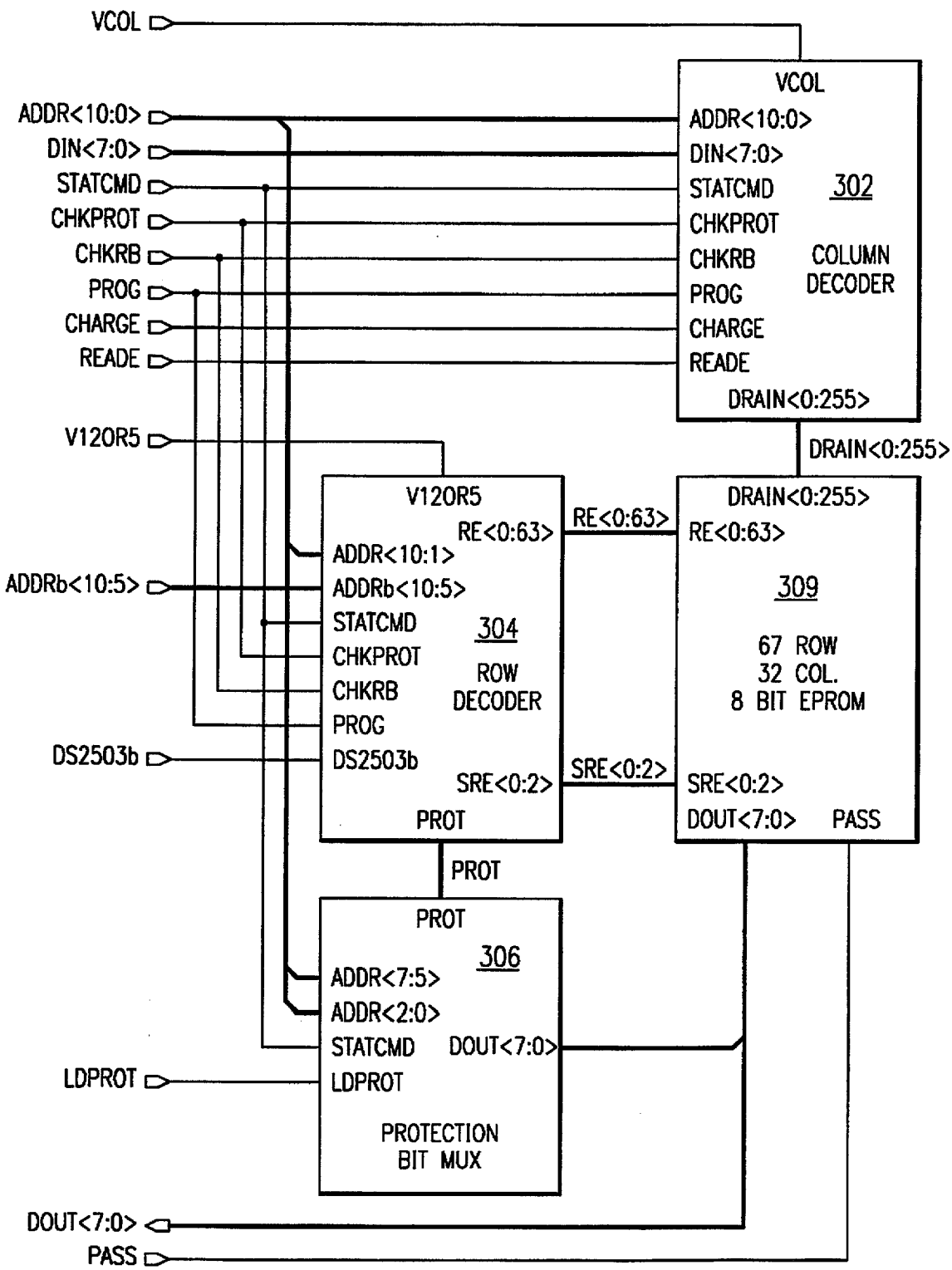
FIG. 4A is a block diagram showing the architecture of a preferred embodiment of EPROM module 300 of device 10 shown in FIG. 10, which generally comprises COLUMN DECODER module 302, ROW DECODER module 304, PROTECTION BIT MUX module 306, and 67 ROW/32 COLUMN 8-BIT EPROM 309 coupled together.

Referring now to FIGS. 4A through 4O, programming a bit in preferred embodiments described herein below is accomplished by driving the corresponding RE line to the programming voltage (11 to 12 volts) and by driving the corresponding DRAIN line to about 8.5 volts. DRAIN is driven by the circuitry in COLFND module 330 simultaneously in preferred embodiments described herein below. To avoid programming undesired bits in the selected byte, DRIVEL and DRIVEHb in the instances of module COLFND atop the columns containing the EPROM cells which represent the undesired bits are forced high. To avoid programming bits in unselected bytes in the same row as the selected byte, either CEA or CEB is forced low for every column containing EPROM cells which represent bits in unselected bytes. To avoid programming bits in unselected bytes on different rows from the selected byte, the RE line for all unselected rows is forced low, which inhibits programming.

Reading a bit in preferred embodiments described herein below is accomplished by driving the corresponding RE line to a clamped read voltage, by driving VCOL (shared by all instances of module COLFND) to the same clamped voltage, by driving the corresponding CEA and CEB lines both high, by driving DRIVEL low, and by manipulating PASS (shared by all columns) and DRIVEHb as follows: At the initiation of a read operation, both PASS and DRIVEHb are driven low. This creates a low-impedance path between VCOL and DRAIN, so DRAIN is charged up to the clamped read voltage. N-channel transistor N112 is conducting, but n-channel transistor N115 is nonconducting, so there is no path between DATA and GND, and DATA is therefore pulled high by the weak p-channel transistor P127. After a short interval (about 100 ns), DRIVEHb is forced high. This isolates DRAIN from the clamped read voltage. If the selected cell is programmed, then its Vt is higher than the clamped read voltage present on its gate. The EPROM transistor is therefore non-conducting, and DRAIN is isolated from GND also. This causes DRAIN to remain capacitively at the clamped read voltage to which it was charged, which in turn allows n-channel transistor N112 to stay conducting. If the cell is unprogrammed, then its Vt is lower than the clamped read voltage on its gate. The EPROM transistor is therefore conducting, and DRAIN is pulled low. this causes n-channel transistor N112 to become nonconducting. After another interval (about 250 ns), to allow enough time for DRAIN to be discharged in the event that the cell in unprogrammed, PASS is forced high. This makes n-channel transistor N115 conducting. If the cell is unprogrammed, N112 is nonconducting, so there is still no path between DATA and GND, and DATA stays high. If the cell is programmed, N112 is conducting, so the rising edge of PASS introduces a path between DATA and GND, and DATA is pulled low. A programmed cell is therefore read as a logic '0' and an unprogrammed cell as a logic '1'.

When data is read, the appropriate Row Enable (RE) line(s) 349 is driven high to Clamp voltage level. Read voltage clamping circuit 103 (see FIG. 2B) addresses the problem that stems from the fact that the storage of charge on a device's floating gate, hence the raising of its effective Vt, during a programming pulse is a quasi-asymptotic process. The effective Vt of a device can be increased to about 4.3V with a very short programming pulse, but lengthening the pulse, even by several orders of magnitude, cannot increase the effective Vt more than an additional one or two tenths of a volt. Therefore, if the high value on the RE line 349 is above 4.3V, even a device to which a programming pulse has been applied looks unprogrammed. This renders the part non-functional for external pull-up voltages greater than about 5V (one diode drop above 4.3V).

Since the effective Vt of a programmed device cannot be raised beyond about 4.3V, it follows that the way to solve the problem is to reduce the maximum high voltage on the respective RE line 349 during a READ operation below 4.3V. To accomplish this, the RE line 349 is changed so that it is not longer driven high by VDD, but instead by an intermediate voltage VREAD.

When VDD is less than about 3V, there is insufficient voltage across the diodes to conduct any appreciable current, so there is no voltage drop across the resistor, and VREAD follows VDD exactly. Increasing VDD past 3V causes the diodes to become conducting, so that a voltage drop appears across the resistor, and VREAD is clamped at approximately three diode drops above GND. Because of the current-voltage characteristic of the diodes, any increase in VDD is seen almost entirely across the resistor, with the voltage across the diodes changing no more than a few tenths of a volt.

The voltage to which VREAD is clamped can be adjusted by varying the number of diodes in the stack. It should be made as high as it can be made without surpassing the maximum programmed Vt, in order to minimize the current across the resistor 191. The optimal number of diodes in the stack 193 was determined by finding the largest number which would clamp VREAD below 4.3V at cold temperatures. Since the value of a diode drop increases as temperature decreases, if VREAD is below 4.3V at the coldest allowable temperature, it is below 4.3V at all allowable temperatures. The optimal height was determined in this manner to be three diodes 193, as shown in FIG. 2B. To accommodate potential variations in process parameters, a fourth diode was placed into the layout and shorted out with a fuse. If it is determined empirically that a fourth diode can be included in the stack without pushing VREAD above the maximum effective Vt, then the fuse can be blown. There is also a fuse which can be blown to disconnect the entire stack.

The purpose of the wide n-channel device 195 between the bottom of the stack 193 and GND is to reduce power dissipation and functions as a switch. The gate of the switch 195 or, READE, is high only during a read operation. At all other times there is no need to consume the current required to generate VREAD. READE is low in such a situation, so the switch 195 is off and the stack 193 consumes no current. The switch 195 is strong enough so that when it is on it has no appreciable effect on the voltages in the stack 193—the drain is drawn to within a few millivolts of GND.

An undesirable effect of clamping the gate voltage on an EPROM transistor during a read is that the current-sinking capability of the transistor is reduced accordingly. If the drain were precharged to too high a voltage in this situation (as explained above), then an unprogrammed EPROM transistor would not be able to discharge the highly capacitive drain line in time to make the cell look unprogrammed. This effect is eliminated by clamping the column voltage during a read to the same level to which the row voltage is clamped.

Figure 4B:
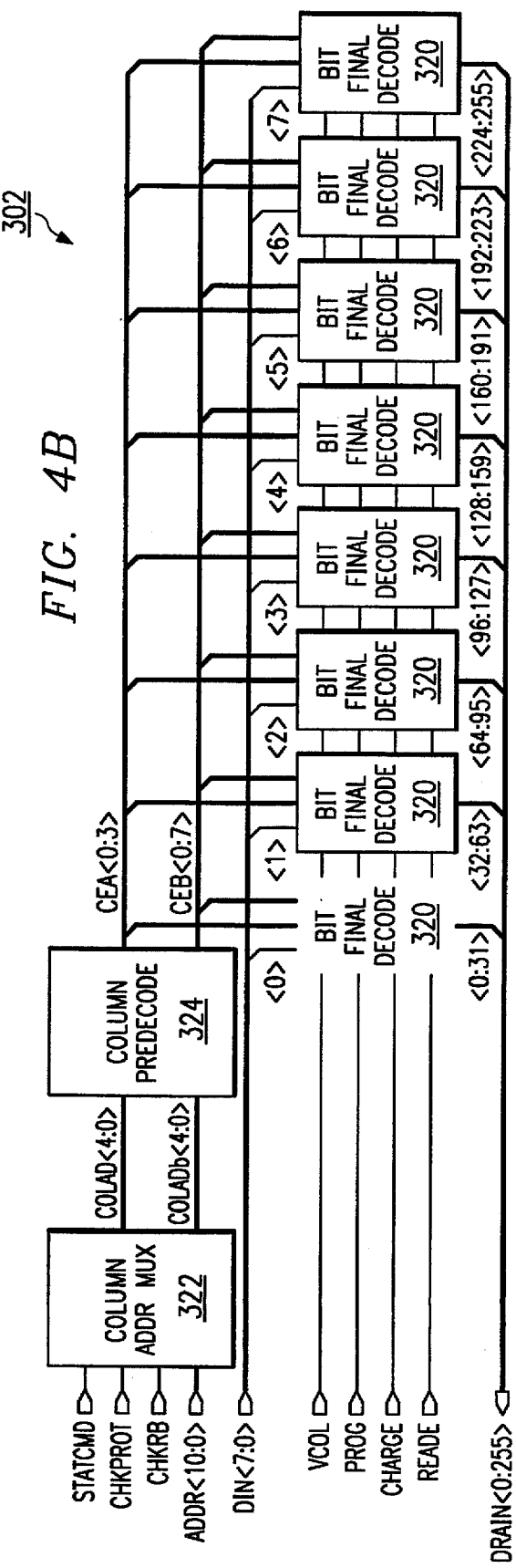
FIG. 4B is a schematic showing the actual circuitry of a preferred embodiment of COLUMN DECODER 302, which implements a two stage decode function, that comprises BIT FINAL DECODE 320, which drives the drains of the EPROM cells for a 1-bit slice of the 8-bit EPROM to the correct voltage level, COLUMN ADDR MUX 322, which selects how the Address is going to be interpreted depending on whether one is addressing the main memory or the status memory, and COLUMN PREDECODE module 324, which is the first stage of the two stage decode.
Figure 4C:
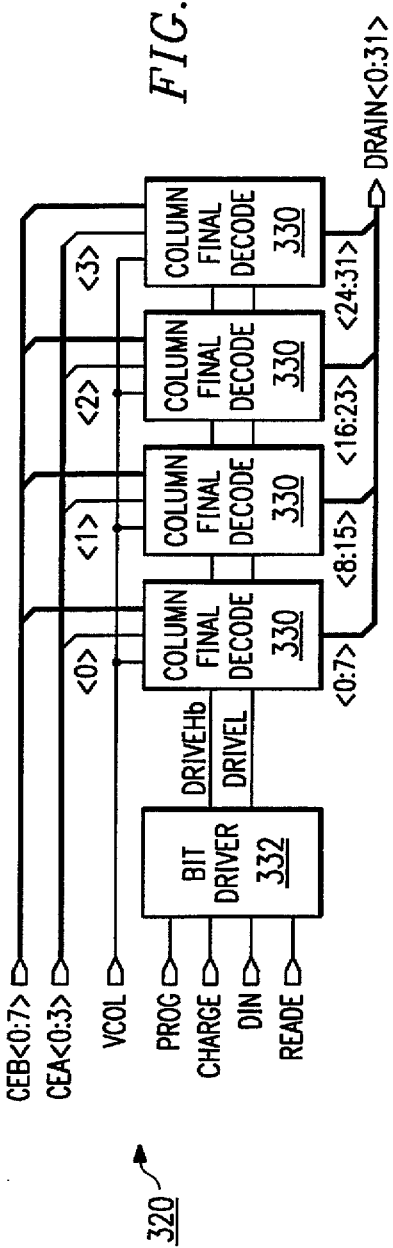
FIG. 4C is a schematic showing exemplary circuitry of an exemplary BIT SLICE FINAL DECODE module.
Figure 4D:
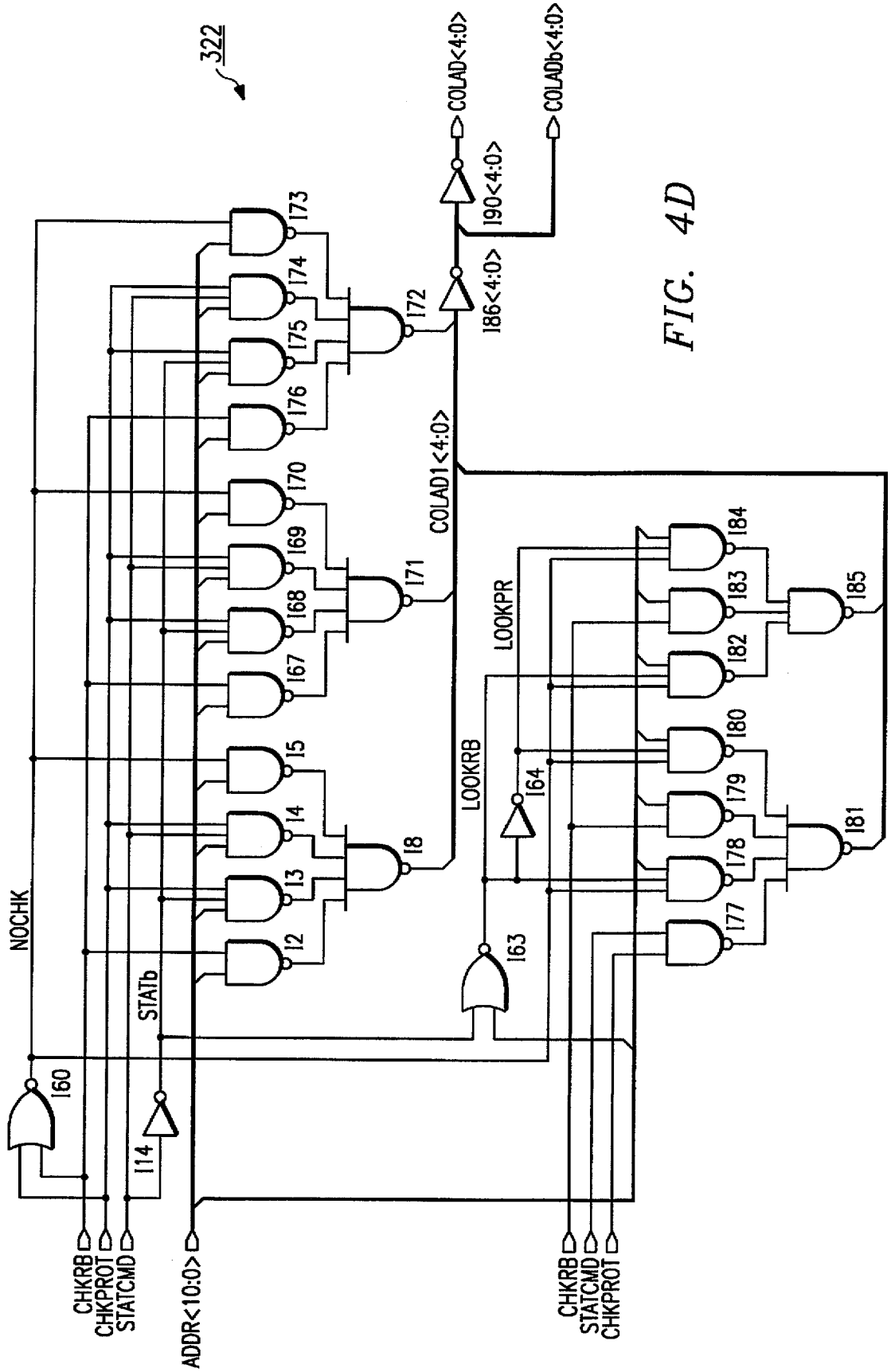
FIG. 4D is a schematic showing exemplary circuitry of a COLUMN ADDRESS MUX.
Figure 4E:
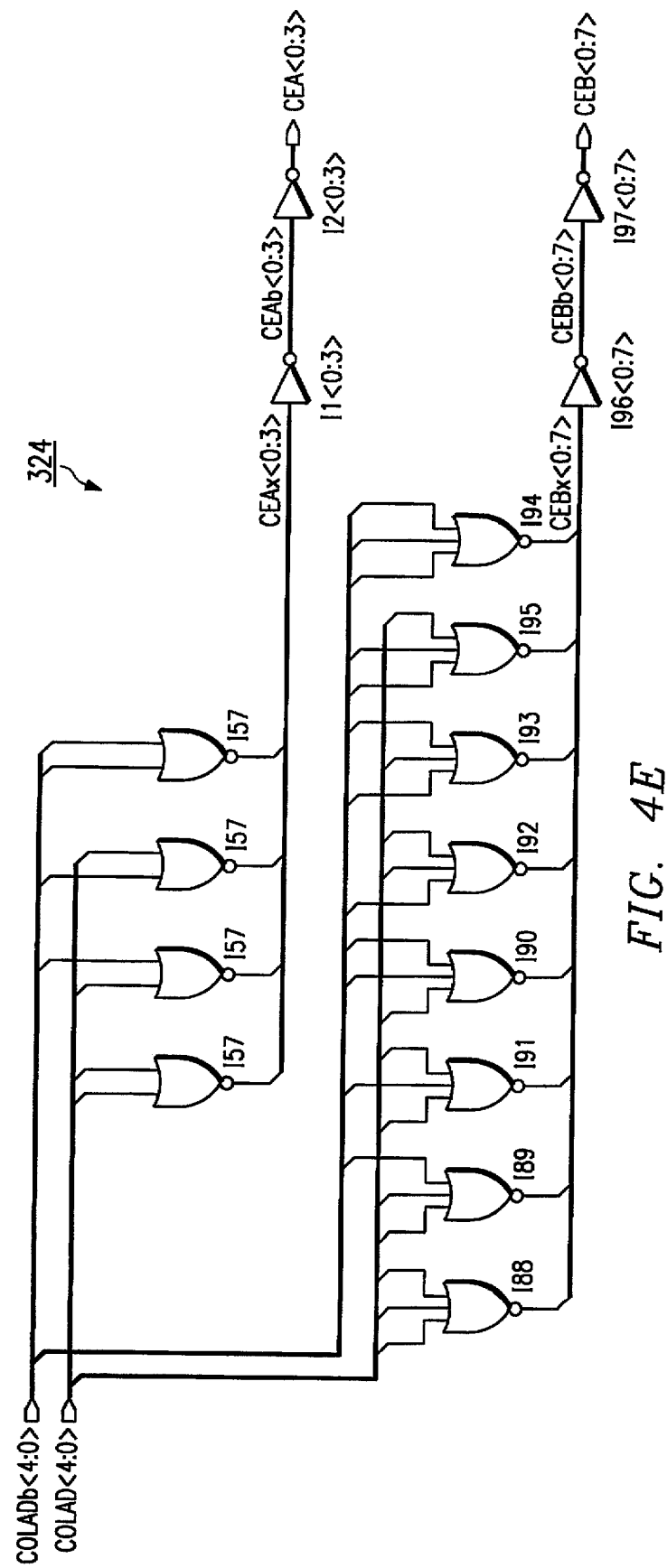
FIG. 4E is a schematic of and exemplary COLUMN DECODE module.
Figure 4F:
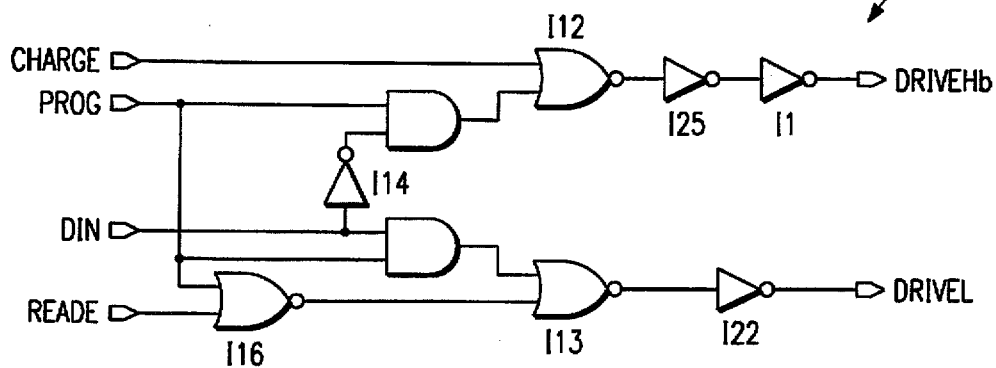
FIG. 4F is a schematic of an exemplary BIT DRIVER module.
Figure 4G:
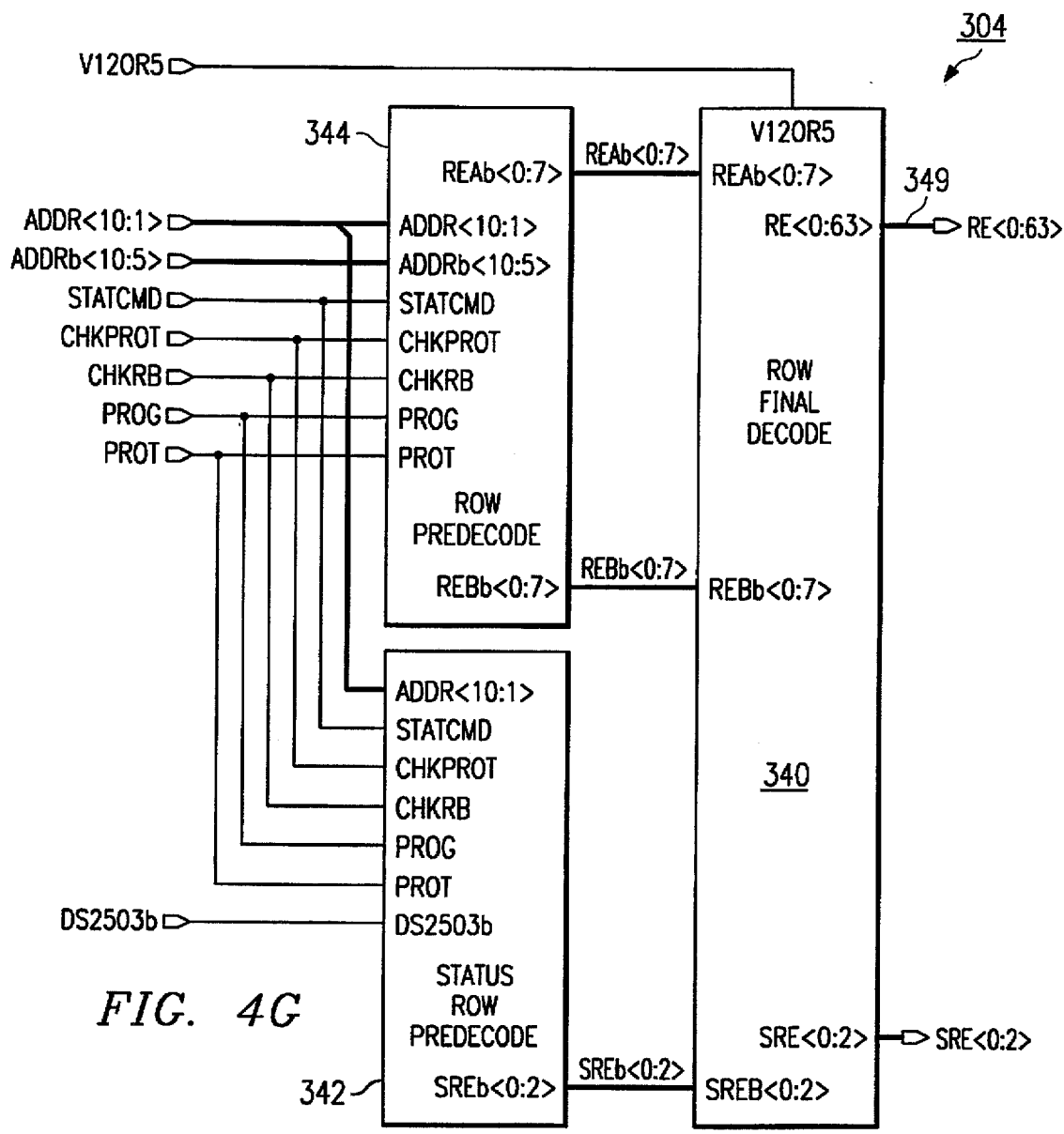
FIG. 4G is a schematic of an exemplary ROW DECODER module.
Figure 4H:
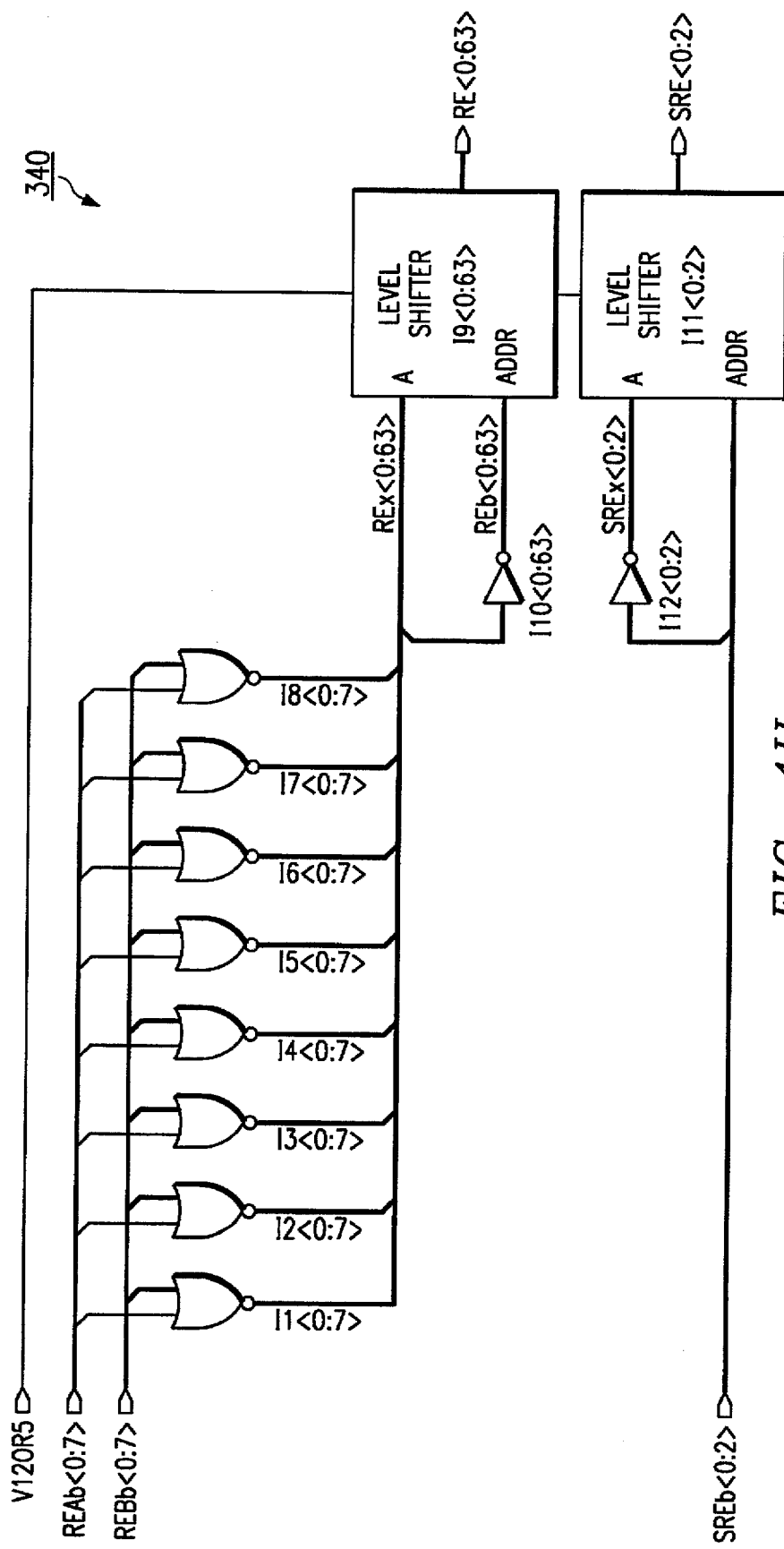
FIG. 4H is a schematic of an exemplary ROW FINAL DECODE module.
Figure 4I:
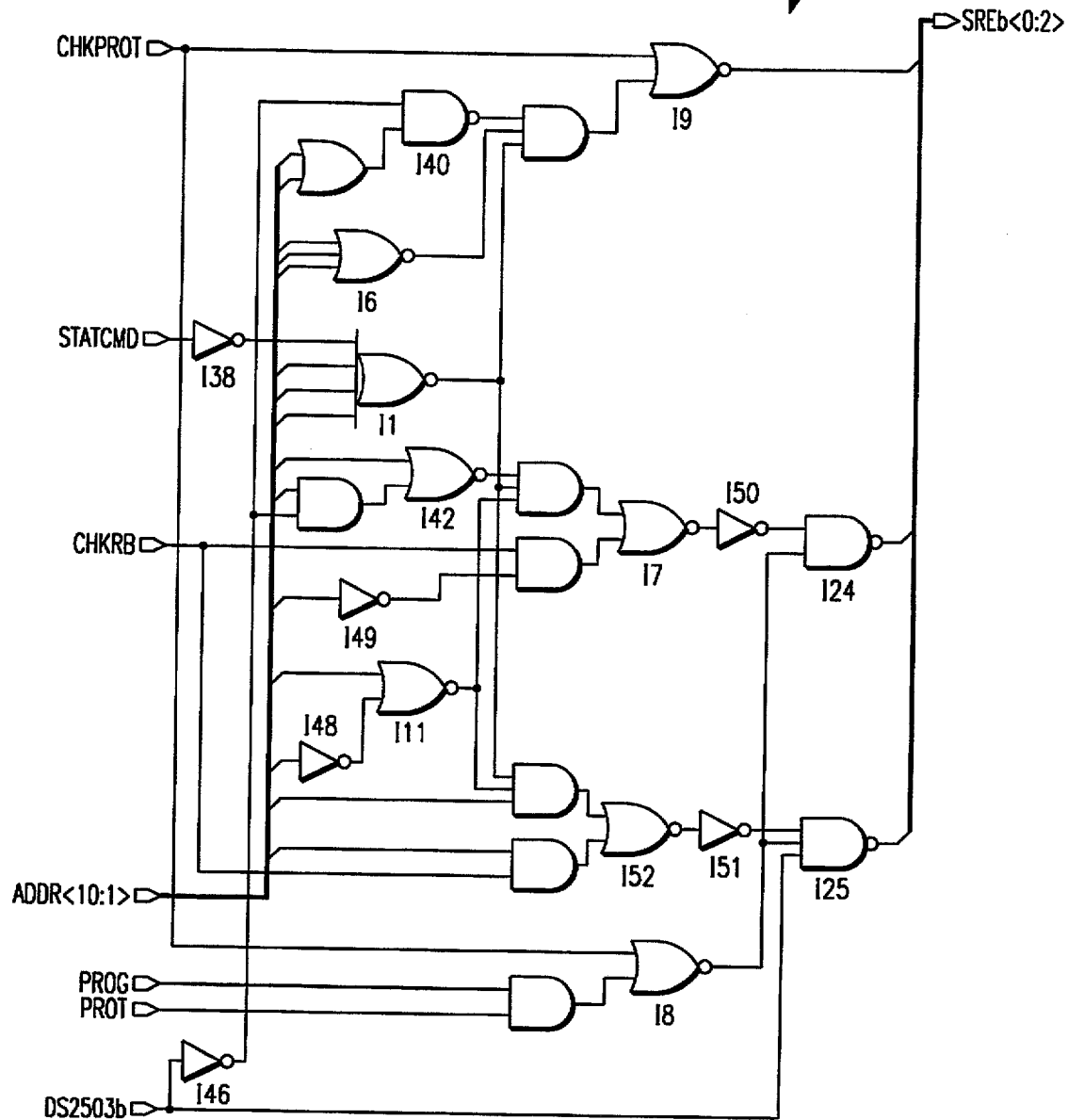
FIG. 4I is a schematic of an exemplary STATUS ROW PREDECODE module.
Figure 4J:
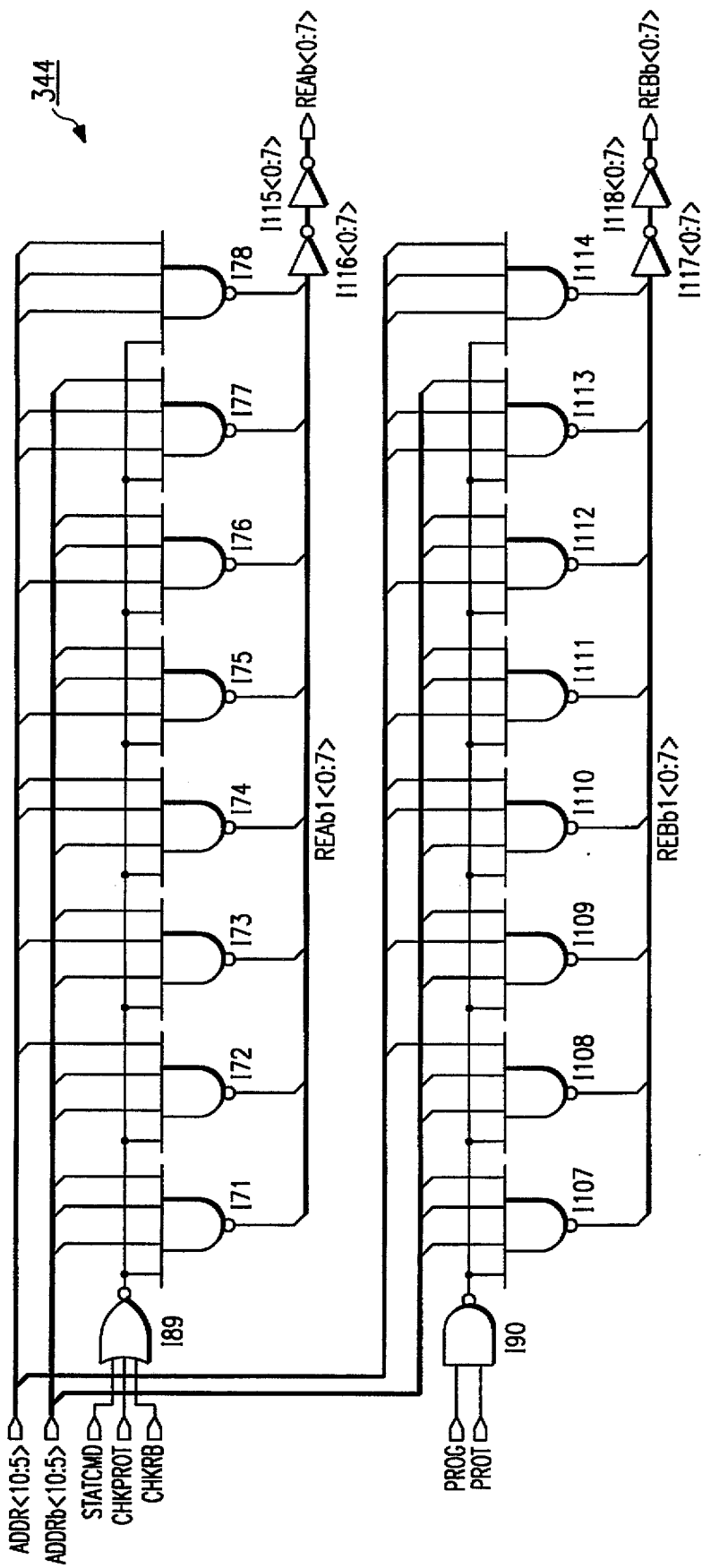
FIG. 4J is a schematic of an exemplary ROW PREDECODE module.
Figure 4K:
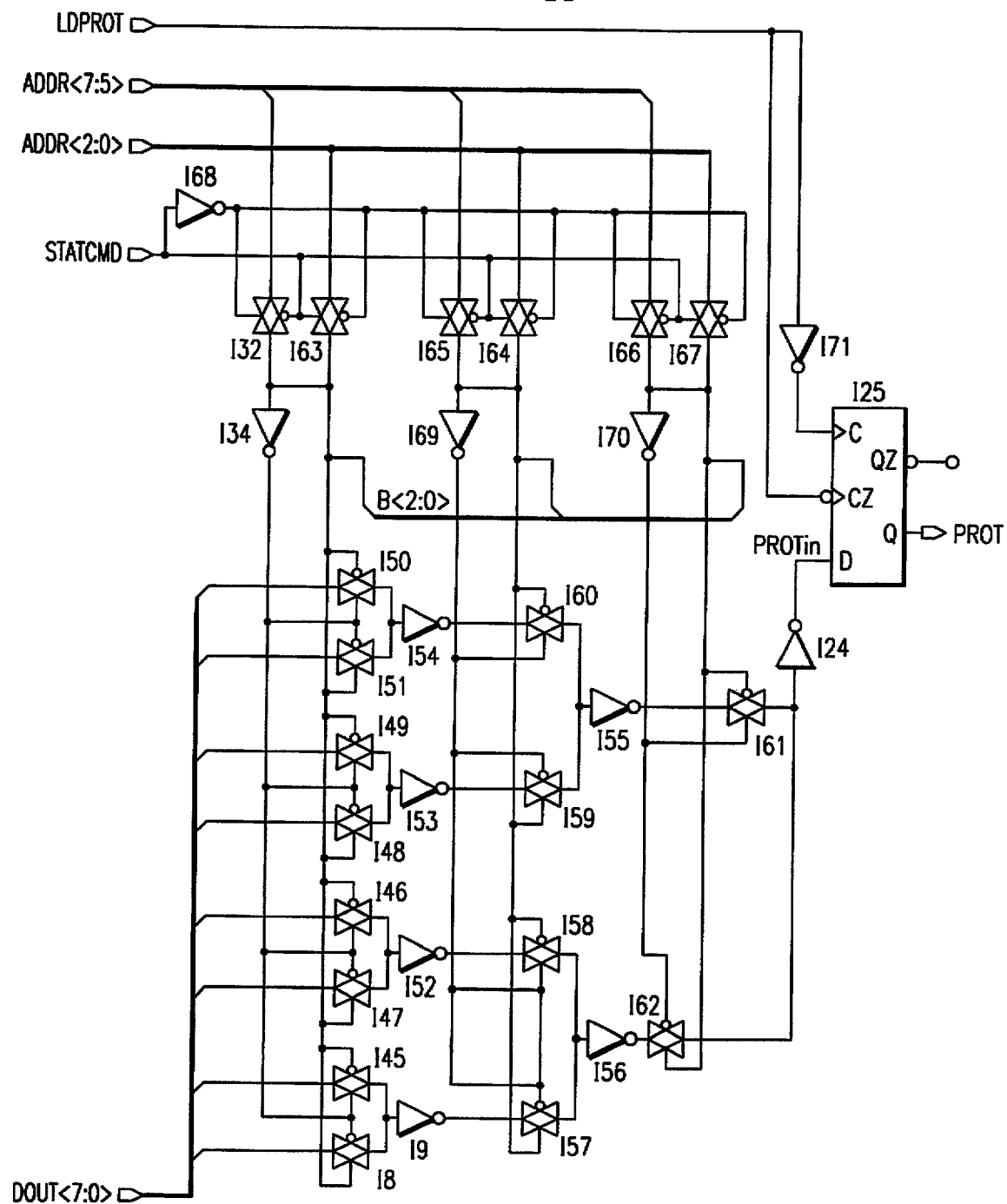
FIG. 4K is a schematic of an exemplary PROTECTION BIT MUX module.
Figure 4L:
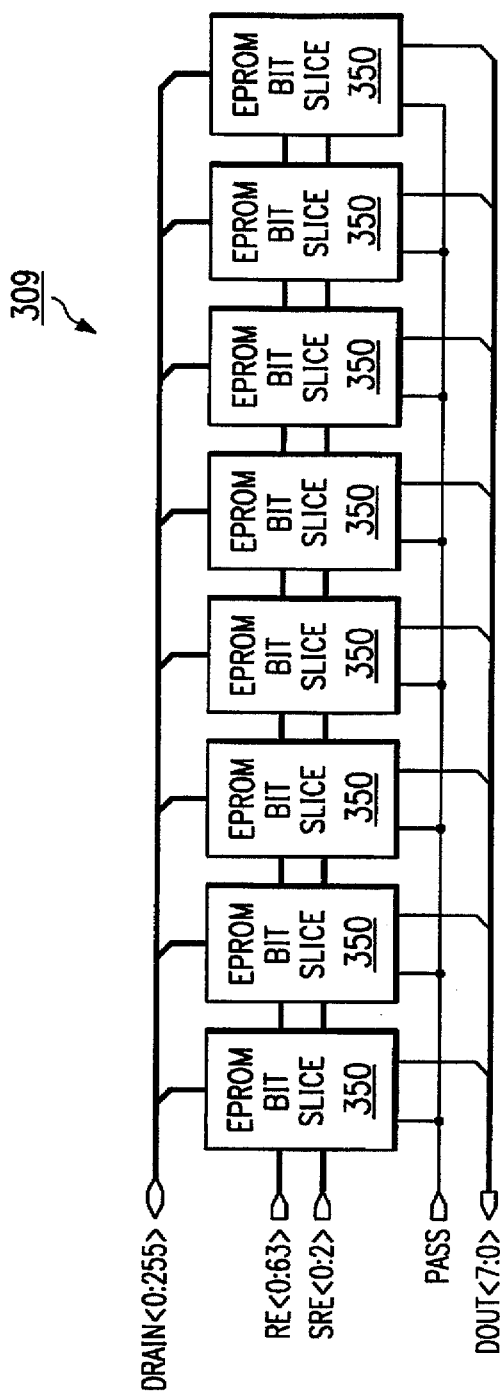
FIG. 4L is a schematic of an exemplary 67 ROW/32 COLUMN 8-BIT EPROM circuit.
Figure 4N:
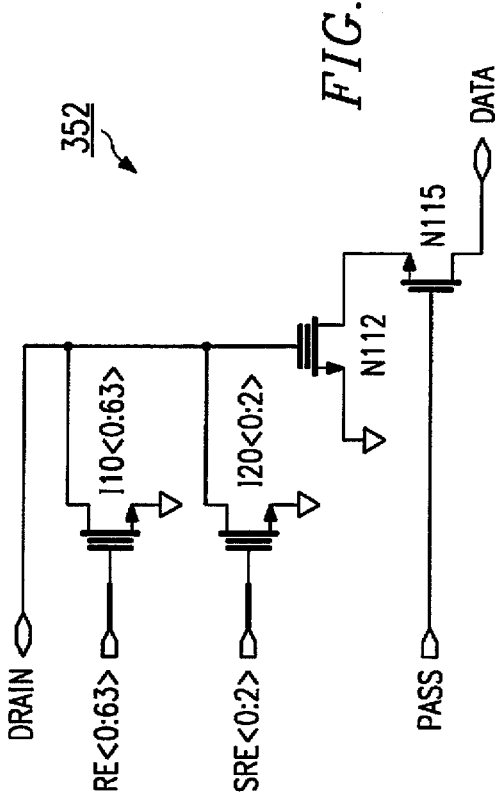
FIG. 4N is a schematic showing the actual circuitry of a preferred embodiment of EPROM COLUMN SLICE module 352 of EPROM BIT SLICE 350 of FIG. 4M.

As shown in FIG. 10 and 4A-4N, EPROM 300 is comprised of 16,384 bits that are programmed and read preferably with one I/O pin and ground. The overall system comprising IO module 100, CNTL module 200, and EPROM module 300 derives its power for read operations entirely from the 1-Wire™ communication line by storing energy on an internal capacitor during periods of time when the line is high and operates off the capacitor during the low times. During programming, 1-Wire™ communication occurs at normal voltage levels (2.8 to 6 volts) and is pulsed to the programmed voltage (11 to 12 volts) to cause the selected bits in EPROM module 300 to be programmed.

One design problem addressed by preferred embodiments is that they must receive address, data, and power using one I/O pin, whereas traditional EPROM systems typically have multiple data and power pins. A gate voltage of about 12 volts and drain voltage of about 8 volts is needed to program a typical EPROM cell. Moreover, standard CMOS fabrication processes cannot generally handle a 12 volt power supply, so that the normal ESD structure had to be redesigned.

Four circuit blocks in subcircuit PWRCAP of IO module 100 combine to derive the proper voltages at the proper times for EPROM reading and programming (see FIG. 2B):
(1) VDD switching circuitry 187 107 A–B and 105
(2) Programming pulse detector 104
(3) Gate voltage switching circuitry 131
(4) Drain voltage switching circuitry 103

First, regarding the programming pulse detector 104: When a programming pulse is not in progress, i.e., when IO is at 6V or less, the diode I174 operates in cutoff mode, so negligible reverse current flows through diode I174 and resistor R164, therefore the voltage at RAWPP is almost 0V. When a programming pulse is in progress, i.e. when IO is between 11V and 12V, diode I174 operates in reverse-breakdown mode with a reverse breakdown voltage of about 9V; therefore, the voltage at RAWPP is between 2V and 3V, which is high enough to be deemed a logical 1 by the 3 n-channel MOSFETs N53, N97, and N325, and the low-threshold inverter I85 to which RAWPP fans out.

Second, regarding the VDD switching circuitry 105: The internal power supply VDD is implemented as parallel capacitors C187, C203, C200, and C199. The voltage on VDD is subject to the following constraints:
(1) When IO is at a high logic level but not a programming voltage (i.e. between 2.8V and 6V, as much charge as possible must be allowed to flow onto the capacitors.
(2) When IO is at a low logic level (Or), charge must be prevented from flowing off of the capacitors back through the IO pin.
(3) When a programming pulse is in progress (i.e. IO is at a voltage between 11V and 12V), the voltage VDD across the capacitors must be kept below about 8.5V, since all of the normal CMOS structures powered by VDD break down at voltages higher than that.

The circuitry operates as follows: In the absence of a programming pulse, the voltage at RAWPP is nearly 0 volts. This causes n-channel transistor N53 to be non-conducting. There is therefore minimal current flowing through resistors R64 and R320 between the nodes 'pwrl' and 'rbase', and thus a minimal voltage drop across these resistors. NPN transistor Q1 therefore acts as a diode. When IO is at a high logic level, current flows across resistor R103, through forward-biased diode-connected transistor Q1, and onto the parallel capacitors C187, C203, C200, and C199 which form VDD. When IO is at a low logic level, diode-connected transistor Q1 is reverse-biased, which inhibits current from flowing off of VDD.

In the presence of a programming pulse, RAWPP is pulled high, which causes n-channel transistor N53 to become conducting, pulling 'rbase' to 0 volts. This causes NPN transistor Q1 to become non-conducting. Current then flows through diode-connected NPN transistor Q127 and the two parallel resistor-resistor-diode combinations R306-R307-Q176 and R328-R327-Q330 onto VDD. Reverse-biased diode-connected transistors I309 and I329 clamp nodes DD2 and DD2a to approximately 9 volts, so VDD is limited to a voltage one diode level below 9 volts, or about 8.3 volts.

Third, regarding the gate voltage switching circuitry 131: The voltage at the gates of EPROM cells, realized by the node V120R5, during reading and programming is subject to the following constraints:
(1) When reading a cell, V120R5 must be driven to the clamped read voltage, as explained above.
(2) When programming a cell, V120R5 must be driven to the programming voltage.

The circuitry operates as follows: When a programming pulse occurs, the programming pulse detector circuitry 104 described herein above causes RAWPP to take on a value of logic '1'. Inverters I85, I73, I93, I71, and I88 cause the node PROGPb to be driven to 0 volts. Level Shifter circuit I153 causes PPbLS to be driven to 0 volts as well. P-channel transistors P82 and P92 are therefore both conducting and n-channel transistor N78 is not, so there is a low-impedance path between I01, PP1, and V120R5. PP1 is driven to the high programming voltage (11 to 12 volts) which is present on I01. This causes p-channel transistor P83 to be non-conducting, which isolates V120R5 from VREAD and VDD. Therefore, V120R5 is driven to the programming voltage present on I01.

When a cell is being read rather than programmed, the programming pulse detector circuitry causes the node PROGP to be driven to 0 volts and the node PROGPb to be driven to internal VDD, which is one diode level below the voltage on I01, as explained herein above in the explanation of the VDD switching circuitry. Level Shifter I153 causes PPbLS to be driven to the full voltage on I01. This causes p-channel transistor P82 to be non-conducting. N-channel transistor N78 is conducting, so the node PP1 is driven to 0 volts. P-channel transistor P92 is non-conducting, and p-channel transistor P83 is conducting. This causes V120R5 to be isolated from I01 and connected to VREAD. When a cell is being read, READE is driven high, causing p-channel transistor P245 to be nonconducting and n-channel transistor N146 to be conducting. As explained herein above, UNCL is held low during normal operation; its use is generally restricted to a test mode situation, so n-channel transistor N154 is conducting as well. This configuration allows current to flow through resistor R151, diodes Q139, Q143, Q145, and Q144, and n-channel transistors N154 and N146 to GND. As explained herein above in the explanation of read voltage clamping, this causes VREAD to be driven to a clamped read voltage. Since there is a low-impedance path between VREAD and V120R5, the latter, which is connected to the gate of the EPROM cell, is also driven to the clamped read voltage.

Fourth, regarding the drain voltage switching circuitry 107B: The voltage at the drains of EPROM cells, realized by the node VREAD, during reading and programming is subject to the following constraints:
(1) When reading a cell, VREAD must be clamped to a reasonably low voltage, for the reasons cited herein above in the explanation of the clamping circuitry.
(2) When programming a cell, VREAD must be driven to a voltage as close to 8.5V as possible for all allowable temperatures, programming voltages on IO, and programming currents (which vary according to the number of bits, ranging from zero to eight, being programmed simultaneously). The extent to which a cell is programmed depends heavily upon the drain voltage during programming, so it is very desirable to achieve as high a drain voltage as possible without breaking down the CMOS structures in the programming path.

The circuitry operates as follows: When reading a cell, RAWPP is driven to a low voltage, so PROGP is as well. This causes the inverter formed by P298 and N300 to output a high voltage, which in turn drives 'dd2base' low. This causes NPN transistors Q240 and Q337 to be non-conducting, which isolates VREAD from DD2 and DD2A. VREAD is therefore driven to the clamped read voltage, as described herein above in the explanation of the gate voltage switching circuitry 107A.

In the presence of a programming pulse, 'dd2base' is driven to the same voltage as is on DD2, so transistors Q240 and Q337 operate as forward-biased diode-connected transistors, so that VREAD displays the same voltage characteristic as VDD, as described herein above. The voltage across a diode decreases with temperature given a constant current, whereas the voltage across a resistor increases with temperature given a constant current. Therefore, to achieve temperature independence, resistors R306 and R307 are made of different materials with different temperature coefficients and are rationed in such a way that the aggregate resistance has a temperature coefficient which is the reciprocal of the temperature coefficient of the two diodes Q127 and Q240, producing an overall structure with negligible temperature coefficient. The resistors are sized such that with the lowest possible programming voltage and the highest possible programming current, the voltage at DD2 is 9 volts, with negligible reverse current flowing through diode I309. Any increase in programming voltage cannot increase the voltage of DD2, because of the clamping diode I309; instead, additional current flows through the resistors and across the diode. Any decrease in programming current cannot cause a corresponding decrease in current across the resistors, since that would raise the voltage at DD2, and that is prohibited by the clamping diode I300. Instead, any decrease in programming current causes an equal increase in current across the clamping diode I300, with the total current through the resistors and the voltage at DD2 to remaining the same. Since the voltage at DD2 is driven to 9V under all possible programming conditions, the voltage at VREAD is driven consistently to a voltage one diode level below 9V, or about 8.3V. The resistor-diode chain is split into two parallel paths in order to reduce the total current which could flow across the reverse-biased diodes I309 and I329 and prevent these devices from snapping back. As a result, theses circuits provide for a high voltage (and high current) path to EPROM module 300, which is necessary to program the cells in EPROM module 300.

FIG. 2C is a schematic showing the actual circuitry of a preferred embodiment of I/O PULLDOWN POR module 104, which, in turn, comprises power on reset circuitry 141, open drain output circuitry 143, and double stack ESD diodes 145. Power-on-reset circuitry 141 outputs a logical high on POR signal, which initializes the logic contained in the overall circuit shown in FIG. 10. Power-on-reset circuitry 141 is a low-DC power and reset device 10 (see FIG. 1A). Open drain output circuitry 143 is preferably a high voltage N-channel pull-down, which allows for the standard one-wire™ communication protocol. Double stack ESD diodes 145 provides the enhanced ESD protection and allows the I/O pin to be brought to 12 volts without the ESD protection circuitry breaking down.

FIG. 2D is a schematic showing the actual circuitry of a preferred embodiment of IOBUF module 106, which is the input buffer.

FIG. 2E is a schematic showing the actual circuitry of a preferred embodiment of ATOS module 108, which implements oscillator overhead and control functions (e.g., the one-wire™ state machine 151 and one-wire™ system clock 109), which has been described in the reference. The one-wire™ state machine 151 to interpret the one-wire™ communication and to create the three-wire communication, which implements the one-to-three wire conversion functionality, which is discussed in detail in several of the patents incorporated by reference. The one-wire™ system clock 109 provides the necessary clocking functions to implement the one-wire™ protocol as well as the clocking functions to other circuitry in device 10. TPOSC module 109 is preferably a cross-coupled oscillator and is more fully reviewed in U.S. Pat. No. 4,868,525 (DSC-99), which is hereby incorporated by reference, and is used to enhance the stability in timing characteristics of the overall circuit. FIG. 2L is a schematic showing the actual circuitry of a preferred embodiment of OSCCAP module 117 (in FIG. 2H). FIG. 2M is a schematic showing the actual circuitry of a preferred embodiment of OSCRES module 119 (in FIG. 2H). OSCCAP module 117 and OSCRES module 119 work together to implement a bimodal RC oscillator for clocking purposes for state machine 151 during actual one-wire™ communication.

Figure 2F:
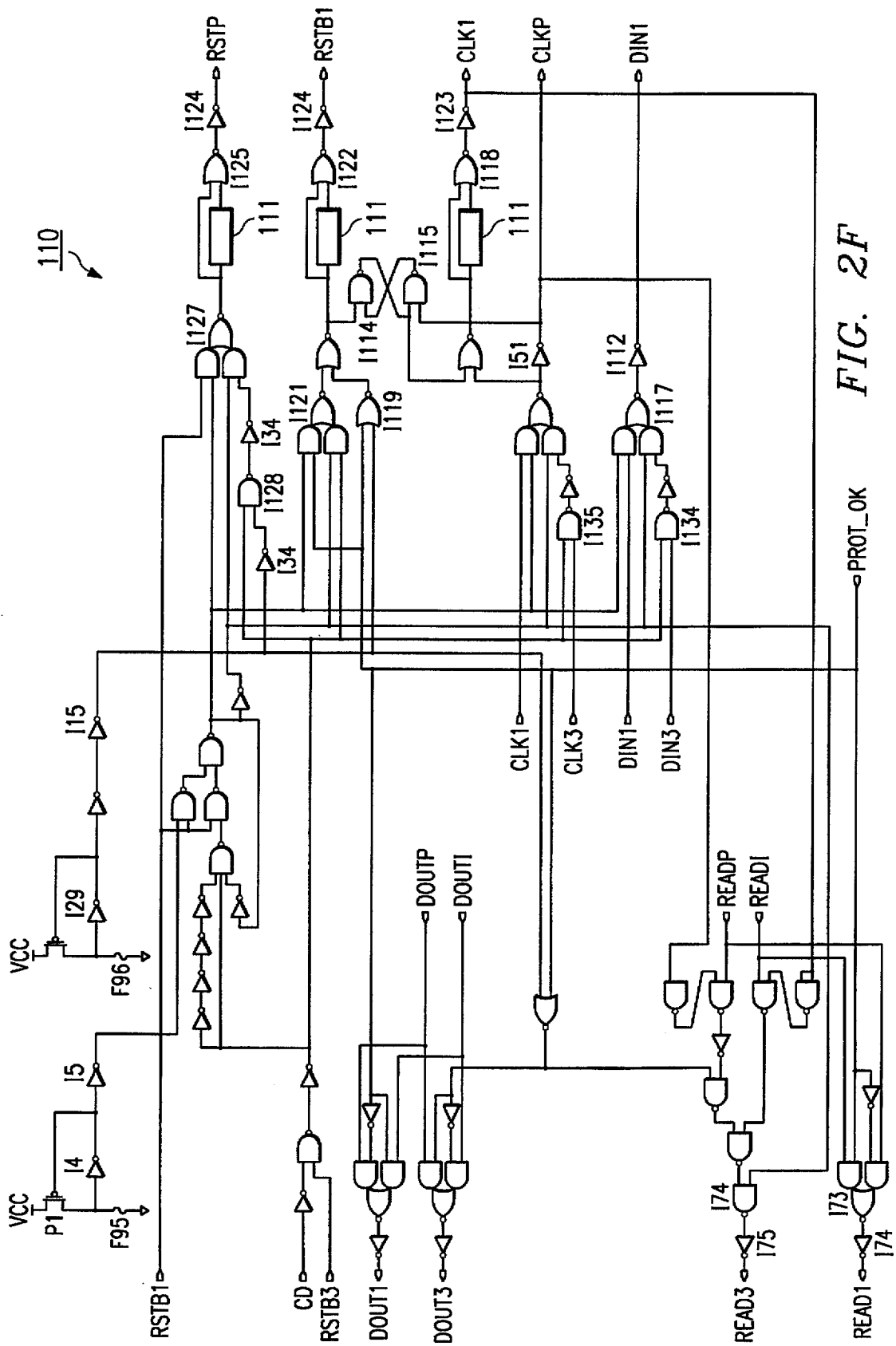
FIG. 2F is a schematic showing the actual circuitry of a preferred embodiment of PORT ARBITRATION module 110, which directs data from/to ROM or EPROM module 300 (in FIG. 1O)

FIG. 2F is a schematic showing the actual circuitry of a preferred embodiment of PORT ARBITRATION module 110, which directs data from/to laser ROM section or EPROM module 300 (in FIG. 10). In addition, PORT ARBITRATION module 110 comprises circuitry to arbitrate between the one-wire™ and three-wire ports and arbitrates between the data and clock are coming from/to EPROM module 300 and 1-WIRE PROTOCOL module 112. This arbitration circuitry normally gives the three-wire port priority over the one-wire port, but this priority can be reversed by a simple fuse programmation in the manufacturing stages F96. Note FIG. 2F also contains another module 111 labeled "TD1". FIG. 2I is a schematic showing the actual circuitry of a preferred embodiment of TD1 module 111 (in FIG. 2F), which supplies a necessary delay.

Figure 2G:
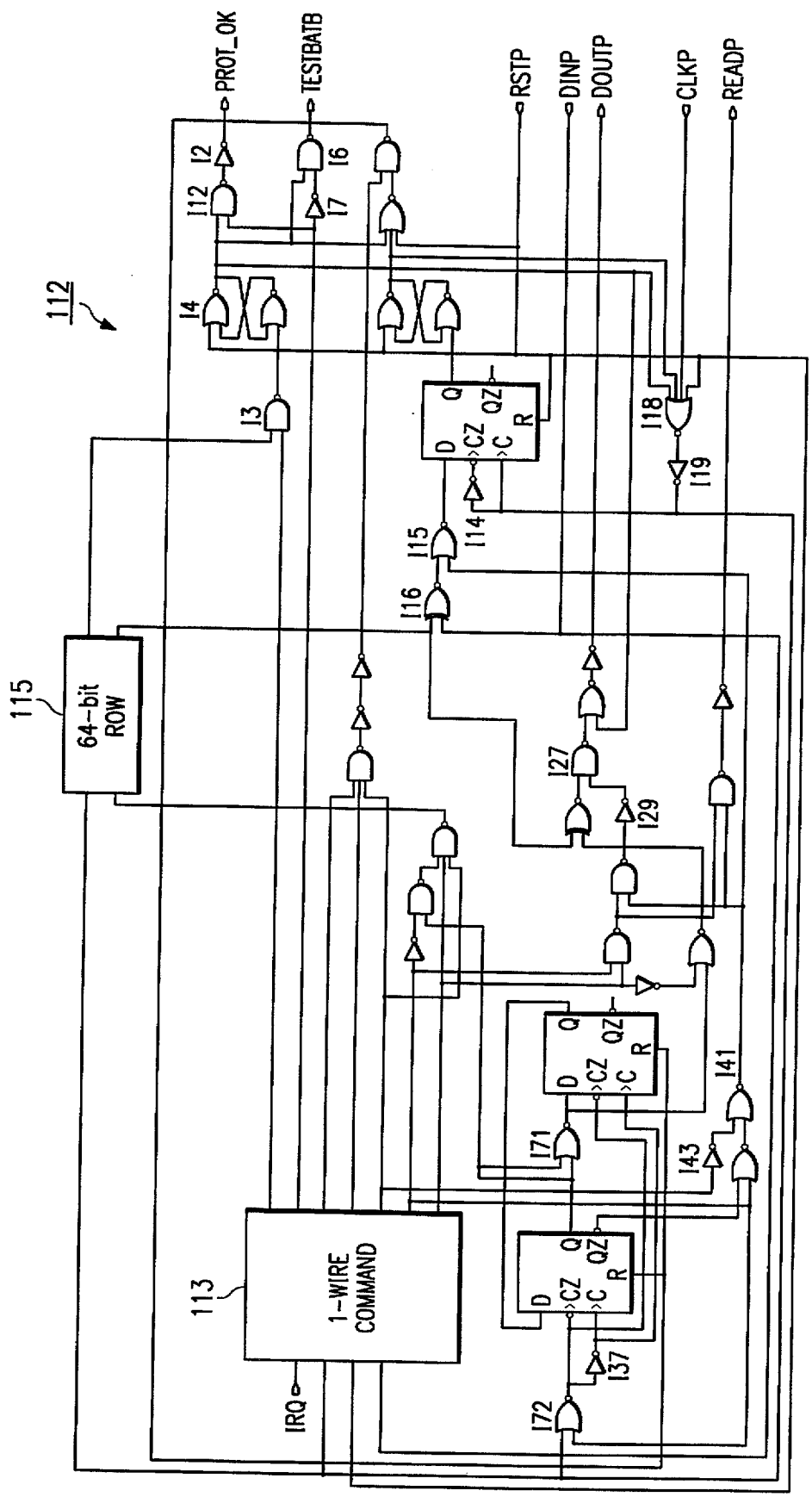
FIG. 2G is a schematic showing the actual circuitry of a preferred embodiment of 1-WIRE PROTOCOL module 112, which implements the one-wire™ command decode and laser ROM bits.
Figure 2H:
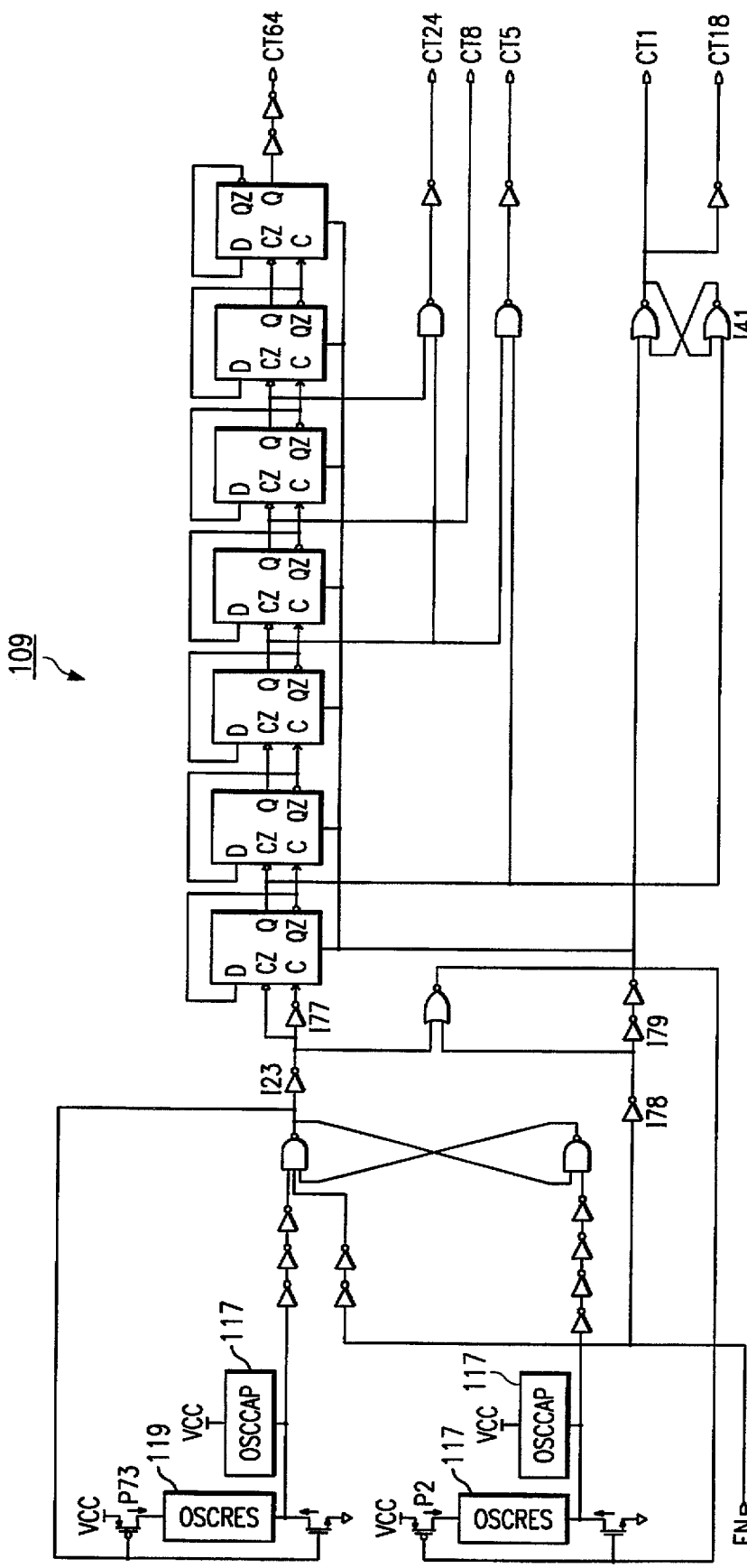
FIG. 2H is a schematic showing the actual circuitry of a preferred embodiment of TPOSC module 109 (in FIG. 2E) which generates the one-wire system clock.
Figure 2I:
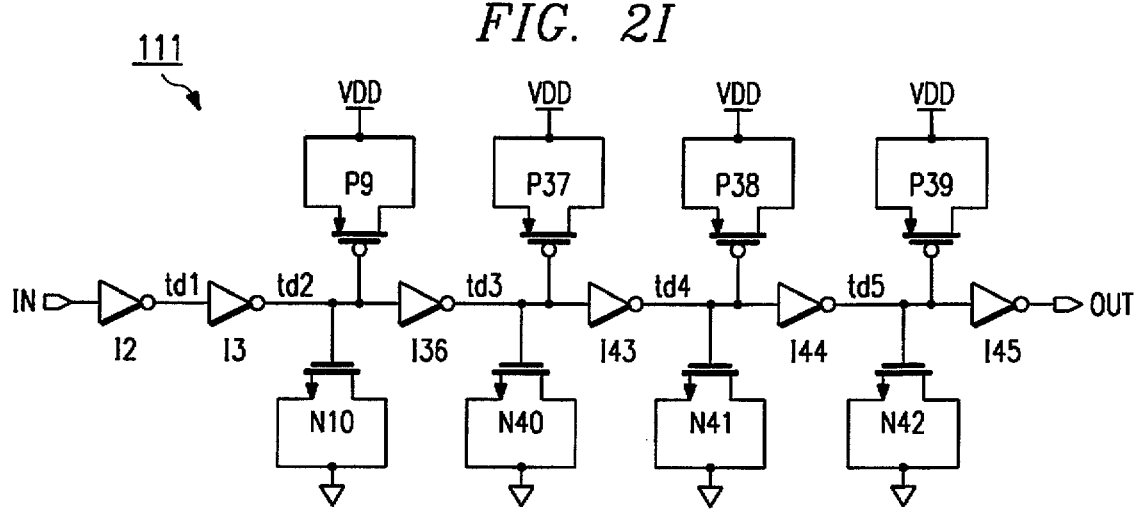
FIG. 2I is a schematic showing the actual circuitry of a preferred embodiment of TD1 module 111 (in FIG. 2F) which suppresses glitches in data directed to EPROM module 300.
Figure 2L:
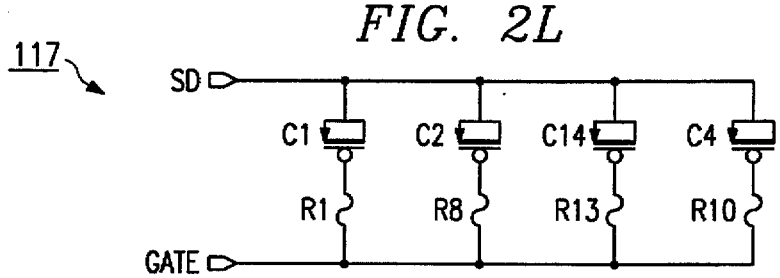
FIG. 2L is a schematic showing the actual circuitry of a preferred embodiment of OSCCAP module 117 (in FIG. 2H)
Figure 2M:
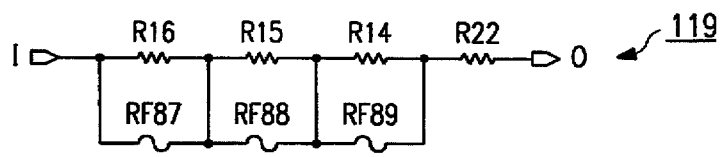
FIG. 2M is a schematic showing the actual circuitry of a preferred embodiment of OSCRES module 119 (in FIG. 2H) which, together with OSCCAP, creates the timing delay required for the one-wire system clock.
Figure 2J:
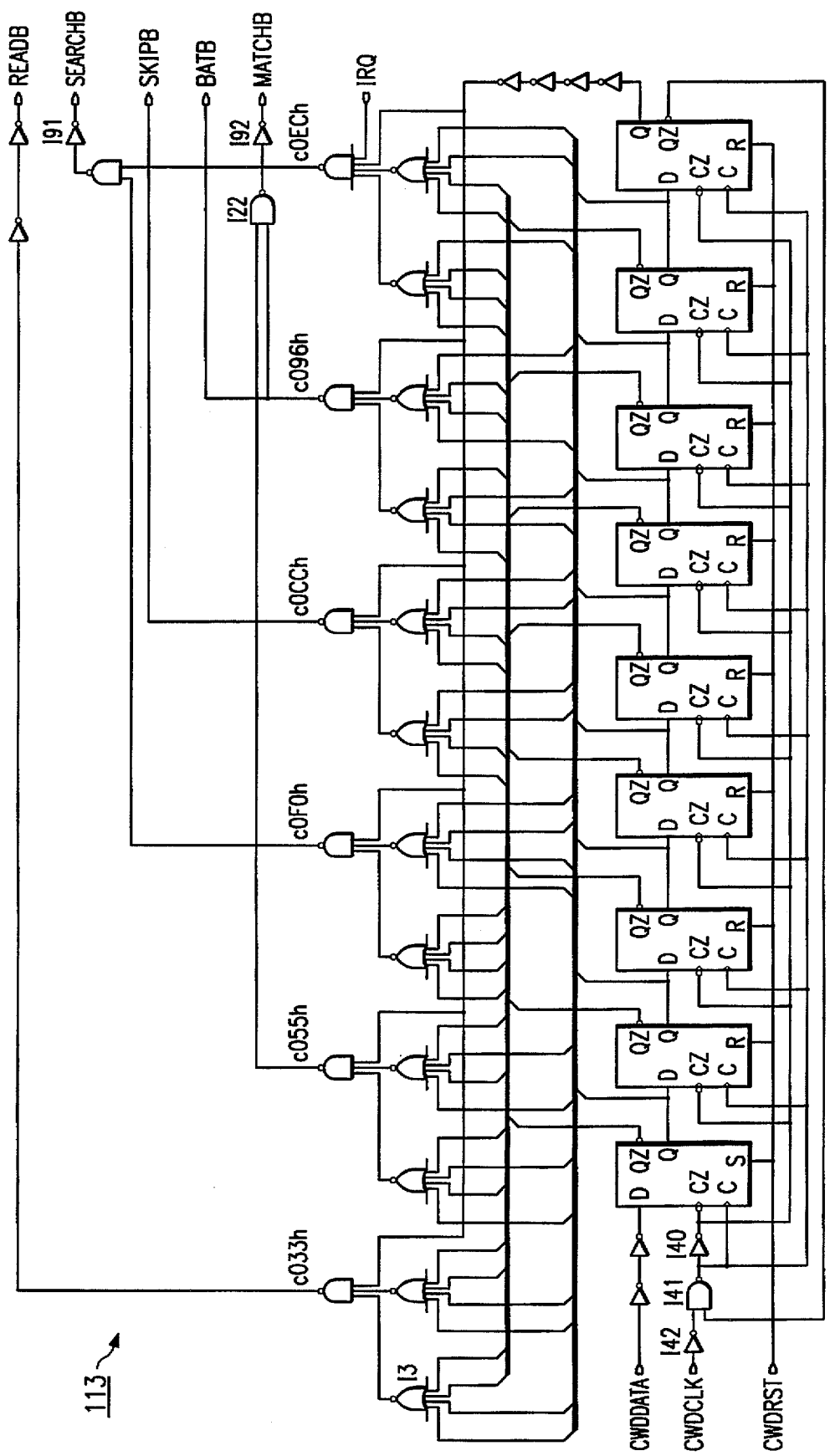
FIG. 2J is a schematic showing the actual circuitry of a preferred embodiment of OWCMD module 113 (in FIG. 2G) which decodes all 1-wire commands.
Figure 2K:
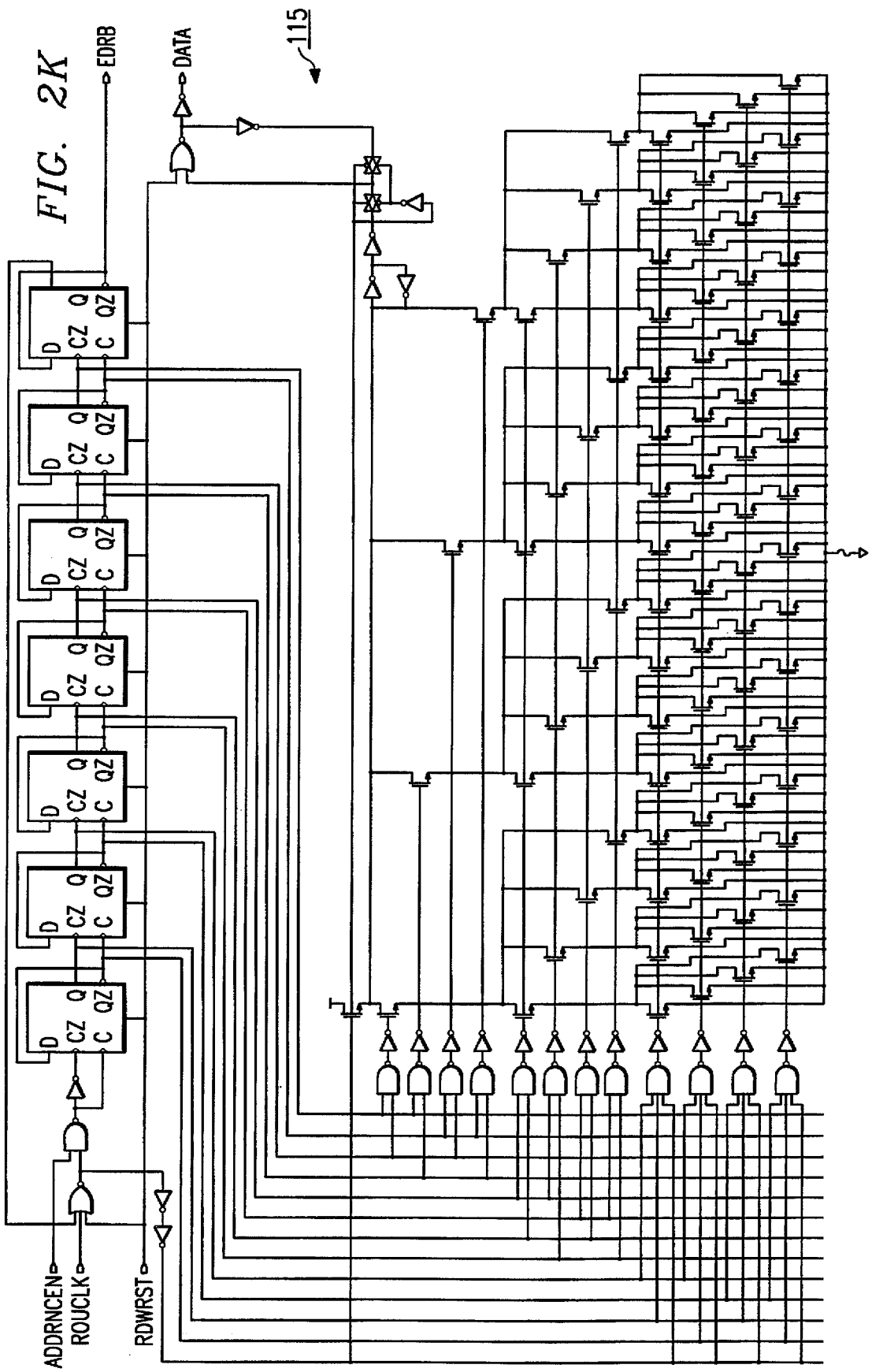
FIG. 2K is a schematic showing the actual circuitry of a preferred embodiment of ROM 64 module 115 (in FIG. 2G) which comprises the 64-bit ROM serial number.
Figure 2N:
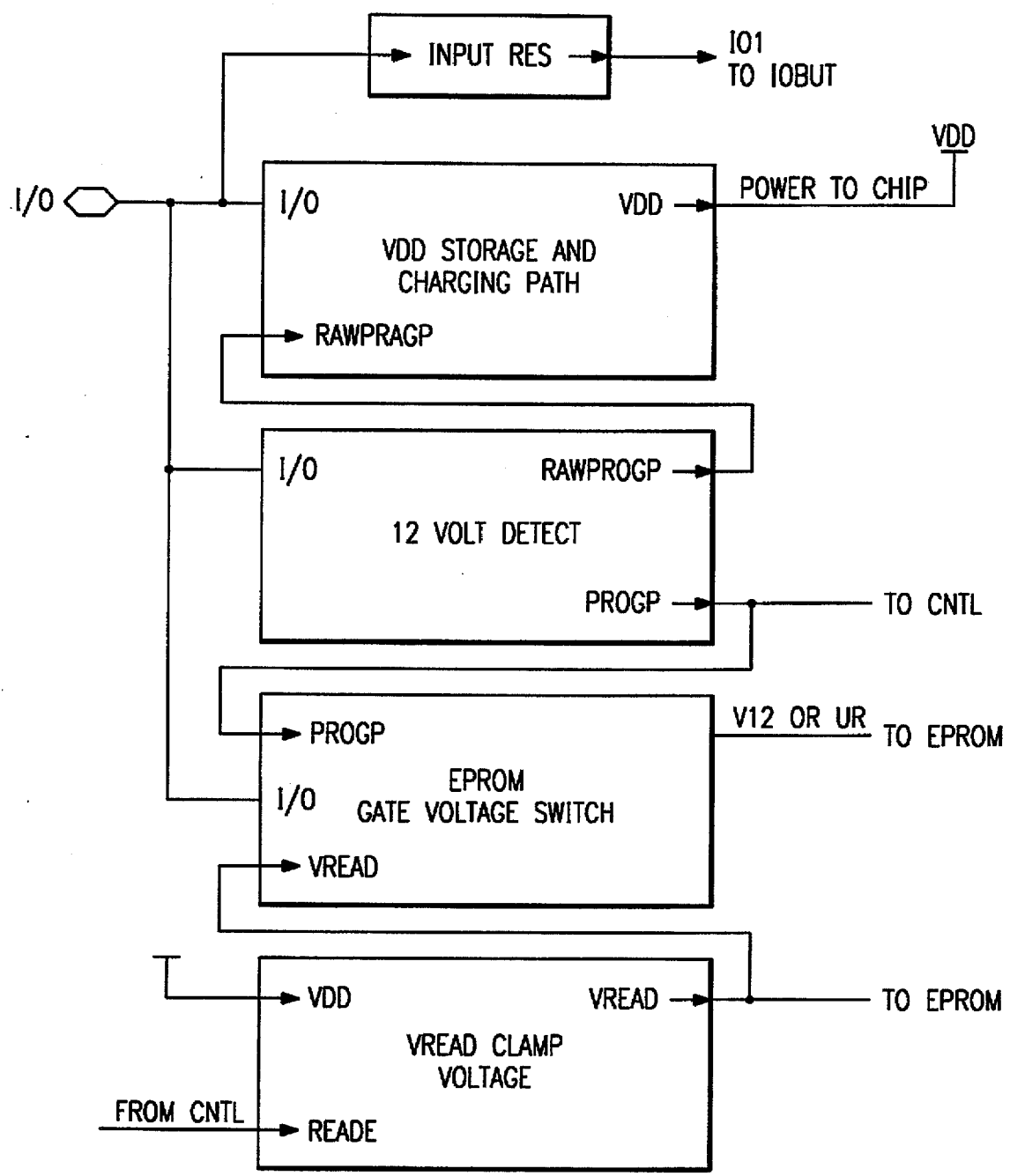
FIG. 2N is a block diagram that shows the relationships between parasite power capacitors 105, charging diodes 101, which charge parasite power capacitors 105 during normal operation, programming circuit 107A and 107B which charge parasite power capacitors 105 during programming operations, read voltage clamping circuit 103, and read/12v gate switching circuit 131, in which the actual circuitry of a preferred embodiment of PARASITIC CAPACITOR/VOLTAGE GENERATOR module 102 (in FIG. 2B)

FIG. 2G is a schematic showing the actual circuitry of a preferred embodiment of 1-WIRE PROTOCOL module 112, which implements the one-wire™ command decode and laser ROM bits. FIG. 2J is a schematic showing the actual circuitry of a preferred embodiment of OWCMD module 113 (in FIG. 2G). Similarly, FIG. 2K is a schematic showing the actual circuitry of a preferred embodiment of ROM64 module 115 (in FIG.

Figure 3A:
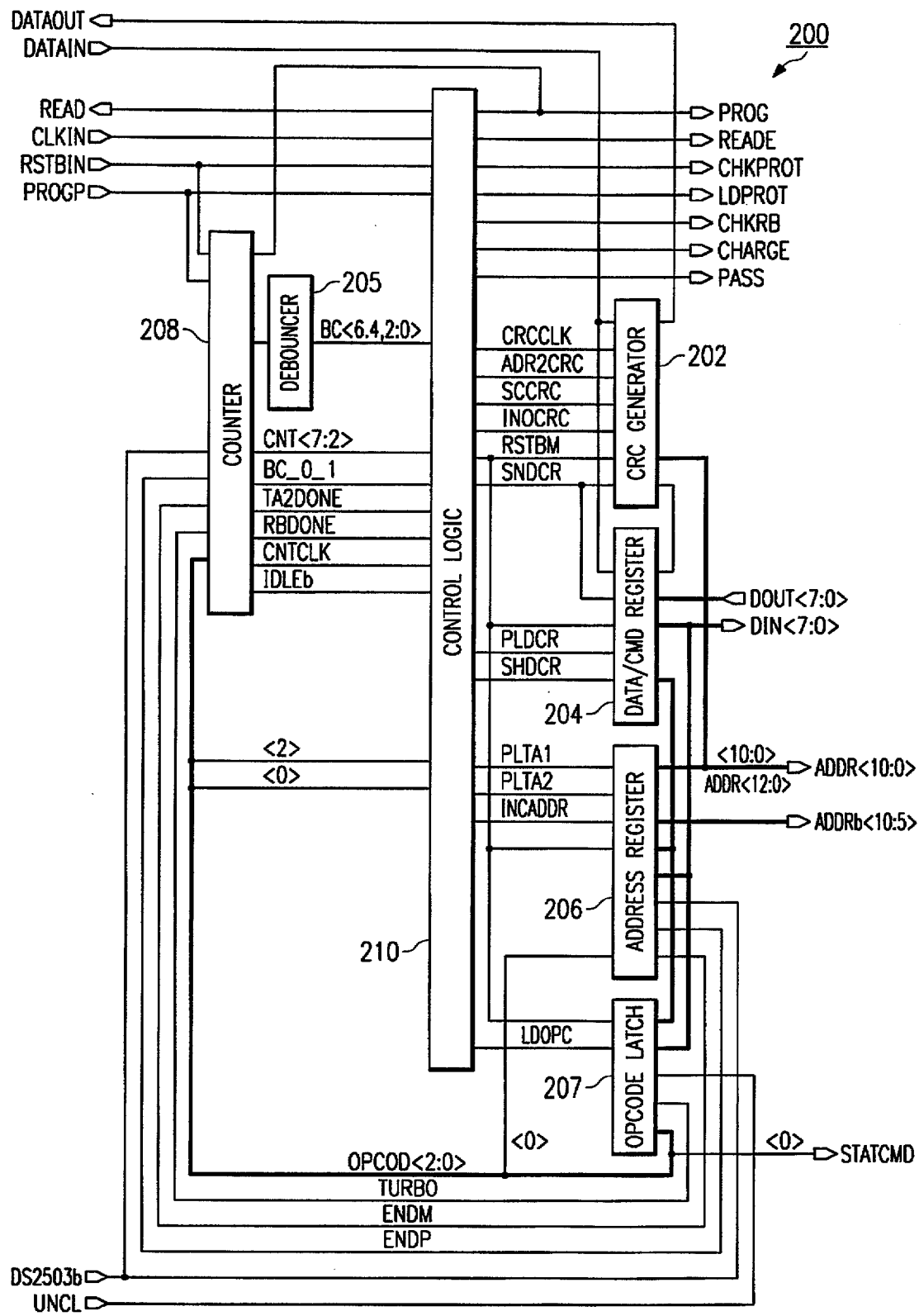
FIG. 3A is a block diagram showing the architecture of a preferred embodiment of control module 200 of device 10 shown in FIG. 1O, which generally comprises CRC GENERATOR module 202, DATA/CMD REGISTER module 204, ADDRESS REGISTER module 206, COUNTER module 208, CONTROL LOGIC module 210, and OPCODE LATCH 207 coupled together.

FIG. 3A is a block diagram showing the architecture of a preferred embodiment of control ("CNTL") module 200 of device 10 shown in FIG. 10, which generally comprises CRC GENERATOR module 202, DATA/CMD REGISTER module 204, ADDRESS REGISTER module 206, COUNTER module 208, CONTROL LOGIC module 210, and OPCODE LATCH 207, coupled together. In general, control module 200 evaluates data received from the three-wire information that was generated by the IO module 100 from the one-wire communication protocol and generates the EPROM commands, generates EPROM addresses, and generates EPROM byte buffer that holds data going into or out of EPROM module 300.

Figure 3B:
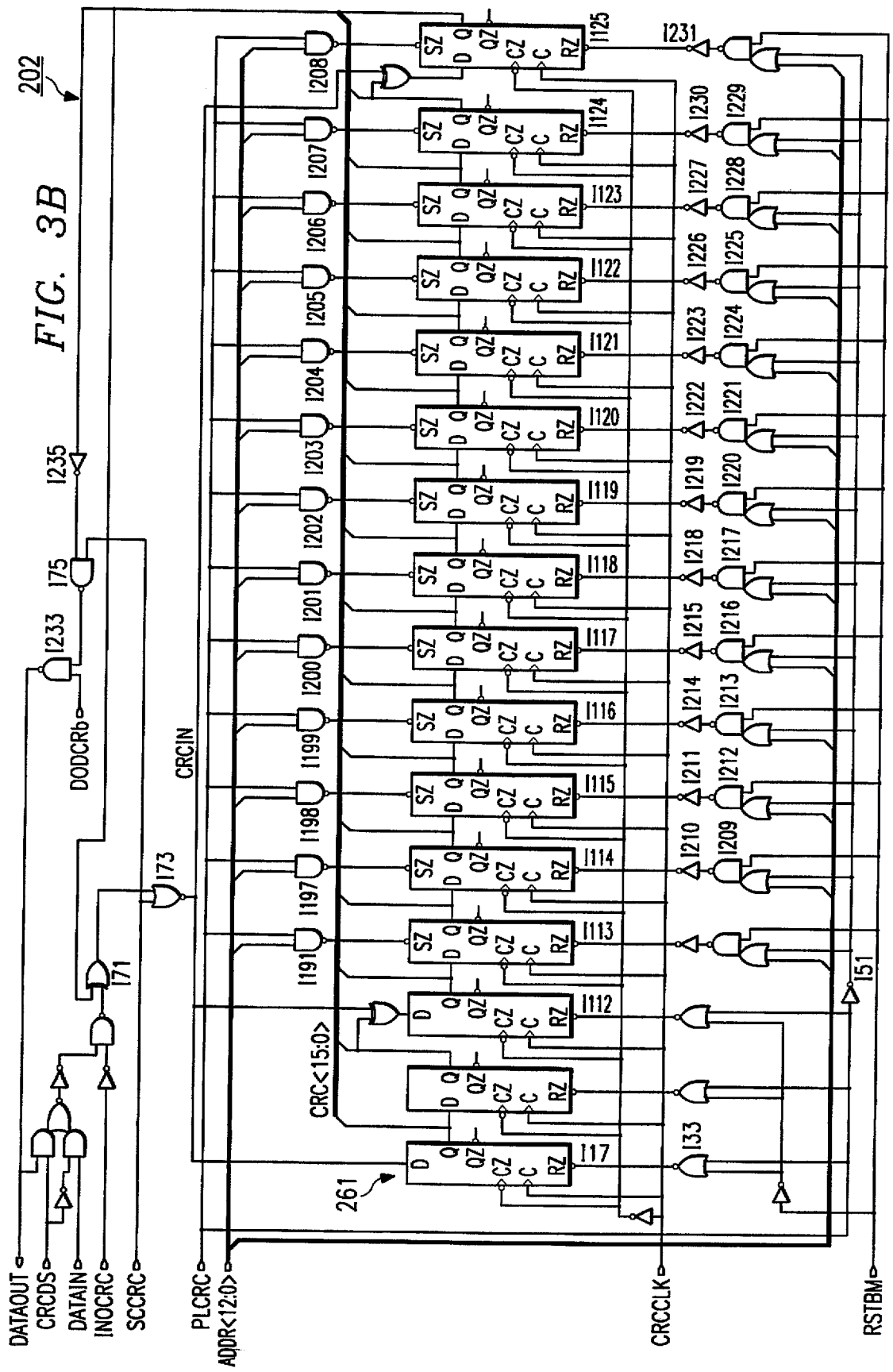
FIG. 3B is a schematic showing the actual circuitry of a preferred embodiment of CRC GENERATOR module 202, which generates various Cyclical Redundancy Checks ("CRCs") of address and data sent to and from EPROM block.

FIG. 3B is a schematic showing the actual circuitry of a preferred embodiment of CRC GENERATOR module 202, which generates various Cyclical Redundancy Checks ("CRCs") of address and data and functions as an EPROM "dataout" buffer. As a result, CRC GENERATOR module 202 enables additional bits stored in memory cells in EPROM module 300 to be programmed and still have a correct CRC of the new data or information being stored in memory in EPROM module 300. Data can be serially shifted out one bit at a time. As shown in FIG. 3B, CRC GENERATOR module 202 loads flip-flops 261, which combine to form a 16-bit shift register, in parallel and unload flip-flips 261 in series.

Figure 3C:
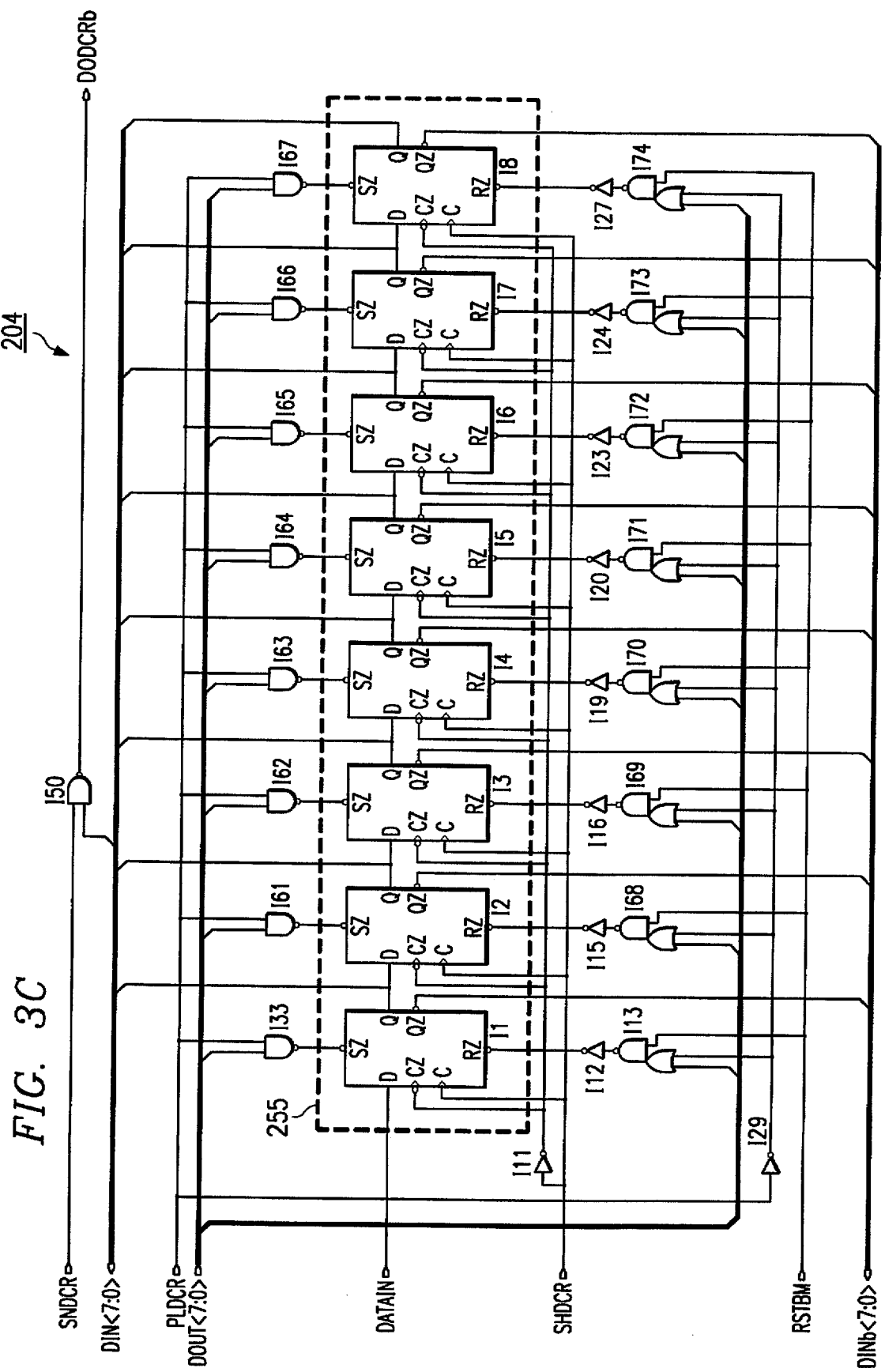
FIG. 3C is a schematic showing the actual circuitry of a preferred embodiment of DATA/CMD REGISTER module 204, which receives and directs all command, address, and data signals sent to EPROM module 300, and functions as a one-byte scratch pad.

FIG. 3C is a schematic showing the actual circuitry of a preferred embodiment of DATA/CMD REGISTER module 204, which decodes EPROM commands and EPROM data "in-out" buffer. As a result, DATA/CMD REGISTER module 204 shifts potential EPROM commands into the array of flip flops 255.

Figure 3D:
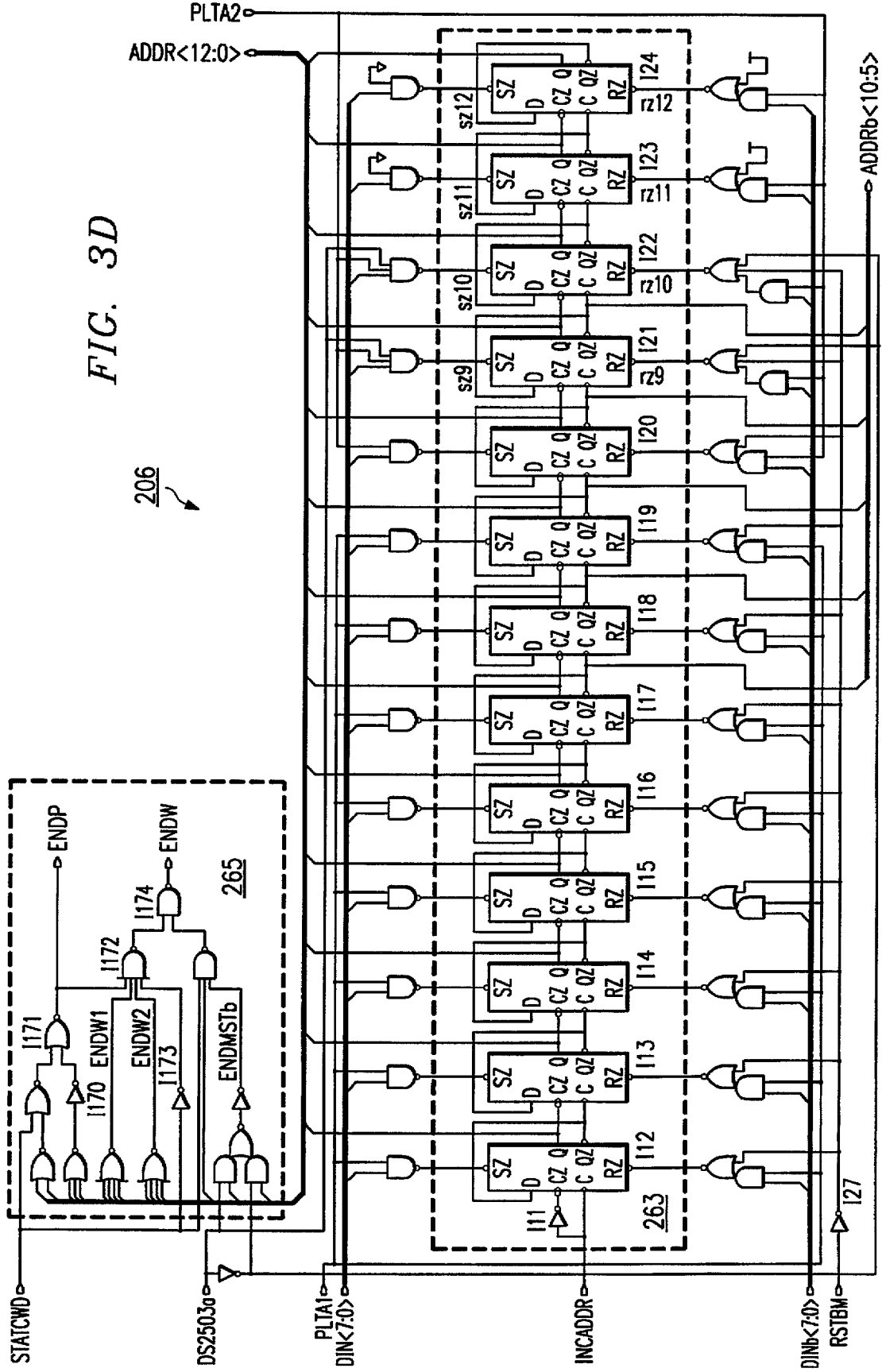
FIG. 3D is a schematic showing the actual circuitry of a preferred embodiment of ADDRESS REGISTER module 206, which stores the addresses used to access EPROM data.

FIG. 3D is a schematic showing the actual circuitry of a preferred embodiment of ADDRESS REGISTER module 206, which implements the address counter function. As shown in FIG. 3D, ADDRESS REGISTER module 206 preferably comprises a ripple counter 263 comprised of flip flops and has circuitry to load the ripple counter in parallel with one another. Address decode circuitry 265 determines the end of page (ENDP), end of memory (ENDM), and end of status (ENDS).

Figure 3E:
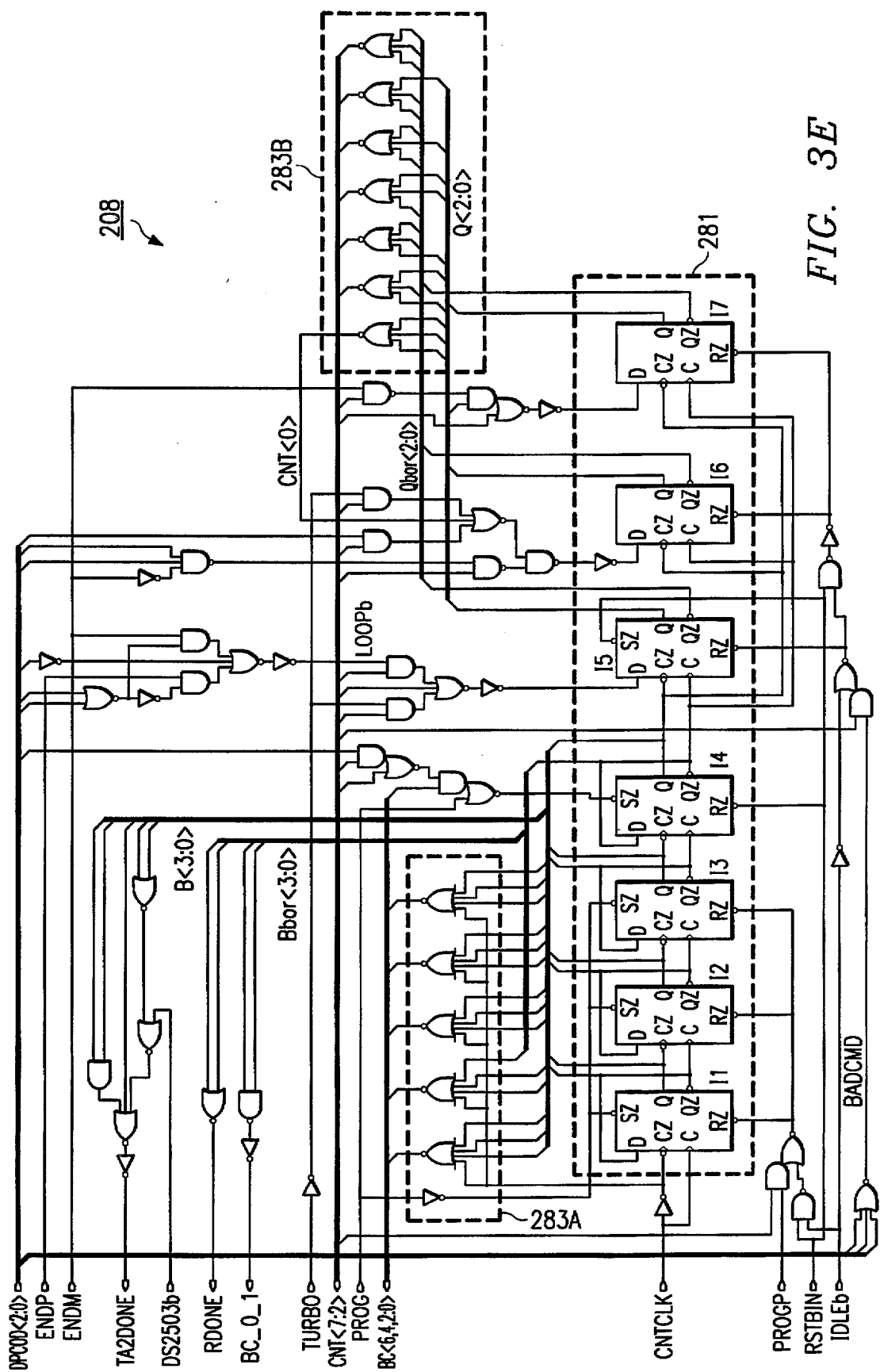
FIG. 3E is a schematic showing the actual circuitry of a preferred embodiment of COUNTER module 208 having state count decoder 283A and 283B which controls the sequence of operations according to the correct protocol.
Figure 3G:
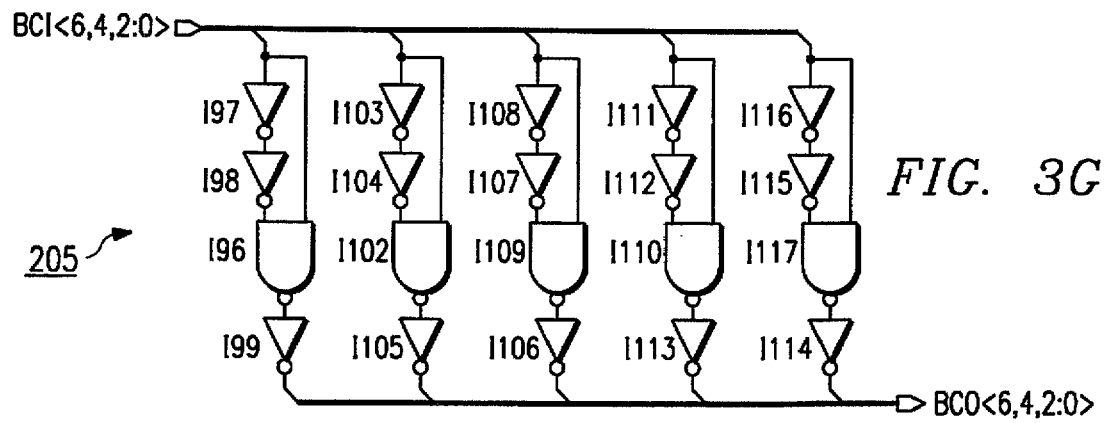
FIG. 3G is a schematic showing the actual circuitry of a preferred embodiment of COUNTER DEBOUNCER module 205, which filters glitches in the output generated by COUNTER module 208.
Figure 3I:
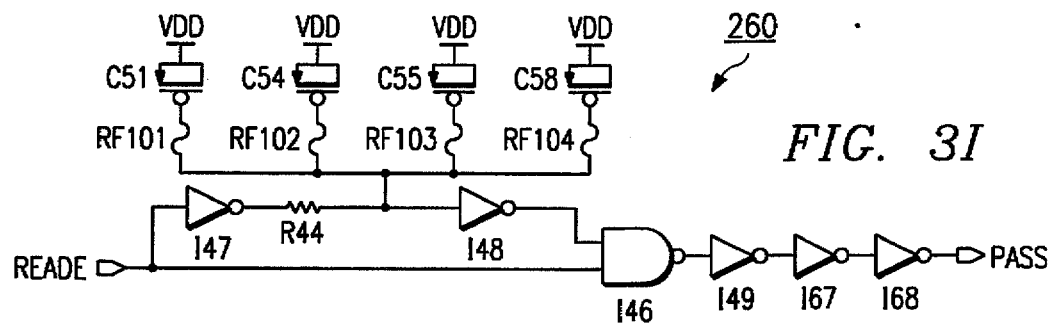
FIG. 3I is a schematic showing the PASS module 260 in CONTROL LOGIC module 210 in FIG. 3F, which, together with CHARGE and PASS, generate the timing signals required to read data from EPROM module 300.
Figure 3J:
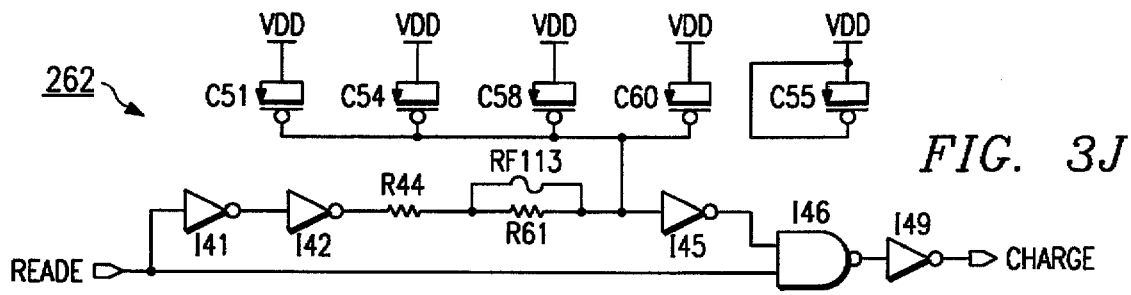
FIG. 3J is a schematic showing the CHARGE module 262 in CONTROL LOGIC module 210 FIG. 3F, which, together with CHARGE and PASS, generate the timing signals required to read data from EPROM module 300.
Figure 3K:
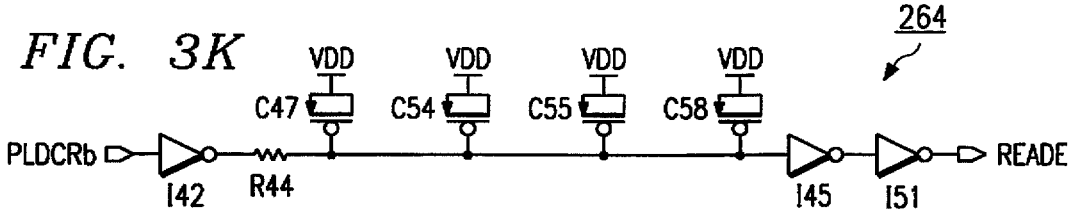
FIG. 3K is a schematic showing the READE module 264 in CONTROL LOGIC module 210 in FIG. 3F, which, together with CHARGE and PASS, generate the timing signals required to read data from EPROM module 300.
Figure 3H:
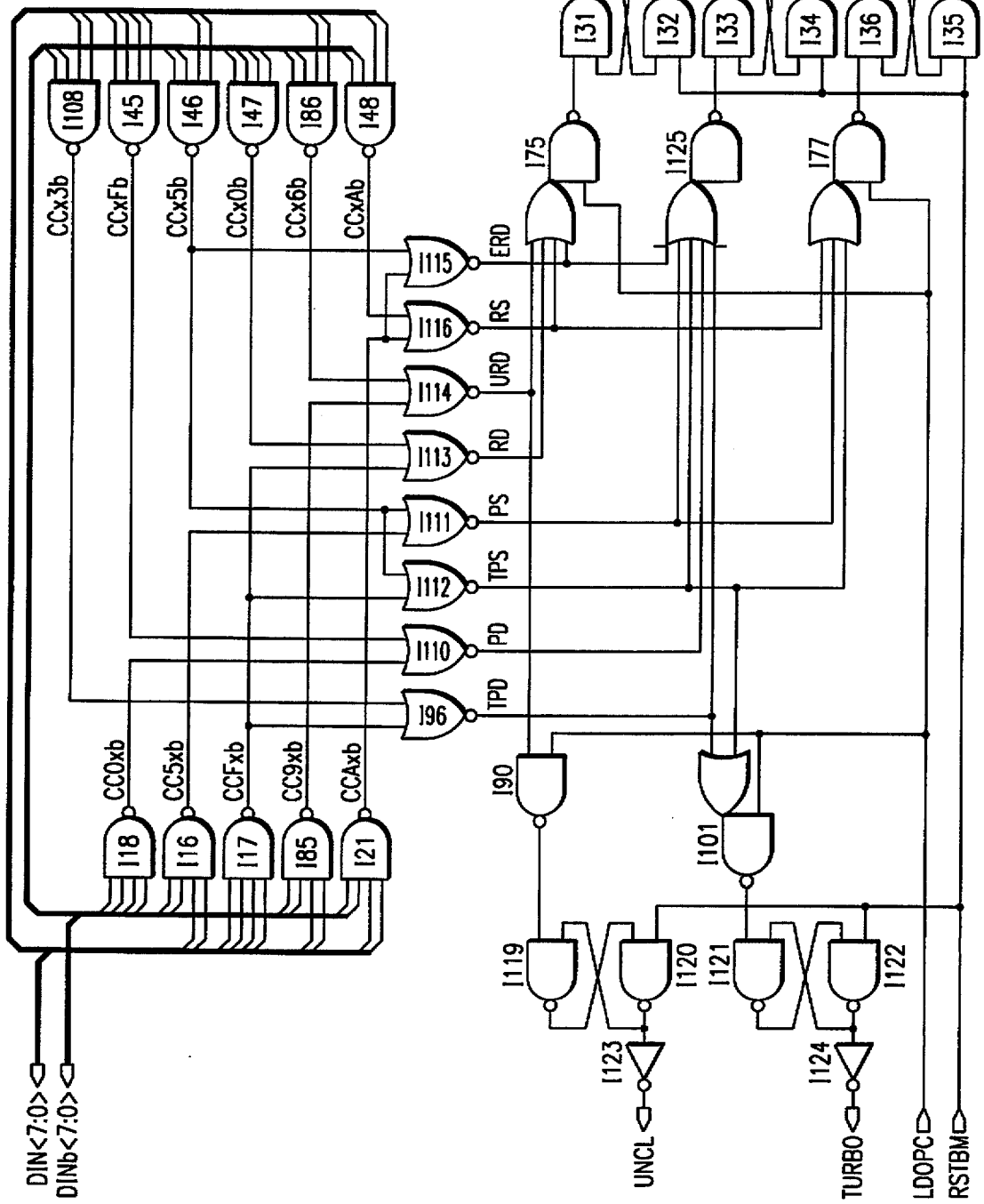
FIG. 3H is a schematic showing the actual circuitry of a preferred embodiment of OPCODE LATCH module 207, which latches the encoding of an EPROM command code.

FIG. 3E is a schematic showing the actual circuitry of a preferred embodiment of COUNTER module 208, which implements the state counter for keeping a count of the sequence of bytes coming into device 10 serially and through input/output module 100. The state counter implemented in COUNTER module 208 keeps track of the bytes in order to determine what state device 10 is in, so that the overall system can determine what to do next. Ripple counter 281, which is formed by a plurality of flip flops, generates a signal called bit 0 (the first bit), which is active when the first serial data bit is serially coming into the part. Logic circuitry 283A and B decodes the information contained in ripple counter 281 to determine the corresponding state. Note logic circuitry 283 also contains a glitch filter circuitry, to provide a glitch-free decode.

FIG. 3F is a schematic showing the actual circuitry of a preferred embodiment of STATE module 210, which functions as a state decode to decode the state count and the current EPROM command generated by COUNTER module 208 and generates outputs that control CRC GENERATOR module 202, DATA/CMD REGISTER module 204, ADDRESS REGISTER module 206, and COUNTER module 208.

FIG. 4A is a block diagram showing the architecture of a preferred embodiment of EPROM module 300 of device 10 shown in FIG. 10, which generally comprises COLUMN DECODER module 302, ROW DECODER module 304, PROTECTION BIT MUX module 306, and 67 ROW/32 COLUMN 8-BIT EPROM 309 coupled together.

FIG. 4B is a schematic showing the actual circuitry of a preferred embodiment of COLUMN DECODER 302, which implements a two stage decode function, that comprises BIT FINAL DECODE 320, which drives the drains of the EPROM cells for a 1-bit slice of the 8-bit slice to the correct voltage level, COLUMN ADDR MUX 322, which selects how the Address is going to be interpreted depending on whether one is addressing the main memory or the status memory, and COLUMN PREDECODE module 324, which is the first stage of the two stage decode.

FIG. 4C is a schematic showing the actual circuitry of a preferred embodiment of BIT SLICE FINAL DECODE module 320 of COLUMN DECODER 302 of FIG. 4B, which controls whether the column address is to be decoded as access to data memory or status memory;

FIG. 4D is a schematic showing the actual circuitry of a preferred embodiment of COLUMN ADDRESS MUX 322 of COLUMN DECODER 302 of FIG. 4B, which decodes the column address by selecting one of four sets of 8 byte columns and by selecting one of eight byte columns within a set;

FIG. 4E is a schematic showing the actual circuitry of a preferred embodiment of COLUMN PREDECODE module 324 of COLUMN DECODER 302 of FIG. 4B, which is the first stage of the two stage decode;

FIG. 4F is a schematic showing the actual circuitry of a preferred embodiment of BIT DRIVER module 332, which drives the drain of one single column according to the combination of outputs of COL. PREDEC. and BIT DRIVER;

FIG. 4G is a schematic showing the actual circuitry of a preferred embodiment of ROW DECODER module 304 OF FIG. 4A, which decodes rows, that generally comprises ROW PREDECODE module 344, STATUS ROW PREDECODE module 342, and ROW FINAL DECODE module 340.

FIG. 4H is a schematic showing the actual circuitry of a preferred embodiment of ROW FINAL DECODE module 340 of FIG. 4H, which implements the final decode stage.

FIG. 4I is a schematic showing the actual circuitry of a preferred embodiment of STATUS ROW PREDECODE module 342 of FIG. 4G, which determines whether to access any of the EPROM rows comprising status memory;

FIG. 4J is a schematic showing the actual circuitry of a preferred embodiment of ROW PREDECODE module 344 of FIG. 4G, which is the first stage of a two-stage decode for EPROM rows comprising data memory;

FIG. 4K is a schematic showing the actual circuitry of a preferred embodiment of PROTECTION BIT MUX module 306 of FIG. 4A, which implements column read buffers.

FIG. 4L is a schematic showing the actual circuitry of a preferred embodiment of 67 ROW/32 COLUMN 8-BIT EPROM 309 of FIG. 4A.

Figure 4M:
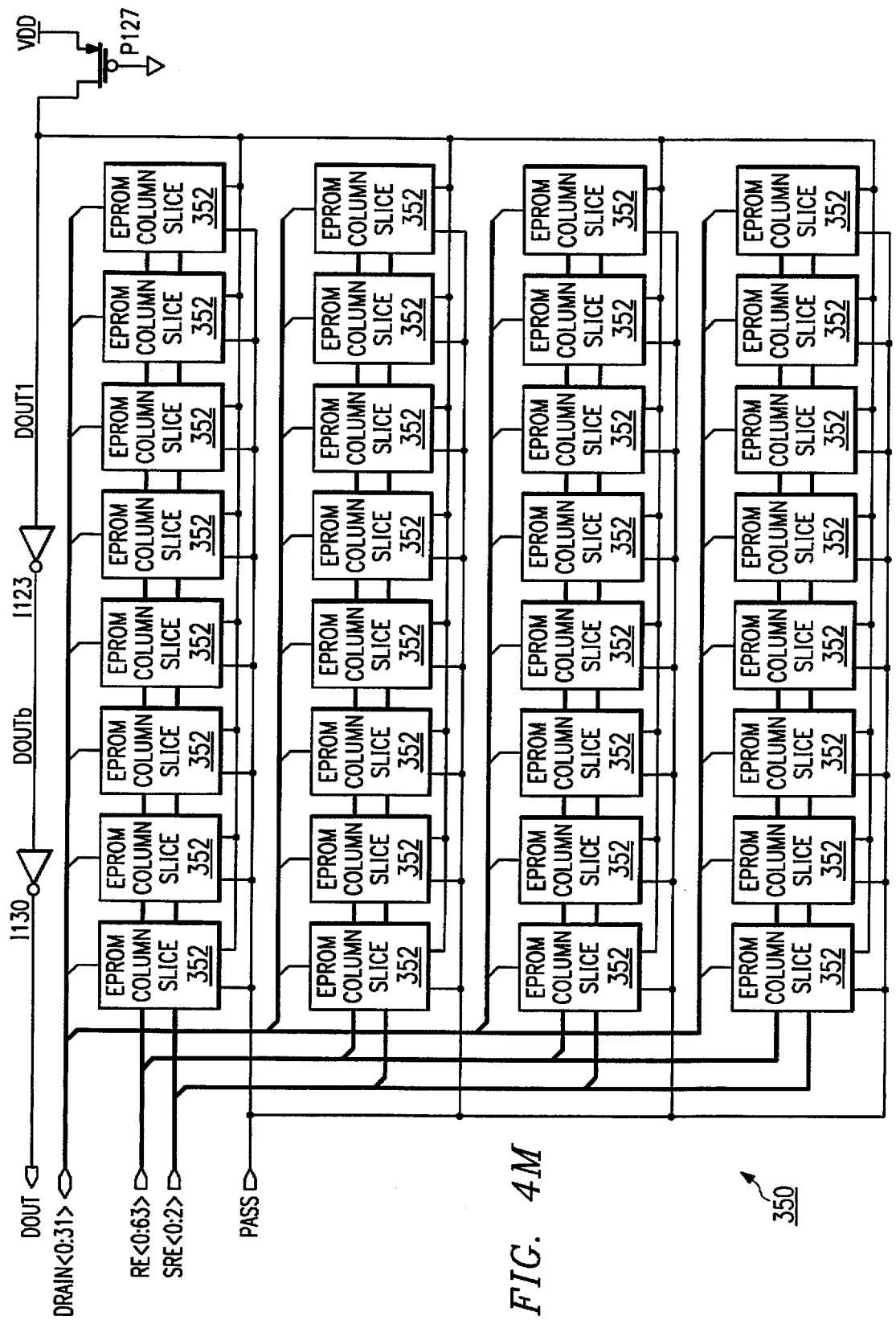
FIG. 4M is a schematic of an exemplary EPROM BIT SLICE.

FIG. 4M is a schematic showing the actual circuitry of a preferred embodiment of EPROM BIT SLICE 350 OF 67 ROW/32 COLUMN 8-BIT EPROM 309 of FIG. 4L.

FIG. 4N is a schematic showing the actual circuitry of a preferred embodiment of EPROM COLUMN SLICE module 352 of EPROM BIT SLICE 350 of FIG. 4M.

FIGS. 5A and 5B show preferred conductive modules in which the circuitry shown and described above is placed. Alternate packages are shown in FIGS. 6A and 6B.

FURTHER MODIFICATIONS AND VARIATIONS

Although the invention has been described with reference to a specific embodiment, this description is not meant to be construed in a limiting sense. In particular, novel aspects of the inventions described above and shown in the drawings may stand alone and/or be selectively combined in an overall system. In other words, while preferred embodiments may incorporate most or all of the features described above, alternate preferred embodiments may only incorporate a selected number of the features, depending upon the application. As described above, various modifications of the disclosed embodiment as well as alternate embodiments of the invention will become apparent to persons skilled in the art upon reference to the description of the invention. For instance, additional conductive surfaces (beyond the first and second conductive surfaces/contacts disclosed) could be added to provide additional electrical contacts housed therein. Naturally, it is preferred that the additional surfaces would be insulated from one another. Accordingly, it should be understood that the modifications and variations suggested above and below are not intended to be exhaustive. These examples help show the scope of the inventive concepts, which are covered in the appended claims. The appended claims are intended to cover these modifications and alternate embodiments as well as a host of applications of this technology. In particular, permanent ID records, maintenance or warranty information, calibration or baseline set-up data, monetary equivalent, event attendance monitoring, etc. In addition, please note that while preferred systems employ electrically programmable read only memory, other forms of electrically programmable memory can be used as well. For instance, EPROM can be used as well. Moreover, please note that while inventions described above are discussed in conjunction with one another, alternate embodiments may only incorporate some of the preferred features and innovations or different combinations of preferred features and innovations described above without departing from the spirit and scope of the inventions claimed below. Similarly, while preferred embodiments are packaged in substantially token-shaped modules described and shown above, alternate embodiments can be packaged in structures shown in some of the packages shown in the references incorporated by reference that may have two or more conductive surfaces. Similarly, while the logic high state in preferred embodiments is approximately 5 volts, alternate preferred embodiments may have logic high states of approximately 3 volts.

We claim:

1. A circuit positioned in a substantially token-shaped body, said substantially token-shaped body having at least one conductive surface, said circuit comprising:
   (a) a serial port electrically coupled to said at least one conductive surface of said substantially token-shaped body to receive and transmit information, said information following a write signal, a read signal, and a program signal;
   (b) a scratchpad memory coupled to said serial port to hold information that is received or transmitted by said serial port;
   (c) an electrically programmable memory coupled to said scratchpad memory to house said information received by said serial port;
   (d) program port electrically coupled to said at least one conductive surface of said substantially token-shaped body to receive program information following said program signal to program said electrically programmable memory, said program port deriving all voltages necessary to program said electrically programmable memory from s program signal; and
   (e) control logic coupled to said serial port and said scratchpad memory and said electrically programmable memory, said control logic transfers information to and from said scratchpad memory to said electrically programmable memory as a block pursuant to a block transfer command received at said serial port.

2. The memory of claim 1, wherein said electronic token has a first electrically conductive surface and a second electrically conductive surface that combine to create a hollow cavity, said serial port, said scratchpad memory, said program port, said electrically programmable memory, and said control logic positioned inside said hollow cavity, said first conductive surface and said second conductive surface can be electrically coupled to transmit electrical signals generated by said serial port, said scratchpad memory, said program port, said electrically programmable memory, and control logic and to receive externally generated electrical signals.

3. The circuit of claim 2, wherein:
   (a) said first electrically conductive surface and said second electrically conductive surface are planar.

4. The circuit of claim 1, wherein:
   (a) said control logic allows access to a generated cyclic redundancy check value.

5. The circuit of claim 1, wherein said block is equal to 8 bits or more.

6. The circuit of claim 1, wherein said electrically programmable memory is divided into a plurality of memory subsections, all of which are coupled to said scratchpad memory and said control logic; said control logic transfers information to and from said scratchpad memory to said plurality of memory subsections of said electrically programmable memory as a block pursuant to a block transfer command received at said serial port.

7. The circuit of claim 6, wherein at least four memory subsections comprise said plurality of memory.

8. The circuit of claim 2, wherein said serial port, said scratchpad memory, said electrically programmable memory and said control logic is powered by voltage intermittently applied between said first and second electrically conductive surface areas.

9. The circuit of claim 2, further comprising a capacitor for storing energy from said voltage intermittently applied between said first and second electrically conductive surface areas.

10. The circuit of claim 2, wherein:
    (a) skid first electrically conductive surface comprises a first flat face; and
    (b) said second electrically conductive surface comprises
        (b1) a second flat face parallel to said first flat face; and
        (b2) a portion of a first electrically conductive surface which is approximately perpendicular to said first flat face and said second flat face.

11. The circuit of claim 6, further comprising:
    (g) a voltage level detector coupled to a first and a second surface of said at least one conductive surface for receiving signals applied as voltage level differences between said first and said second conductive surfaces; and
    (h) a switch connecting said first and said second conductive surfaces for sending signals by changing a resistance between said first and said second conductive surfaces.

12. The circuit of claim 11, wherein said voltage level differences are approximately 5 volts, said voltage level differences created by a first voltage level and a second voltage level, said first and second voltage levels correspond to a logical high and a logical low.

13. The circuit of claim 1, wherein said substantially token-shaped body is button-shaped and has a flange extending from a perimeter of said substantially token-shaped body.

14. The circuit of claim 6, wherein said serial port, said scratchpad memory, said electrically programmable memory and said control logic is integrated on a monolithic piece of silicon.

15. The circuit of claim 1, wherein said substantially token-shaped body is mountable to a physical item.

16. The circuit of claim 15, wherein said item is selected from the group consisting of maintenance records, retail products, machinery, cards, personnel identification badges, machinery, access control devices, and a currency equivalent device.

17. The circuit of claim 2, wherein substantially token-shaped body has only said first and second electrically conductive surface.

18. The circuit of claim 1, wherein said serial port, said scratchpad memory, said electrically programmable memory and said control logic is packaged in a low-height package.

19. The circuit of claim 18, wherein said low-height package is at least one of a flat pack and a small outline integrated circuit.

20. The circuit of claim 1, wherein said serial port, said scratchpad memory, said electrically programmable memory and said control logic is combined into an integrated circuit that is mounted on a very small printed circuit board.

21. The circuit of claim 1, wherein said substantially token-shaped body is approximately 6 mm in diameter and approximately 3 mm thick.

22. The circuit of claim 1, wherein said substantially token-shaped body is comprised of metal.

23. The circuit of claim 1, wherein said program port and write signal, and said program signal corresponding to receiving and transmitting information are multiplexed together on a single data line.

24. The circuit of claim 6, wherein said scratchpad memory has a first size android electrically programmable memory has a second size.

25. The circuit of claim 24, wherein said second size is approximately equal to 16,384 bits.

26. The circuit of claim 1, wherein a bus master module is coupled to said serial port and controls communication to and from said serial port.

27. The circuit of claim 26, wherein said bus master module holds a data line to a first voltage level for a first time period, creates a transition between said first voltage level and a second voltage level, holds the data line at said second voltage level for a second time period; and then samples said data line to determine whether a data value is a first data value or a second data value at a first sample time.

28. The circuit of claim 27, wherein said first time period is at least one microsecond.

29. The circuit of claim 27, wherein said first voltage level corresponds to a logic high level and is selected from the group consisting of approximately 3 volts and approximately 5 volts.

30. The circuit of claim 27, wherein said second voltage level is approximately ground and corresponds to a logic low level.

31. The circuit of claim 27, wherein said second time period is at least one microsecond.

32. The circuit of claim 27, wherein said first sample time is at least 30 microseconds from said transition.

33. The circuit of claim 27, wherein said master bus module holds a data line coupled to said serial port via a first electrically conductive surface to a first voltage level for a first time period, creates a transition between said first voltage level and a second voltage level, holds said first data line to said second voltage level for a second time period, and samples said data line by said master bus module to determine whether a data value is a first data value or a second data value at a first time.

34. The circuit of claim 6, further comprising:
(g) a voltage level detector coupled a first and a second surface of said at least one conductive surface for receiving signals applied as voltage level differences between said first and said second conductive surfaces.

35. The circuit of claim 1, wherein said electrically programmable memory comprises at least one memory cell, each memory cell comprising a first transistor having a gate, source and drain, said circuit further comprising a voltage clamping circuit that directs and adjusts a first voltage and a second voltage to said gate and said drain, both of which have been derived from a program voltage received hybrid program port, said first voltage and said second voltages are substantially independent of operating temperature and said first voltage and said second voltage are substantially independent from one another.

36. The circuit of claim 1, wherein said serial port and said program port are combined into a single port.

37. The circuit of claim 1, wherein said serial port comprises a voltage switch circuit detects voltage differences received at said serial port and interprets said voltage difference to determine whether it should be directed to reading said electrically programmable memory or to program said electrically programmable memory.

38. The circuit of claim 37, wherein if said voltage switch determines said voltage difference should be used to program said electrically programmable memory, said voltage switch activates circuitry to adjust said voltage difference to run other circuitry comprised in said circuit.

39. The circuit of claim 6, wherein said memory subsections comprise a block of memory, said block of memory redirects data requests to other locations in said memory subsections, said block can be write protected.

40. The circuit of claim 39, wherein said block is write protected by protecting information found in said block and/or by preventing said block from being redirected.

41. The circuit of claim 1, wherein said electrically programmable memory comprises blocks of memory to redirect data requests to other locations in said electrically programmable memory.

42. The circuit of claim 1, wherein said electrically programmable memory is also read only memory.

43. The circuit of claim 1, further comprising:
(g) a protection circuit to protect said scratchpad memory, said electrically programmable memory coupled to said scratchpad memory, and said control logic from electrostatic discharge.

* * * * *

UNITED STATES PATENT AND TRADEMARK OFFICE
CERTIFICATE OF CORRECTION

Page 1 of 5

PATENT NO. : 5,679,944
DATED : Oct. 21, 1997
INVENTOR(S) : Casey et al.

It is certified that error appears in the above-identified patent and that said Letters Patent is hereby corrected as shown below:

Column 1, table line 32    Replace "02-14-93"
                           With --02-24-93--

Column 1, table line 33    Replace "08/031,176"
                           With --08/031,776--

Column 1, table line 34    Replace "08/015,566"
                           With --08/015,506--

Column 9, line 6           Replace "singulars"
                           With --singulate--

Column 9, line 54          Replace "11"
                           With --1I--

Column 10, line 33         Replace "back,"
                           With --back.--

Column 10, line 37         Replace "Corresponding"
                           With --corresponding--

Column 11, line 15         Replace "[FOH]"
                           With --[F0H]--

UNITED STATES PATENT AND TRADEMARK OFFICE
CERTIFICATE OF CORRECTION

PATENT NO. : 5,679,944

DATED : Oct. 21, 1997

INVENTOR(S) : Casey et al.

It is certified that error appears in the above-identified patent and that said Letters Patent is hereby corrected as shown below:

| | |
|---|---|
| Column 11, line 48 | Replace "[OFH]" With --[0FH]-- |
| Column 12, line 33 | Replace "(DT:D0)." With --(D7:D0).-- |
| Column 12, line 43 | Replace "is." With --1s.-- |
| Column 13, line 65 | Replace "COEDS," With --COMMANDS,-- |
| Column 14, line 30 | Replace "[FOH]" With --[F0H]-- |
| Column 15, line 66 | Replace "10" With --1O-- |
| Column 16, line 6 | Replace "10" With --1O-- |
| Column 16, line 22 | Replace "107" With --107A&B-- |

UNITED STATES PATENT AND TRADEMARK OFFICE
CERTIFICATE OF CORRECTION

PATENT NO. : 5,679,944

DATED : Oct. 21, 1997

INVENTOR(S) : Casey et al.

It is certified that error appears in the above-identified patent and that said Letters Patent is hereby corrected as shown below:

| | |
|---|---|
| Column 17, line 40 | Replace "this" With --This-- |
| Column 17, line 52 | Replace "Clamp" With --clamp-- |
| Column 18, line 56 | Replace "10" With --10-- |
| Column 19, line 35 | Replace "(Or)," With --(OV),-- |
| Column 21, line 50 | Replace "10" With --10-- |
| Column 22, line 22 | Replace "10" With --10-- |
| Column 22, line 41 | After "FIG." Insert --2G).-- |
| Column 22, line 44 | Replace "10" With --10-- |

UNITED STATES PATENT AND TRADEMARK OFFICE
CERTIFICATE OF CORRECTION

PATENT NO. : 5,679,944

DATED : Oct. 21, 1997

INVENTOR(S) : Casey et al.

It is certified that error appears in the above-identified patent and that said Letters Patent is hereby corrected as shown below:

| | |
|---|---|
| Column 22, line 66 | Replace "unload flip-flips"<br>With --unloads flip-flops-- |
| Column 23, line 29 | Replace "283"<br>With --283A&B-- |
| Column 23, line 41 | Replace "1O"<br>With --10-- |
| Column 25, line 5 | Replace "EPROM"<br>With --$E^2$PROM-- |
| Column 25, line 42 | Replace "s program"<br>With --said program-- |
| Column 26, line 22 | Replace "skid"<br>With --said-- |
| Column 26, line 58 | After "wherein"<br>Insert --said-- |

UNITED STATES PATENT AND TRADEMARK OFFICE
CERTIFICATE OF CORRECTION

PATENT NO. : 5,679,944
DATED : Oct. 21, 1997
INVENTOR(S) : Casey et al.

It is certified that error appears in the above-identified patent and that said Letters Patent is hereby corrected as shown below:

Column 27, line 12    Before "write"
                      Insert --said serial port are combined together and said read signal, said--

Column 27, line 16    Replace "android"
                      With --and said--

Column 28, line 13    Replace "hybrid"
                      With --by said--

Signed and Sealed this

Sixteenth Day of June, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,679,944
DATED : October 21, 1997
INVENTOR(S) : Cusey et al

It is certified that error appears in the above-identified patent and that said Letters Patent is hereby corrected as shown below:

Column 1, table line 32   Replace "02-14-93"
                                          With --02-24-93--

Column 1, table line 33   Replace "08/031,176"
                                          With --08/031,776--

Column 1, table line 34   Replace "08/015,566"
                                          With --08/015,506--

Column 9, line 6          Replace "singulars"
                                          With --singulate--

Column 9, line 54         Replace "11"
                                          With --1I--

Column 10, line 33        Replace "back,"
                                          With --back.--

Column 10, line 37        Replace "Corresponding"
                                          With --corresponding--

Column 11, line 15        Replace "[FOH]"
                                          With --[FOH]--

UNITED STATES PATENT AND TRADEMARK OFFICE
CERTIFICATE OF CORRECTION

PATENT NO. : 5,679,944
DATED : October 21, 1997
INVENTOR(S) : Cusey et al

It is certified that error appears in the above-identified patent and that said Letters Patent is hereby corrected as shown below:

| | |
|---|---|
| Column 11, line 48 | Replace "[OFH]" With --[0FH]-- |
| Column 12, line 33 | Replace "(DT:D0)." With --(D7:D0).-- |
| Column 12, line 43 | Replace "is." With --1s.-- |
| Column 13, line 65 | Replace "COEDS," With --COMMANDS,-- |
| Column 14, line 30 | Replace "[FOH]" With --[F0H]-- |
| Column 15, line 66 | Replace "10" With --1O-- |
| Column 16, line 6 | Replace "10" With --1O-- |
| Column 16, line 22 | Replace "107" With --107A&B-- |

UNITED STATES PATENT AND TRADEMARK OFFICE
CERTIFICATE OF CORRECTION

PATENT NO. : 5,679,944
DATED : October 21, 1997
INVENTOR(S) : Cusey et al

It is certified that error appears in the above-identified patent and that said Letters Patent is hereby corrected as shown below:

| | |
|---|---|
| Column 17, line 40 | Replace "this" With --This-- |
| Column 17, line 52 | Replace "Clamp" With --clamp-- |
| Column 18, line 56 | Replace "10" With --10-- |
| Column 19, line 35 | Replace "(Or)," With --(OV),-- |
| Column 21, line 50 | Replace "10" With --10-- |
| Column 22, line 22 | Replace "10" With --10-- |
| Column 22, line 41 | After "FIG." Insert --2G).-- |
| Column 22, line 44 | Replace "10" With --10-- |

UNITED STATES PATENT AND TRADEMARK OFFICE
CERTIFICATE OF CORRECTION

PATENT NO. : 5,679,944
DATED : October 21, 1997
INVENTOR(S) : Cusey et al

It is certified that error appears in the above-identified patent and that said Letters Patent is hereby corrected as shown below:

| | |
|---|---|
| Column 22, line 66 | Replace "unload flip-flips" With --unloads flip-flops-- |
| Column 23, line 29 | Replace "283" With --283A&B-- |
| Column 23, line 41 | Replace "1O" With --10-- |
| Column 25, line 5 | Replace "EPROM" With --$E^2$PROM-- |
| Column 25, line 42 | Replace "s program" With --said program-- |
| Column 26, line 22 | Replace "skid" With --said-- |
| Column 26, line 58 | After "wherein" Insert --said-- |

UNITED STATES PATENT AND TRADEMARK OFFICE
CERTIFICATE OF CORRECTION

PATENT NO. : 5,679,944
DATED : October 21, 1997
INVENTOR(S) : Cusey et al

It is certified that error appears in the above-identified patent and that said Letters Patent is hereby corrected as shown below:

Column 27, line 12    Before "write"
                      Insert --said serial port are combined together and said read signal, said--

Column 27, line 16    Replace "android"
                      With --and said--

Column 28, line 13    Replace "hybrid"
                      With --by said--

This certificate supersedes Certificate of Correction issued June 16, 1998.

Signed and Sealed this

Thirteenth Day of October 1998

Attest:

BRUCE LEHMAN

Attesting Officer    Commissioner of Patents and Trademarks